US008405971B2

(12) United States Patent
Merrow et al.

(10) Patent No.: US 8,405,971 B2
(45) Date of Patent: Mar. 26, 2013

(54) DISK DRIVE TRANSPORT, CLAMPING AND TESTING

(75) Inventors: Brian S. Merrow, Harvard, MA (US);
Edward Garcia, Holbrook, MA (US);
Evgeny Polyakov, Brookline, MA (US)

(73) Assignee: Teradyne, Inc., North Reading, MA (US)

( * ) Notice: Subject to any disclaimer, the term of this patent is extended or adjusted under 35 U.S.C. 154(b) by 0 days.

(21) Appl. No.: 12/767,113

(22) Filed: Apr. 26, 2010

(65) Prior Publication Data

US 2010/0194253 A1 Aug. 5, 2010

Related U.S. Application Data

(63) Continuation of application No. 11/959,133, filed on Dec. 18, 2007.

(51) Int. Cl.
*H05K 7/00* (2006.01)
*H05K 1/00* (2006.01)
*A47B 81/00* (2006.01)

(52) U.S. Cl. ......... 361/679.34; 361/679.33; 361/679.35; 361/679.36; 361/679.38; 439/60; 312/223.1; 312/223.2

(58) Field of Classification Search .................. 361/683, 361/684, 685, 686, 679.33, 679.31–679.4, 361/679.55–679.6, 724–727, 679.17, 679.3, 361/679.34–679.41; 439/157, 60, 152–153, 439/327, 328, 331; 369/75.11, 75.21, 76, 369/77.11, 77.21, 78, 79, 80, 81, 82; 312/332.1, 312/332.2

See application file for complete search history.

(56) References Cited

U.S. PATENT DOCUMENTS

| 557,186 A | 3/1896 | Cahill |
|---|---|---|
| 2,224,407 A | 12/1940 | Passur |
| 2,380,026 A | 7/1945 | Clarke |

(Continued)

FOREIGN PATENT DOCUMENTS

| AU | 583716 | 5/1989 |
|---|---|---|
| CN | 1177187 | 3/1998 |

(Continued)

OTHER PUBLICATIONS

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/767,113. The foregoing U.S. patent application is a continuation of U.S. Appl. No. 11/595,133.

(Continued)

*Primary Examiner* — Jayprakash N Gandhi
*Assistant Examiner* — Jerry Wu
(74) *Attorney, Agent, or Firm* — Fish & Richardson P.C.

(57) ABSTRACT

A disk drive transporter, for transporting a disk drive and for mounting a disk drive within a test slot, includes a frame configured to receive and support a disk drive. The frame includes sidewalls configured to receive a disk drive therebetween and sized to be inserted into a test slot along with a disk drive. The frame also includes a clamping mechanism operatively associated with at least one of the sidewalls. The clamping mechanism includes a first engagement element and a first actuator operable to initiate movements of the first engagement element. The first actuator is operable to move the first engagement element into engagement with a test slot after a disk drive being supported by the frame is arranged in a test position in a test slot.

20 Claims, 58 Drawing Sheets

U.S. PATENT DOCUMENTS

| | | |
|---|---|---|
| 2,631,775 A | 3/1953 | Gordon |
| 2,635,524 A | 4/1953 | Jenkins |
| 3,120,166 A | 2/1964 | Lyman |
| 3,360,032 A | 12/1965 | Sherwood |
| 3,364,838 A | 1/1968 | Bradley |
| 3,517,601 A | 6/1970 | Courchesne |
| 3,845,286 A | 10/1974 | Aronstein et al. |
| 4,147,299 A | 4/1979 | Freeman |
| 4,233,644 A | 11/1980 | Hwang et al. |
| 4,336,748 A | 6/1982 | Martin et al. |
| 4,379,259 A | 4/1983 | Varadi et al. |
| 4,477,127 A | 10/1984 | Kume |
| 4,495,545 A | 1/1985 | Dufresne et al. |
| 4,526,318 A | 7/1985 | Fleming et al. |
| 4,620,248 A | 10/1986 | Gitzendanner |
| 4,648,007 A | 3/1987 | Garner |
| 4,654,732 A | 3/1987 | Mesher |
| 4,665,455 A | 5/1987 | Mesher |
| 4,683,424 A | 7/1987 | Cutright et al. |
| 4,685,303 A | 8/1987 | Branc et al. |
| 4,688,124 A | 8/1987 | Scribner et al. |
| 4,713,714 A | 12/1987 | Gatti et al. |
| 4,739,444 A | 4/1988 | Zushi et al. |
| 4,754,397 A | 6/1988 | Varaiya et al. |
| 4,768,285 A | 9/1988 | Woodman, Jr. |
| 4,778,063 A | 10/1988 | Ueberreiter |
| 4,801,234 A | 1/1989 | Cedrone |
| 4,809,881 A | 3/1989 | Becker |
| 4,817,273 A | 4/1989 | Lape et al. |
| 4,817,934 A | 4/1989 | McCormick et al. |
| 4,851,965 A | 7/1989 | Gabuzda et al. |
| 4,881,591 A | 11/1989 | Rignall |
| 4,888,549 A | 12/1989 | Wilson et al. |
| 4,911,281 A | 3/1990 | Jenkner |
| 4,967,155 A | 10/1990 | Magnuson |
| 5,012,187 A | 4/1991 | Littlebury |
| 5,045,960 A | 9/1991 | Eding |
| 5,061,630 A | 10/1991 | Knopf et al. |
| 5,119,270 A | 6/1992 | Bolton et al. |
| 5,122,914 A | 6/1992 | Hanson |
| 5,127,684 A | 7/1992 | Klotz et al. |
| 5,128,813 A | 7/1992 | Lee |
| 5,136,395 A | 8/1992 | Ishii et al. |
| 5,158,132 A | 10/1992 | Guillemot |
| 5,168,424 A | 12/1992 | Bolton et al. |
| 5,171,183 A | 12/1992 | Pollard et al. |
| 5,173,819 A | 12/1992 | Takahashi et al. |
| 5,176,202 A | 1/1993 | Richard |
| 5,205,132 A | 4/1993 | Fu |
| 5,206,772 A | 4/1993 | Hirano et al. |
| 5,207,613 A | 5/1993 | Ferchau et al. |
| 5,210,680 A | 5/1993 | Scheibler |
| 5,237,484 A | 8/1993 | Ferchau et al. |
| 5,263,537 A | 11/1993 | Plucinski et al. |
| 5,269,698 A | 12/1993 | Singer |
| 5,295,392 A | 3/1994 | Hensel et al. |
| 5,309,323 A | 5/1994 | Gray et al. |
| 5,325,263 A | 6/1994 | Singer et al. |
| 5,349,486 A | 9/1994 | Sugimoto et al. |
| 5,368,072 A | 11/1994 | Cote |
| 5,374,395 A | 12/1994 | Robinson et al. |
| 5,379,229 A | 1/1995 | Parsons et al. |
| 5,398,058 A | 3/1995 | Hattori |
| 5,412,534 A | 5/1995 | Cutts et al. |
| 5,414,591 A | 5/1995 | Kimura et al. |
| 5,426,581 A | 6/1995 | Kishi et al. |
| 5,469,037 A | 11/1995 | McMurtrey, Sr. et al. |
| 5,477,416 A | 12/1995 | Schkrohowsky et al. |
| 5,484,012 A | 1/1996 | Hiratsuka |
| 5,486,681 A | 1/1996 | Dagnac et al. |
| 5,491,610 A | 2/1996 | Mok et al. |
| 5,543,727 A | 8/1996 | Bushard et al. |
| 5,546,250 A | 8/1996 | Diel |
| 5,557,186 A | 9/1996 | McMurtrey, Sr. et al. |
| 5,563,768 A | 10/1996 | Perdue |
| 5,570,740 A | 11/1996 | Flores et al. |
| 5,593,380 A | 1/1997 | Bittikofer |
| 5,601,141 A | 2/1997 | Gordon et al. |
| 5,604,662 A | 2/1997 | Anderson et al. |
| 5,610,893 A | 3/1997 | Soga et al. |
| 5,617,430 A | 4/1997 | Angelotti et al. |
| 5,644,705 A | 7/1997 | Stanley |
| 5,646,918 A | 7/1997 | Dimitri et al. |
| 5,654,846 A | 8/1997 | Wicks et al. |
| 5,673,029 A | 9/1997 | Behl et al. |
| 5,694,290 A | 12/1997 | Chang |
| 5,718,627 A | 2/1998 | Wicks |
| 5,718,628 A | 2/1998 | Nakazato et al. |
| 5,731,928 A | 3/1998 | Jabbari et al. |
| 5,751,549 A | 5/1998 | Eberhardt et al. |
| 5,754,365 A | 5/1998 | Beck et al. |
| 5,761,032 A | 6/1998 | Jones |
| 5,793,610 A | 8/1998 | Schmitt et al. |
| 5,811,678 A | 9/1998 | Hirano |
| 5,812,761 A | 9/1998 | Seki et al. |
| 5,819,842 A | 10/1998 | Potter et al. |
| 5,831,525 A | 11/1998 | Harvey |
| 5,851,143 A | 12/1998 | Hamid |
| 5,859,409 A | 1/1999 | Kim et al. |
| 5,859,540 A | 1/1999 | Fukumoto |
| 5,862,037 A | 1/1999 | Behl |
| 5,870,630 A | 2/1999 | Reasoner et al. |
| 5,886,639 A | 3/1999 | Behl et al. |
| 5,890,959 A | 4/1999 | Pettit et al. |
| 5,912,799 A | 6/1999 | Grouell et al. |
| 5,913,926 A | 6/1999 | Anderson et al. |
| 5,914,856 A | 6/1999 | Morton et al. |
| 5,927,386 A | 7/1999 | Lin |
| 5,956,301 A | 9/1999 | Dimitri et al. |
| 5,959,834 A | 9/1999 | Chang |
| 5,999,356 A | 12/1999 | Dimitri et al. |
| 5,999,365 A | 12/1999 | Hasegawa et al. |
| 6,000,623 A | 12/1999 | Blatti et al. |
| 6,005,404 A | 12/1999 | Cochran et al. |
| 6,005,770 A | 12/1999 | Schmitt |
| 6,008,636 A | 12/1999 | Miller et al. |
| 6,008,984 A | 12/1999 | Cunningham et al. |
| 6,011,689 A | 1/2000 | Wrycraft |
| 6,031,717 A | 2/2000 | Baddour et al. |
| 6,034,870 A | 3/2000 | Osborn et al. |
| 6,042,348 A | 3/2000 | Aakalu et al. |
| 6,045,113 A | 4/2000 | Itakura |
| 6,055,814 A | 5/2000 | Song |
| 6,066,822 A | 5/2000 | Nemoto et al. |
| 6,067,225 A | 5/2000 | Reznikov et al. |
| 6,069,792 A | 5/2000 | Nelik |
| 6,084,768 A | 7/2000 | Bolognia |
| 6,094,342 A | 7/2000 | Dague et al. |
| 6,104,607 A | 8/2000 | Behl |
| 6,115,250 A | 9/2000 | Schmitt |
| 6,122,131 A | 9/2000 | Jeppson |
| 6,122,232 A | 9/2000 | Schell et al. |
| 6,124,707 A | 9/2000 | Kim et al. |
| 6,130,817 A | 10/2000 | Flotho et al. |
| 6,144,553 A | 11/2000 | Hileman et al. |
| 6,166,901 A | 12/2000 | Gamble et al. |
| 6,169,413 B1 | 1/2001 | Pack et al. |
| 6,169,930 B1 | 1/2001 | Blachek et al. |
| 6,177,805 B1 | 1/2001 | Pih |
| 6,178,835 B1 | 1/2001 | Orriss et al. |
| 6,181,557 B1 | 1/2001 | Gatti |
| 6,185,065 B1 | 2/2001 | Hasegawa et al. |
| 6,185,097 B1 | 2/2001 | Behl |
| 6,188,191 B1 | 2/2001 | Frees et al. |
| 6,192,282 B1 | 2/2001 | Smith et al. |
| 6,193,339 B1 | 2/2001 | Behl et al. |
| 6,209,842 B1 | 4/2001 | Anderson et al. |
| 6,227,516 B1 | 5/2001 | Webster, Jr. et al. |
| 6,229,275 B1 | 5/2001 | Yamamoto |
| 6,231,145 B1 | 5/2001 | Liu |
| 6,233,148 B1 | 5/2001 | Shen |
| 6,236,563 B1 | 5/2001 | Buican et al. |
| 6,247,944 B1 | 6/2001 | Bolognia et al. |
| 6,249,824 B1 | 6/2001 | Henrichs |
| 6,252,769 B1 | 6/2001 | Tullstedt et al. |
| 6,262,863 B1 | 7/2001 | Ostwald et al. |
| 6,272,007 B1 | 8/2001 | Kitlas et al. |

| Patent | Type | Date | Inventor |
|---|---|---|---|
| 6,272,767 | B1 | 8/2001 | Botruff et al. |
| 6,281,677 | B1 | 8/2001 | Cosci et al. |
| 6,282,501 | B1 | 8/2001 | Assouad |
| 6,285,524 | B1 | 9/2001 | Boigenzahn et al. |
| 6,289,678 | B1 | 9/2001 | Pandolfi |
| 6,297,950 | B1 | 10/2001 | Erwin |
| 6,298,672 | B1 | 10/2001 | Valicoff, Jr. |
| 6,302,714 | B1 | 10/2001 | Bolognia et al. |
| 6,304,839 | B1 | 10/2001 | Ho et al. |
| 6,307,386 | B1 | 10/2001 | Fowler et al. |
| 6,327,150 | B1 | 12/2001 | Levy et al. |
| 6,330,154 | B1 | 12/2001 | Fryers et al. |
| 6,351,379 | B1 | 2/2002 | Cheng |
| 6,354,792 | B1 | 3/2002 | Kobayashi et al. |
| 6,356,409 | B1 | 3/2002 | Price et al. |
| 6,356,415 | B1 | 3/2002 | Kabasawa |
| 6,384,995 | B1 | 5/2002 | Smith |
| 6,388,437 | B1 | 5/2002 | Wolski et al. |
| 6,388,875 | B1 | 5/2002 | Chen |
| 6,388,878 | B1 | 5/2002 | Chang |
| 6,389,225 | B1 | 5/2002 | Malinoski et al. |
| 6,411,584 | B2 | 6/2002 | Davis et al. |
| 6,421,236 | B1 | 7/2002 | Montoya et al. |
| 6,434,000 | B1 | 8/2002 | Pandolfi |
| 6,434,498 | B1 | 8/2002 | Ulrich et al. |
| 6,434,499 | B1 | 8/2002 | Ulrich et al. |
| 6,464,080 | B1 | 10/2002 | Morris et al. |
| 6,467,153 | B2 | 10/2002 | Butts et al. |
| 6,473,297 | B1 | 10/2002 | Behl et al. |
| 6,473,301 | B1 | 10/2002 | Levy et al. |
| 6,476,627 | B1 | 11/2002 | Pelissier et al. |
| 6,477,044 | B2 | 11/2002 | Foley et al. |
| 6,477,442 | B1 | 11/2002 | Valerino, Sr. |
| 6,480,380 | B1 | 11/2002 | French et al. |
| 6,480,382 | B2 | 11/2002 | Cheng |
| 6,487,071 | B1 | 11/2002 | Tata et al. |
| 6,489,793 | B2 | 12/2002 | Jones et al. |
| 6,494,663 | B2 | 12/2002 | Ostwald et al. |
| 6,525,933 | B2 | 2/2003 | Eland |
| 6,526,841 | B1 | 3/2003 | Wanek et al. |
| 6,535,384 | B2 | 3/2003 | Huang |
| 6,537,013 | B2 | 3/2003 | Emberty et al. |
| 6,544,309 | B1 | 4/2003 | Hoefer et al. |
| 6,546,445 | B1 | 4/2003 | Hayes |
| 6,553,532 | B1 | 4/2003 | Aoki |
| 6,560,107 | B1 | 5/2003 | Beck et al. |
| 6,565,163 | B2 | 5/2003 | Behl et al. |
| 6,566,859 | B2 | 5/2003 | Wolski et al. |
| 6,567,266 | B2 | 5/2003 | Ives et al. |
| 6,570,734 | B2 | 5/2003 | Ostwald et al. |
| 6,577,586 | B1 | 6/2003 | Yang et al. |
| 6,577,687 | B2 | 6/2003 | Hall et al. |
| 6,618,254 | B2 | 9/2003 | Ives |
| 6,626,846 | B2 | 9/2003 | Spencer |
| 6,628,518 | B2 | 9/2003 | Behl et al. |
| 6,635,115 | B1 | 10/2003 | Fairbairn et al. |
| 6,640,235 | B1 | 10/2003 | Anderson |
| 6,644,982 | B1 | 11/2003 | Ondricek et al. |
| 6,651,192 | B1 | 11/2003 | Viglione et al. |
| 6,654,240 | B1 | 11/2003 | Tseng et al. |
| 6,679,128 | B2 | 1/2004 | Wanek et al. |
| 6,693,757 | B2 | 2/2004 | Hayakawa et al. |
| 6,741,529 | B1 | 5/2004 | Getreuer |
| 6,746,648 | B1 | 6/2004 | Mattila et al. |
| 6,751,093 | B1 | 6/2004 | Hsu et al. |
| 6,791,785 | B1 | 9/2004 | Messenger et al. |
| 6,791,799 | B1 | 9/2004 | Fletcher |
| 6,798,651 | B2 | 9/2004 | Syring et al. |
| 6,798,972 | B1 | 9/2004 | Ito et al. |
| 6,801,834 | B1 | 10/2004 | Konshak et al. |
| 6,806,700 | B2 | 10/2004 | Wanek et al. |
| 6,811,427 | B2 | 11/2004 | Garrett et al. |
| 6,826,046 | B1 | 11/2004 | Muncaster et al. |
| 6,830,372 | B2 | 12/2004 | Liu et al. |
| 6,832,929 | B2 | 12/2004 | Garrett et al. |
| 6,861,861 | B2 | 3/2005 | Song et al. |
| 6,862,173 | B1 | 3/2005 | Konshak et al. |
| 6,867,939 | B2 | 3/2005 | Katahara et al. |
| 6,892,328 | B2 | 5/2005 | Klein et al. |
| 6,904,479 | B2 | 6/2005 | Hall et al. |
| 6,908,330 | B2 | 6/2005 | Garrett et al. |
| 6,928,336 | B2 | 8/2005 | Peshkin et al. |
| 6,937,432 | B2 | 8/2005 | Sri-Jayantha et al. |
| 6,957,291 | B2 | 10/2005 | Moon et al. |
| 6,965,811 | B2 | 11/2005 | Dickey et al. |
| 6,974,017 | B2 | 12/2005 | Oseguera |
| 6,976,190 | B1 | 12/2005 | Goldstone |
| 6,980,381 | B2 | 12/2005 | Gray et al. |
| 6,982,872 | B2 | 1/2006 | Behl et al. |
| 7,006,325 | B2 | 2/2006 | Emberty et al. |
| 7,039,924 | B2 | 5/2006 | Goodman et al. |
| 7,054,150 | B2 * | 5/2006 | Orriss et al. ............ 361/679.33 |
| 7,070,323 | B2 | 7/2006 | Wanek et al. |
| 7,076,391 | B1 | 7/2006 | Pakzad et al. |
| 7,077,614 | B1 | 7/2006 | Hasper et al. |
| 7,088,541 | B2 | 8/2006 | Orriss et al. |
| 7,092,251 | B1 * | 8/2006 | Henry ..................... 361/679.36 |
| 7,106,582 | B2 | 9/2006 | Albrecht et al. |
| 7,123,477 | B2 | 10/2006 | Coglitore et al. |
| 7,126,777 | B2 | 10/2006 | Flechsig et al. |
| 7,130,138 | B2 | 10/2006 | Lum et al. |
| 7,134,553 | B2 | 11/2006 | Stephens |
| 7,139,145 | B1 | 11/2006 | Archibald et al. |
| 7,164,579 | B2 | 1/2007 | Muncaster et al. |
| 7,167,360 | B2 | 1/2007 | Inoue et al. |
| 7,181,458 | B1 | 2/2007 | Higashi |
| 7,203,021 | B1 | 4/2007 | Ryan et al. |
| 7,203,060 | B2 | 4/2007 | Kay et al. |
| 7,206,201 | B2 | 4/2007 | Behl et al. |
| 7,216,968 | B2 | 5/2007 | Smith et al. |
| 7,219,028 | B2 | 5/2007 | Bae et al. |
| 7,219,273 | B2 | 5/2007 | Fisher et al. |
| 7,227,746 | B2 | 6/2007 | Tanaka et al. |
| 7,232,101 | B2 | 6/2007 | Wanek et al. |
| 7,243,043 | B2 | 7/2007 | Shin |
| 7,248,467 | B2 | 7/2007 | Sri-Jayantha et al. |
| 7,259,966 | B2 | 8/2007 | Connelly, Jr. et al. |
| 7,273,344 | B2 | 9/2007 | Ostwald et al. |
| 7,280,353 | B2 | 10/2007 | Wendel et al. |
| 7,289,885 | B2 | 10/2007 | Basham et al. |
| 7,304,855 | B1 | 12/2007 | Milligan et al. |
| 7,315,447 | B2 | 1/2008 | Inoue et al. |
| 7,349,205 | B2 | 3/2008 | Hall et al. |
| 7,353,524 | B1 | 4/2008 | Lin et al. |
| 7,385,385 | B2 | 6/2008 | Magliocco et al. |
| 7,395,133 | B2 | 7/2008 | Lowe |
| 7,403,451 | B2 | 7/2008 | Goodman et al. |
| 7,421,623 | B2 | 9/2008 | Haugh ........................ 714/47 |
| 7,435,046 | B2 | 10/2008 | Kiaie et al. |
| 7,437,212 | B2 | 10/2008 | Farchmin et al. |
| 7,447,011 | B2 | 11/2008 | Wade et al. |
| 7,457,112 | B2 | 11/2008 | Fukuda et al. |
| 7,467,024 | B2 | 12/2008 | Flitsch |
| 7,476,362 | B2 | 1/2009 | Angros |
| 7,483,269 | B1 | 1/2009 | Marvin, Jr. et al. |
| 7,505,264 | B2 | 3/2009 | Hall et al. |
| 7,554,811 | B2 | 6/2009 | Scicluna et al. |
| 7,568,122 | B2 | 7/2009 | Mechalke et al. |
| 7,570,455 | B2 | 8/2009 | Deguchi et al. |
| 7,573,715 | B2 | 8/2009 | Mojaver et al. |
| 7,584,851 | B2 | 9/2009 | Hong et al. |
| 7,612,996 | B2 | 11/2009 | Atkins et al. |
| 7,625,027 | B2 | 12/2009 | Kiaie et al. |
| 7,630,196 | B2 | 12/2009 | Hall et al. |
| 7,643,289 | B2 | 1/2010 | Ye et al. |
| 7,646,596 | B2 | 1/2010 | Ng |
| 7,729,107 | B2 | 6/2010 | Atkins et al. |
| 2001/0006453 | A1 | 7/2001 | Glorioso et al. |
| 2001/0044023 | A1 | 11/2001 | Johnson et al. |
| 2001/0046118 | A1 | 11/2001 | Yamanashi et al. |
| 2001/0048590 | A1 | 12/2001 | Behl et al. |
| 2002/0030981 | A1 | 3/2002 | Sullivan et al. |
| 2002/0044416 | A1 | 4/2002 | Harmon, III et al. |
| 2002/0051338 | A1 | 5/2002 | Jiang et al. |
| 2002/0071248 | A1 | 6/2002 | Huang et al. |
| 2002/0079422 | A1 | 6/2002 | Jiang |
| 2002/0090320 | A1 | 7/2002 | Burow et al. |
| 2002/0116087 | A1 | 8/2002 | Brown |

| | | | | | | |
|---|---|---|---|---|---|---|
| 2002/0161971 A1 | 10/2002 | Dimitri et al. | | DE | 69400145 | 10/1996 |
| 2002/0172004 A1 | 11/2002 | Ives et al. | | DE | 19701548 | 8/1997 |
| 2002/0172014 A1* | 11/2002 | Lung ............................ 361/725 | | DE | 19804813 | 9/1998 |
| 2003/0035271 A1 | 2/2003 | Lelong et al. | | DE | 69614460 | 6/2002 |
| 2003/0043550 A1 | 3/2003 | Ives | | DE | 69626584 | 12/2003 |
| 2003/0206397 A1 | 11/2003 | Allgeyer et al. | | DE | 19861388 | 8/2007 |
| 2004/0165489 A1 | 8/2004 | Goodman et al. | | EP | 0210497 | 7/1986 |
| 2004/0230399 A1 | 11/2004 | Shin | | EP | 0242970 | 10/1987 |
| 2004/0236465 A1 | 11/2004 | Butka et al. | | EP | 0 277 634 A | 8/1988 |
| 2004/0264121 A1 | 12/2004 | Orriss et al. | | EP | 0356977 | 8/1989 |
| 2005/0004703 A1 | 1/2005 | Christie | | EP | 0442642 | 2/1991 |
| 2005/0010836 A1 | 1/2005 | Bae et al. | | EP | 0466073 | 7/1991 |
| 2005/0018397 A1 | 1/2005 | Kay et al. | | EP | 0776009 | 11/1991 |
| 2005/0055601 A1 | 3/2005 | Wilson et al. | | EP | 0582017 | 2/1994 |
| 2005/0057849 A1 | 3/2005 | Twogood et al. | | EP | 0617570 | 9/1994 |
| 2005/0069400 A1 | 3/2005 | Dickey et al. | | EP | 0635836 | 1/1995 |
| 2005/0109131 A1 | 5/2005 | Wanek et al. | | EP | 741508 | 11/1996 |
| 2005/0116702 A1 | 6/2005 | Wanek et al. | | EP | 0757320 | 2/1997 |
| 2005/0131578 A1 | 6/2005 | Weaver | | EP | 0757351 | 2/1997 |
| 2005/0179457 A1 | 8/2005 | Min et al. | | EP | 0840476 | 5/1998 |
| 2005/0207059 A1 | 9/2005 | Cochrane | | EP | 1 045 301 A | 10/2000 |
| 2005/0219809 A1 | 10/2005 | Muncaster et al. | | EP | 1209557 | 5/2002 |
| 2005/0225338 A1 | 10/2005 | Sands et al. | | EP | 1422713 | 5/2004 |
| 2005/0243507 A1* | 11/2005 | Lambert et al. ................ 361/685 | | EP | 1234308 | 5/2006 |
| 2005/0270737 A1* | 12/2005 | Wilson et al. ................. 361/685 | | EP | 1760722 | 3/2007 |
| 2006/0010353 A1 | 1/2006 | Haugh ............................ 714/47 | | EP | 1612798 | 11/2007 |
| 2006/0023331 A1 | 2/2006 | Flechsig et al. | | GB | 2241118 | 8/1991 |
| 2006/0028802 A1 | 2/2006 | Shaw et al. | | GB | 2276275 | 9/1994 |
| 2006/0066974 A1 | 3/2006 | Akamatsu et al. | | GB | 2299436 | 10/1996 |
| 2006/0130316 A1 | 6/2006 | Takase et al. | | GB | 2312984 | 11/1997 |
| 2006/0190205 A1 | 8/2006 | Klein et al. | | GB | 2328782 | 3/1999 |
| 2006/0227517 A1 | 10/2006 | Zayas et al. | | GB | 2439844 | 7/2008 |
| 2006/0250766 A1 | 11/2006 | Blaalid et al. | | JP | 61-115279 | 6/1986 |
| 2006/0269384 A1 | 11/2006 | Kiaie et al. | | JP | 62-177621 | 8/1987 |
| 2007/0034368 A1 | 2/2007 | Atkins et al. | | JP | 62-239394 | 10/1987 |
| 2007/0035874 A1 | 2/2007 | Wendel et al. | | JP | 62-251915 | 11/1987 |
| 2007/0035875 A1 | 2/2007 | Hall et al. | | JP | 63-002160 | 1/1988 |
| 2007/0053154 A1 | 3/2007 | Fukuda et al. | | JP | 63-004483 | 1/1988 |
| 2007/0082907 A1 | 4/2007 | Canada et al. | | JP | 63-016482 | 1/1988 |
| 2007/0127202 A1 | 6/2007 | Scicluna et al. | | JP | 63-062057 | 3/1988 |
| 2007/0127206 A1 | 6/2007 | Wade et al. | | JP | 63-201946 | 8/1988 |
| 2007/0195497 A1 | 8/2007 | Atkins | | JP | 63-214972 | 9/1988 |
| 2007/0248142 A1 | 10/2007 | Roundtree et al. | | JP | 63-269376 | 11/1988 |
| 2007/0253157 A1 | 11/2007 | Atkins et al. | | JP | 63-195697 | 12/1988 |
| 2007/0286045 A1 | 12/2007 | Onagi et al. | | JP | 64-089034 | 4/1989 |
| 2008/0007865 A1 | 1/2008 | Orriss et al. | | JP | 2-091565 | 3/1990 |
| 2008/0030945 A1 | 2/2008 | Mojaver et al. | | JP | 2-098197 | 4/1990 |
| 2008/0112075 A1 | 5/2008 | Farquhar et al. | | JP | 2-185784 | 7/1990 |
| 2008/0158810 A1 | 7/2008 | Liu et al. | | JP | 2-199690 | 8/1990 |
| 2008/0239564 A1* | 10/2008 | Farquhar et al. ........... 360/97.02 | | JP | 2-278375 | 11/1990 |
| 2008/0282275 A1 | 11/2008 | Zaczek et al. | | JP | 2-297770 | 12/1990 |
| 2008/0282278 A1 | 11/2008 | Barkley | | JP | 3-008086 | 1/1991 |
| 2009/0028669 A1 | 1/2009 | Rebstock | | JP | 3-078160 | 4/1991 |
| 2009/0082907 A1 | 3/2009 | Stuvel et al. | | JP | 3-105704 | 5/1991 |
| 2009/0122443 A1 | 5/2009 | Farquhar et al. | | JP | 3-207947 | 9/1991 |
| 2009/0142169 A1 | 6/2009 | Garcia et al. | | JP | 3-210662 | 9/1991 |
| 2009/0153992 A1 | 6/2009 | Garcia et al. | | JP | 3-212859 | 9/1991 |
| 2009/0153993 A1 | 6/2009 | Garcia et al. | | JP | 3-214490 | 9/1991 |
| 2009/0153994 A1 | 6/2009 | Merrow | | JP | 3-240821 | 10/1991 |
| 2009/0175705 A1 | 7/2009 | Nakao et al. | | JP | 3-295071 | 12/1991 |
| 2009/0261047 A1 | 10/2009 | Merrow | | JP | 4-017134 | 1/1992 |
| 2009/0261228 A1 | 10/2009 | Merrow | | JP | 4-143989 | 5/1992 |
| 2009/0261229 A1 | 10/2009 | Merrow | | JP | 4-172658 | 6/1992 |
| 2009/0262444 A1 | 10/2009 | Polyakov et al. | | JP | 4-214288 | 8/1992 |
| 2009/0262445 A1 | 10/2009 | Noble et al. | | JP | 4-247385 | 9/1992 |
| 2009/0262454 A1 | 10/2009 | Merrow | | JP | 4-259956 | 9/1992 |
| 2009/0262455 A1 | 10/2009 | Merrow | | JP | 4-307440 | 10/1992 |
| 2009/0265032 A1 | 10/2009 | Toscano et al. | | JP | 4-325923 | 11/1992 |
| 2009/0265043 A1 | 10/2009 | Merrow | | JP | 5-035053 | 2/1993 |
| 2009/0265136 A1 | 10/2009 | Garcia et al. | | JP | 5-035415 | 2/1993 |
| 2009/0297328 A1 | 12/2009 | Slocum, III | | JP | 5-066896 | 3/1993 |
| FOREIGN PATENT DOCUMENTS | | | | JP | 5-068257 | 3/1993 |
| CN | 2341188 | 9/1999 | | JP | 5-073566 | 3/1993 |
| CN | 1114109 | 7/2003 | | JP | 5-073803 | 3/1993 |
| CN | 1192544 | 3/2005 | | JP | 5-101603 | 4/1993 |
| CN | 101939717 A | 5/2011 | | JP | 5-173718 | 7/1993 |
| DE | 3786944 | 11/1993 | | JP | 5-189163 | 7/1993 |
| DE | 69111634 | 5/1996 | | JP | 5-204725 | 8/1993 |
| | | | | JP | 5-223551 | 8/1993 |

| | | |
|---|---|---|
| JP | 6-004220 | 1/1994 |
| JP | 6-004981 | 1/1994 |
| JP | 6-162645 | 6/1994 |
| JP | 6-181561 | 6/1994 |
| JP | 6-215515 | 8/1994 |
| JP | 6-274943 | 9/1994 |
| JP | 6-314173 | 11/1994 |
| JP | 7-007321 | 1/1995 |
| JP | 7-029364 | 1/1995 |
| JP | 7-037376 | 2/1995 |
| JP | 7-056654 | 3/1995 |
| JP | 7-111078 | 4/1995 |
| JP | 7-115497 | 5/1995 |
| JP | 7-201082 | 8/1995 |
| JP | 7-226023 | 8/1995 |
| JP | 7-230669 | 8/1995 |
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-510298 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2002269966 | 9/2002 |
| JP | 2006527893 | 12/2006 |
| JP | 2007505425 | 3/2007 |
| JP | 2007-87498 | 4/2007 |
| JP | 2007-188615 | 7/2007 |
| JP | 2007-220184 | 8/2007 |
| JP | 2007-293936 | 11/2007 |
| JP | 2007-305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| TW | M241773 | 9/1992 |
| TW | 387574 | 4/2000 |
| TW | M467353 | 12/2001 |
| TW | M317596 | 8/2007 |
| WO | WO 89/01682 | 2/1989 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

Abraham et al., "Thermal Proximity Imaging of Hard-Disk Substrates", IEEE Transactions on Mathematics 36:3997-4004, Nov. 2000.

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.

Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.

Anderson et al., "Clinical chemistry: concepts and applications", The McGraw-Hill Companies, Inc., pp. 131-132, 2003.

Anderson et al., "High Reliability Variable Load Time Controllable Vibration Free Thermal Processing Environment", Delphion, hhtps://www.delphion.com/tdbs/tdb?order=93A+63418, 3 pages, Mar. 18, 2009.

Asbrand, "Engineers at One Company Share the Pride and the Profits of Successful Product Design", Professional Issues, 4 pages, 1987.

Bair et al., "Measurements of Asperity Temperatures of a Read/Write Head Slider Bearing in Hard Magnetic Recording Disks", Journal of Tribology 113:547-554, Jul. 1991.

Bakken et al., "Low Cost, Rack Mounted, Direct Access Disk Storage Device", www.ip.com, 4 pages, Mar. 3, 2005.

Biber et al., "Disk Drive Drawer Thermal Management", Advances in Electronic Packaging vol. 1:43-46, 1995.

Christensen, "How Can Great firms Fail? Insights from the hard Disk Drive Industry", Harvard Business School Press, pp. 1-26, 2006.

Chung et al., "Vibration Absorber for Reduction of the In-plane Vibration in an Optical Disk Drive", IEEE Transactions on Consumer Electronics, Vo. 48, May 2004.

Curtis et al., "InPhase Professional Archive Drive Architecture" Dec. 17, 2007 http://www.science.edu/TechoftheYear/Nominees/InPhase/Holographic%20Storage.pdf.

Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.

FlexStar Technology, 30E/Cascade Users Manual, Doc #98-36387-00 Rev. 1.8, pp. 1-33.

FlexStar Technology, "A World of Storage Testing Solutions," http://www.flexstar.com, 1 page.

FlexStar Technology, "Environment Chamber Products," http://www.flexstar.com, 1 page (1999).

FlexStar Technology, "FlexStar's Family of Products," http://www.flexstar.com, 1 page (1999).

Frankovich, "The Basics of Vibration Isolation Using Elastomeric Materials", EARSC, 2005 http://www.isoloss.com/pdfs/engineering/BasicsofVibrationIsolation.pdf.

Grochowski et al., "Future Trends in Hard Disk Drives" IEEE Transactions on Magnetics, vol. 32, No. 3, pp. 1850-1854, May 1996 http://svn.tribler.org/abc/branches/leo/dataset/preferences/johan/johan-68.pdf.

Gurumurthi et al., "Disk Drive Roadmap from the Thermal Perspective: A Case for Dynamic Thermal Management", International Symposium on Computer Architecture, Proceedings of the $32^{nd}$ Annual International Symposium on Computer Architecture, IEEE Computer Society, pp. 38-49, 2005 http://portal.acm.org/citation.cfm?id=1069807.1069975.

Gurumurthi, "The Need for temperature-Aware Storage Systems", The Tenth Intersociety conference on Thermal and Thermomechanical Phenomena in Electronics, ITHERM pp. 387-394, 2006.

Gurumurthi et al., "Thermal Issues in Disk Drive Design: Challenges and Possible Solutions", ACM Transactions on Storage 2:41-73, Feb. 2006.

Haddad et al., "A new Mounting Adapter for Computer Peripherals with Improved Reliability, Thermal Distribution, Low Noise and Vibration Reduction", ISPS, Advances In Information Storage and Processing Systems, 1:97-108, 1995.

Henderson, "HAD High Aerial Densities Require Solid Test Fixtures", Flexstar Technology.

HighBeam Research website "ACT debuts six-zone catalytic gas heater. (American Catalytic Technologies offers new heaters)" www.highbeam.com, 4 pages, 1998.

HighBeam Research website "Asynchronous Testing Increases Throughput." www.highbeam.com, 7 pages, 2000.

HighBeam Research website "Credence announces Production Release of the EPRO AQ Series for Integrated Test and Back-end Processing." www.highbeam.com, 4 pages, 1995.

HighBeam Research website "Test Multiple Parts At Once for Air Leaks. (Brief Article)", www.highbeam.com, 1 page, 1999.

Iwamiya, "Hard Drive Cooling Using a Thermoelectric Cooler", EEP—vol. 19-2, Advances in Electronic Packaging, vol. 2:2203-2208, ASME 1997.

Johnson et al., "Performance Measurements of Tertiary Storage Devices", Proceedings of the $24^{th}$ VLDB Conference, New York, pp. 50-61, 1998.

Ku, "Investigation of Hydrodynamic Bearing Friction in Data Storage information System Spindle Motors", ISPSvol. 1, Advances in Information Storage and Processing Systems, pp. 159-165, ASME 1995.

Lindner, "Disk drive mounting", IBM Technical Disclosure Brochure, vol. 16, No. 3, pp. 903-904, Aug. 1973.

McAuley, "Recursive Time Trapping for Synchronization of Product and CHAMBER Profiles for Stress Test", Delphion, www.delphion.com/tdbs/tdb?order=88A+60957, 3 pages, Mar. 18, 2009.

Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.

Morris, "Zero Cost Power and Cooling Monitor System", www.delphion.com/tdbs/tdb?order=94A+61950, 3 pages, Jan. 15, 2008.

Nagarajan, "Survey of Cleaning and cleanliness Measurement in Disk Drive Manufacture", North Carolina Department of Environment and Natural Resources, Feb. 1997.

Notification of Transmittal of the International Search Report and the Written Opinion of the International Searching Authority, or the Declaration, PCT/US2008/086181, 15 pages, Mar. 16, 2009.

Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.

Prater et al., "Thermal and Heat-Flow Aspects of Actuators for Hard Disk Drives", InterSociety Conference on Thermal Phenomena, pp. 261-268, 1994.

Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.

Seagate Product Marketing, "Seagate's Advanced Multidrive System (SAMS) Rotational Vibration Feature", Publication TP-229D, Feb. 2000.

Schroeder et al., "Disk Failures in the Real World: What does an MTTP of 1,000,000 hours mean to you?", In FAST'07: $5^{th}$ USENIX Conference on File and Storage Technologies, San Jose, CA, Feb. 14-16, 2007.

Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.

Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.

Tzeng, "Dynamic Torque Characteriestics of Disk-Drive Spindle Bearings", ISPS—vol. 1, Advances in Information Storage and Processing Systems, pp. 57-63, ASME 1995.

Tzeng, "Measurements of Transient Thermal Strains in a Disk-Drive Actuator", InterSociety conference on Thermal Phenomena, pp. 269-274, 1994.

Wilson-7000 disk Drive Analyzer Product Literature, date accessed Jan. 28, 2009, 2 pages.

Winchester, "Automation Specialists Use Machine Vision as a System Development Tool", IEE Computing & Control Engineering, Jun./Jul. 2003.

Xyratex website "Storage Infrastructure" www.xyratex.com/Products/storage-infrastructure/default.aspx 1995-2008.

Xyratex website "Production Test Systems" www.xyratex.com/Products/production-test-systems/default.aspx 1995-2008.

Xyratex website "Single-cell—Production Test Systems" www.xyratex.com/products/production-test-systems/single-cell.aspx 1995-2008.

Xyratex website "Continuous Innovation—Production Test Systems" www.xyratex.com/products/production-test-systems/continuous-innovation.aspx 1995-2008.

Xyratex website "Key Advantages—Production Test Systems" www.xyratex.com/products/production-test-systems/advantages.aspx 1995-2008.

Xyratex website "Testing Drives Colder—Production Test Systems" www.xyratex.com/products/productino-test-systems/colder.aspx 1995-2008.

"Xyratex to Debut its New Automated Test Solution for 2.5-Inch Disk Drives at DISKCON USA 2004" 2004 PR Newswire Europe www.prnewswire.co.uk/cgi/news/release?id=130103.

"Automated Production Test Solutions", Xyratex Product Test brochure, 2006.

Xyratex "Process Challenges in the Hard Drive Industry" slide presentation, 2006 Asian Diskcon.

Suwa et al., "Evaluation System for Residual Vibration from HDD Mounting Mechanism" IEEE Transactions on Magnetics, vol. 35, No. 2, pp. 868-873, Mar. 1999.

Suwa et al., "Rotational Vibration Suppressor" IBM Technical Disclosure Bulletin Oct. 1991.

Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.

Annex to Form PCT/ASA/206 Communication Relating to the Results of the Partial International Search, for International Application No. PCT/US2008/086814, dated Apr. 3, 2009, 5 pages.
Annex to Form PCT/ASA/206 Communication Relating to the Results of the Partial International Search, for International Application No. PCT/US2008/086809, dated Apr. 3, 2009, 1 page.
Notification of Transmittal of the International Search Report and the Written Opinion of the International Searching Authority, or the Declaration, for International Application No. PCT/US2009/039926, Sep. 1, 2009, 13 pages.
Notification of Transmittal of the International Search Report and the Written Opinion of the International Searching Authority, or the Declaration, for International Application No. PCT/US2009/039591, Aug. 31, 2009, 10 pages.
Notification of Transmittal of the International Search Report and the Written Opinion of the International Searching Authority, or the Declaration, for International Application No. PCT/US2008/086814, Sep. 18, 2009, 17 pages.
Notification of Transmittal of the International Search Report and the Written Opinion of the International Searching Authority, or the Declaration, for International Application No. PCT/US2009/039888, Sep. 28, 2009, 13 pages.
Notification of Transmittal of the International Search Report and the Written Opinion of the International Searching Authority, or the Declaration, for International Application No. PCT/US2009/039921, Sep. 25, 2009, 14 pages.
Notification of Transmittal of the International Search Report and the Written Opinion of the International Searching Authority, or the Declaration, International Application No. PCT/US2009/040058, Sep. 29, 2009, 13 pages.
Notification of Transmittal of the International Search Report and the Written Opinion of the International Searching Authority, or the Declaration, for International Application No. PCT/US2009/040829, Oct. 28, 2009, 13 pages.
Notification of Transmittal of the International Search Report and the Written Opinion of the International Searching Authority, or the Declaration, for International Application No. PCT/US2009/039590, Oct. 30, 2009, 10 pages.
Notification of Transmittal of the International Search Report and the Written Opinion of the International Searching Authority, or the Declaration, for International Application No. PCT/US2009/040835, Oct. 30, 2009, 13 pages.
Notification of Transmittal of the International Search Report and the Written Opinion of the International Searching Authority, or the Declaration, for International Application No. PCT/US2009/040757, Nov. 24, 2009, 12 pages.
Notification of Transmittal of the International Search Report and the Written Opinion of the International Searching Authority, or the Declaration, for International Application No. PCT/US2009/039898, Nov. 24, 2009, 12 pages.
Notification of Transmittal of the International Search Report and the Written Opinion of the International Searching Authority, or the Declaration, for International Application No. PCT/US2009/040795, Nov. 26, 2009, 13 pages.
Notification of Transmittal of the International Search Report and the Written Opinion of the International Searching Authority, or the Declaration, for International Application No. PCT/US2009/045583, Nov. 27, 2009, 13 pages.
Notification of Transmittal of the International Search Report and the Written Opinion of the International Searching Authority, or the Declaration, for International Application No. PCT/US2009/040888, Dec. 29, 2009, 14 pages.
Notification of Transmittal of the International Search Report and the Written Opinion of the International Searching Authority, or the Declaration, for International Application No. PCT/US2009/040894, Dec. 22, 2009, 12 pages.
Notification of Transmittal of the International Search Report and the Written Opinion of the International Searching Authority, or the Declaration, for International Application No. PCT/US2009/039934, Dec. 23, 2009, 12 pages.

Notification of Transmittal of the International Search Report and the Written Opinion of the International Searching Authority, or the Declaration, for International Application No. PCT/US2009/040965, Dec. 23, 2009, 12 pages.
Notification of Transmittal of the International Search Report and the Written Opinion of the International Searching Authority, or the Declaration, for International Application No. PCT/US2009/040973, Jan. 11, 2010, 13 pages.
Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/727,150. The foregoing U.S. patent application is a continuation of U.S. Appl. No. 12/104,536.
Cardinal Intellectual Property's search report including the results of a search for the features of the claims included in the U.S. patent application entitled "Transferring Storage Devices Within Storage Device Testing Systems", inventors: John P. Toscano et al., and having assigned U.S. Appl. No. 12/727,201. The foregoing U.S. patent application is a continuation of U.S. Appl. No. 12/424,980.
Cardinal Intellectual Property's search report including the results of a search for the features of the claims included in the U.S. patent application entitled "Processing Storage Devices", inventors: Richard W. Slocum III., and having assigned U.S. Appl. No. 12/727,619. The foregoing U.S. patent application is a contiuation of U.S. patent application No. 12/474,388.
Cardinal Intellectual Property's search report including the results of a search for the features of the claims included in the U.S. patent application entitled "Bulk Feeding Disk Drives To Disk Drive Testing Systems", inventors: Noble et al., and having assigned U.S. Appl. No. 12/726,856. The foregoing U.S. patent application is a continuatin of the U.S. Appl. No. 12/104,869.
Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069.
Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700, The foregoing U.S. patent application is a continuation of U.S. Appl. No. 12/503,561.
Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575.
Cardinal Intellectual Property's search report including the results of a search for the features of the claims included in the U.S. patent application entitled "Conductive Heating", inventors: Brian S. Merrow et al., and having assigned U.S. Appl. No. 12/760,164. The foregoing U.S. application is a continuation of U.S. Appl. No. 12/503,593.
Cardinal Intellectual Property's search report including the results of a search for the features of the claims included in the U.S. patent application entitled "Storage Device Temperature Sensing", inventors: Brian S. Marrow et al., and having assigned U.S. Appl. No. 12/760,305. The foregoing U.S. patent application is a continuation of U.S. Appl. No. 12/503,687.
Cardinal Intellectual Property's search report including the results of a search for the features of the claims included in the U.S. patent application entitled "Solid State Temperature Control fo Hand Drive Tester", inventors: Brian S. Merrow and having assigned U.S. Appl. No. 12/856,056. The foregoing U.S. patent application is a continuation of U.S. Appl. No. 12/105,103.
Cardinal Intellectual Property's search report including the results of a search for the features of the claims included in the U.S. patent application entitled "Vibration Isolation Within Disk Drive Testing Systems", inventors: Brian S. Merrow and having assigned U.S.

Appl. No. 12/767,142. The foregoing U.S. patent application is a continuatin of the U.S. Appl. No. 12/105,105.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/766,680. The foregoing U.S. patent application is a continuatin of the U.S. Appl. No. 11/959,133.

Cardinal Intellectual Property's search report including the results of a search for the features of the claims included in the U.S. patent application entitled "Chilled Water Temp Control of Disk Drive Tester", inventors: Brian S. Merrow and having assigned U.S. Appl. No. 12/937,918. The foregoing U.S. patent application is a continuatin of the U.S. Appl. No. 12/105,061.

Cardinal Intellectual Property's search report including the results of a search for the features of the claims included in the U.S. patent application entitled "Vibration Isolation Within Disk Drive Testing Systems", inventors: Brian S. Merrow and having assigned U.S. Appl. No. 12/767,142. The foregoing U.S. patent application is a continuatin of the U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/767,113. The foregoing U.S. patent application is a continuatin of the U.S. Appl. No. 11/959,133.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/766,680. The foregoing U.S. patent application is a continuatin of the U.S. Appl. No. 11/959,133. Revised as of Apr. 1, 2010.

International Preliminary Report on Patentability for International Application No. PCT/US2009/040888 dated Oct. 27, 2011.

Office Action from corresponding Japanese Patent Application No. 2011-509528, mailed Apr. 3, 2012, with English translation, 4 pages.

Response to Office Action from corresponding Japanese Patent Application No. 2011-509528, filed on Jun. 29, 2012, with English translation, 24 pages.

Office action dated Oct. 30, 2012 from corresponding Japanese application No. 2010-539630, 9 pgs.

Machine translation of TW241773.

Machine translation of TW467353.

Office Action dated Oct. 31, 2012 from corresponding Chinese Patent Application No. 200980104364.1, 6 pgs.

Exhibit 1 in *Xyratex Technology, Ltd v. Teradyne, Inc.*; Newspaper picture that displays the CSO tester; 1990.

Exhibit 2 in *Xyratex Technology, Ltd v. Teradyne, Inc.*; Photos of the CSO tester obtained from Hitachi; 1990.

Exhibit 1326 in *Xyratex Technology, Ltd v. Teradyne, Inc.*; Image of the back of Exhibit 1 and Exhibit 2 photos, which display the photos' dates; 1990.

Exhibit 1314 in *Xyratex Technology, Ltd. V. Teradyne, Inc.*; Case, "Last products of Disk-File Development at Hursley and Millbrook," IBM, Oct. 12, 1990.

Exhibit 1315 in *Xyratex Technology, Ltd. V. Teradyne, Inc.*; Case, "History of Disk-File Development at Hursley and Millbrook," IBM, Oct. 17, 1990.

*Xyratex Technology, Ltd. V. Teradyne, Inc.*, Teradyne, Inc's Prior Art Notice Pursuant to 35 U.S.C. Section 282. Case No. CV 08-04545 SJO (PLAx), Oct. 16, 2009.

*Xyratex Technology, Ltd. V. Teradyne, Inc.*, Amended Joint Trial Exhibit List of Xyratex and Teradyne. Case No. CV 08-04545 SJO (PLAx), Nov. 12, 2009.

Notification of Transmittal of the International Search Report and the Written Opinion of the International Searching Authority, or the Declaration, for International Application No. PCT/GB2005/003490, Jan. 26, 2006, 10 pages.

FlexStar Technology, 30E/Cascade Users Manual, Doc #98-36387-00 Rev. 1.8, pp. 1-33, Jun. 1, 2004.

Henderson, "HAD High Aerial Densities Require Solid Test Fixtures", Flexstar Technology, Feb. 26, 2007.

Cardinal Intellectual Property's search report including the results of a search for the features of the claims included in the U.S. patent application entitled "Transferring Disk Drives Within Disk Drive Testing Systems", with inventors: Polyakov et al, and having assigned U.S. Appl. No. 12/727,150. The foregoing U.S. patent application is a continuation of U.S. Appl. No. 12/104,536. Revised as of May 27, 2010.

Cardinal Intellectual Property's search report including the results of a search for the features of the claims included in the U.S. patent application entitled "Transferring Storage Devices Within Storage Device Testing Systems", with inventors: John P. Toscano et al., and having assigned U.S. Appl. No. 12/727,201. The foregoing U.S. patent application is a continuation of U.S. Appl. No. 12/424,980. Revised as of Jan. 4, 2010.

Cardinal Intellectual Property's search report including the results of a search for the features of the claims included in the U.S. patent application entitled "Processing Storage Devices", with inventors: Richard W. Slocum III., and having assigned U.S. Appl. No. 12/727,619. The foregoing U.S. patent application is a continuation of U.S. Appl. No. 12/474,388. Revised as of Jan. 5, 2010.

Cardinal Intellectual Property's search report including the results of a search for the features of the claims included in the U.S. patent application entitled "Bulk Feeding Disk Drives to Disk Drive Testing Systems", with inventors: Noble et al., and having assigned U.S. Appl. No. 12/726,856. The foregoing U.S. patent application is a continuation of U.S. Appl. No. 12/104,869. Revised as of Jan. 15, 2010.

Cardinal Intellectual Property's search report including the results of a search for the features of the claims included in the U.S. patent application entitled "Dependent Temperature Control Within Disk Drive Testing Systems", with inventors: Merrow et al., and having assigned U.S. Appl. No. 12/727,207. The foregoing U.S. patent application is a continuation of U.S. Appl. No. 12/105,069. Revised as of Jan. 13, 2010.

Cardinal Intellectual Property's search report including the results of a search for the features of the claims included in the U.S. patent application entitled "Test Slot Cooling System for a Storage Device Testing System", with inventors: Merrow et al., and having assigned U.S. Appl. No. 12/727,700. The foregoing U.S. patent application is a continuation of U.S. Appl. No. 12/503,567. Revised as of Jan. 13, 2010.

Cardinal Intellectual Property's search report including the results of a search for the features of the claims included in the U.S. patent application entitled "Storage Device Testing System Cooling", with inventors: Brian S. Merrow and having assigned U.S. Appl. No. 12/775,560. The foregoing U.S. patent application is a continuation of U.S. Appl. No. 12/698,575. Revised as of Feb. 17, 2010.

Cardinal Intellectual Property's search report including the results of a search for the features of the claims included in the U.S. patent application entitled "Conductive Heating", with inventors: Brian S. Merrow et al., and having assigned U.S. Appl. No. 12/760,164. The foregoing U.S. patent application is a continuation of U.S. Appl. No. 12/503,593. Revised as of Jan. 6, 2010.

Cardinal Intellectual Property's search report including the results of a search for the features of the claims included in the U.S. patent application entitled "Storage Device Temperature Sensing", with inventors: Brian S. Merrow et al., and having assigned U.S. Appl. No. 12/760,305. The foregoing U.S. patent application is a continuation of U.S. Appl. No. 12/503,687. Revised as of Jan. 7, 2010.

Cardinal Intellectual Property's search report including the results of a search for the features included in the U.S. patent application entitled "Solid State Temperature Control of Hard Drive Tester." Revised as of Jan. 14, 2010.

Cardinal Intellectual Property's search report including the results of a search for the features of the claims included in the U.S. patent application entitled "Vibration Isolation Within Disk Drive Testing Systems", with inventors: Brian S. Merrow and having assigned U.S. Appl. No. 12/767,142. The foregoing U.S. patent application is a continuation of U.S. Appl. No. 12/105,105. Revised as of Jan. 12, 2010.

Cardinal Intellectual Property's search report including the results of a search for the features of the claims included in the U.S. patent application entitled "Disk Drive Clamping Transport and Testing", with inventors: Brian S. Merrow et al., and having assigned U.S. Appl. No. 12/766,680. The foregoing U.S. patent application is a continuation of U.S. Appl. No. 11/959,133. Revised as of Jan. 14, 2010.

Cardinal Intellectual Property's search report including the results of a search for the features of the claims included in the U.S. patent application entitled "Chilled Water Temp Control of Disk Drive Tester", with inventors: Brian S. Merrow and having assigned U.S. Appl. No. 12/766,680. The foregoing U.S. patent application is a continuation of U.S. Appl. No. 12/105,061. Revised as of Feb. 18, 2010.

Cardinal Intellectual Property's search report including the results of a search for the features of the claims included in the U.S. patent application entitled "Vibration Isolation Within Disk Drive Testing Systems", with inventors: Brian S. Merrow and having assigned U.S. Appl. No. 12/767,142. The foregoing U.S. patent application is a continuation of U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing", with inventors: Brian S. Merrow et al., and having assigned U.S. Appl. No. 12/767,113. The foregoing U.S. patent application is a continuation of U.S. Appl. No. 11/959,133. Revised as of Apr. 4, 2010.

Cardinal Intellectual Property's search report including the results of a search for the features of the claims included in the U.S. patent application entitled "Disk Drive Clamping Transport and Testing", with inventors: Brian S. Merrow et al., and having assigned U.S. Appl. No. 12/766,680. The foregoing U.S. patent application is a continuation of U.S. Appl. No. 11/959,133. Revised as of Apr. 1, 2010.

\* cited by examiner

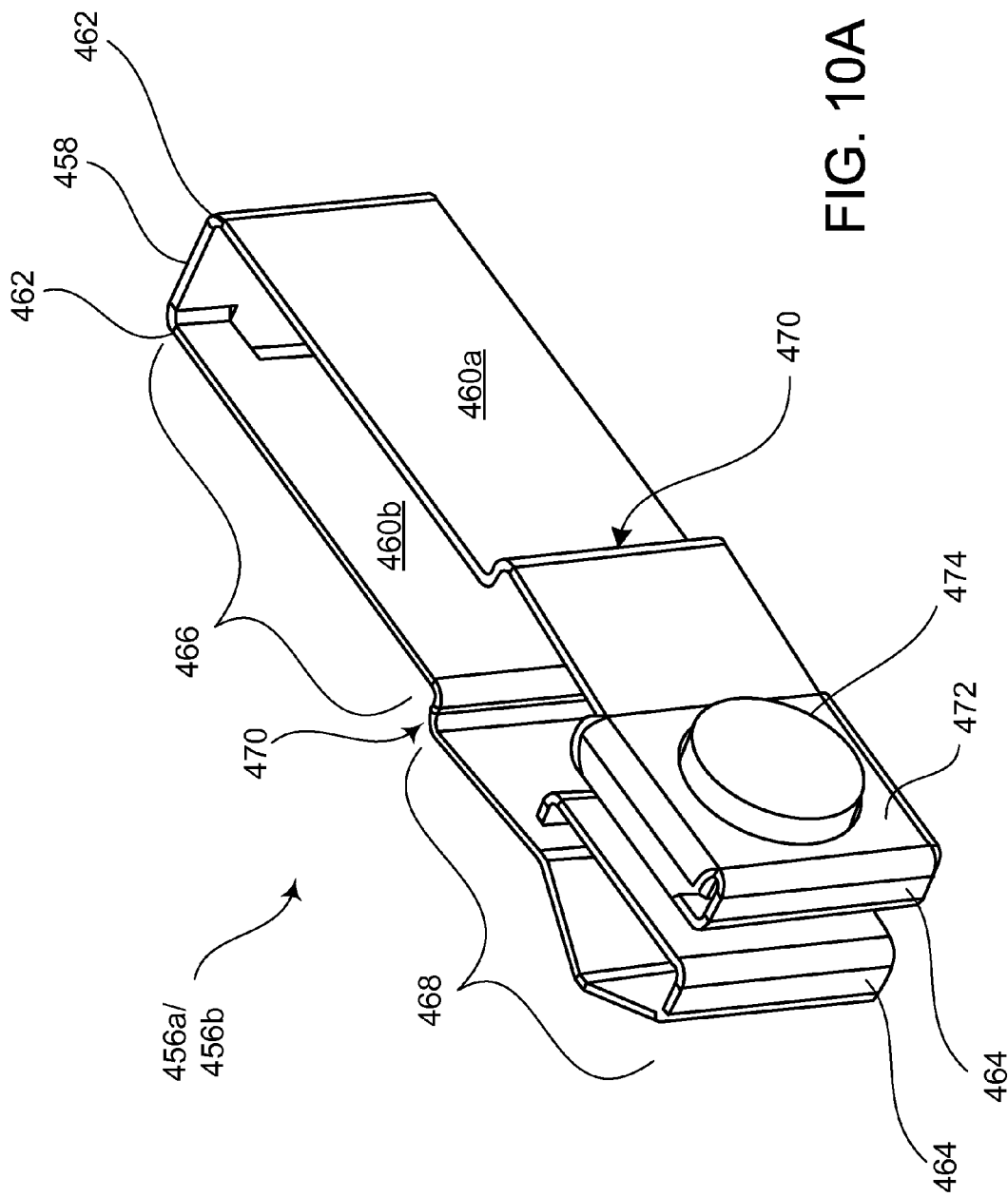

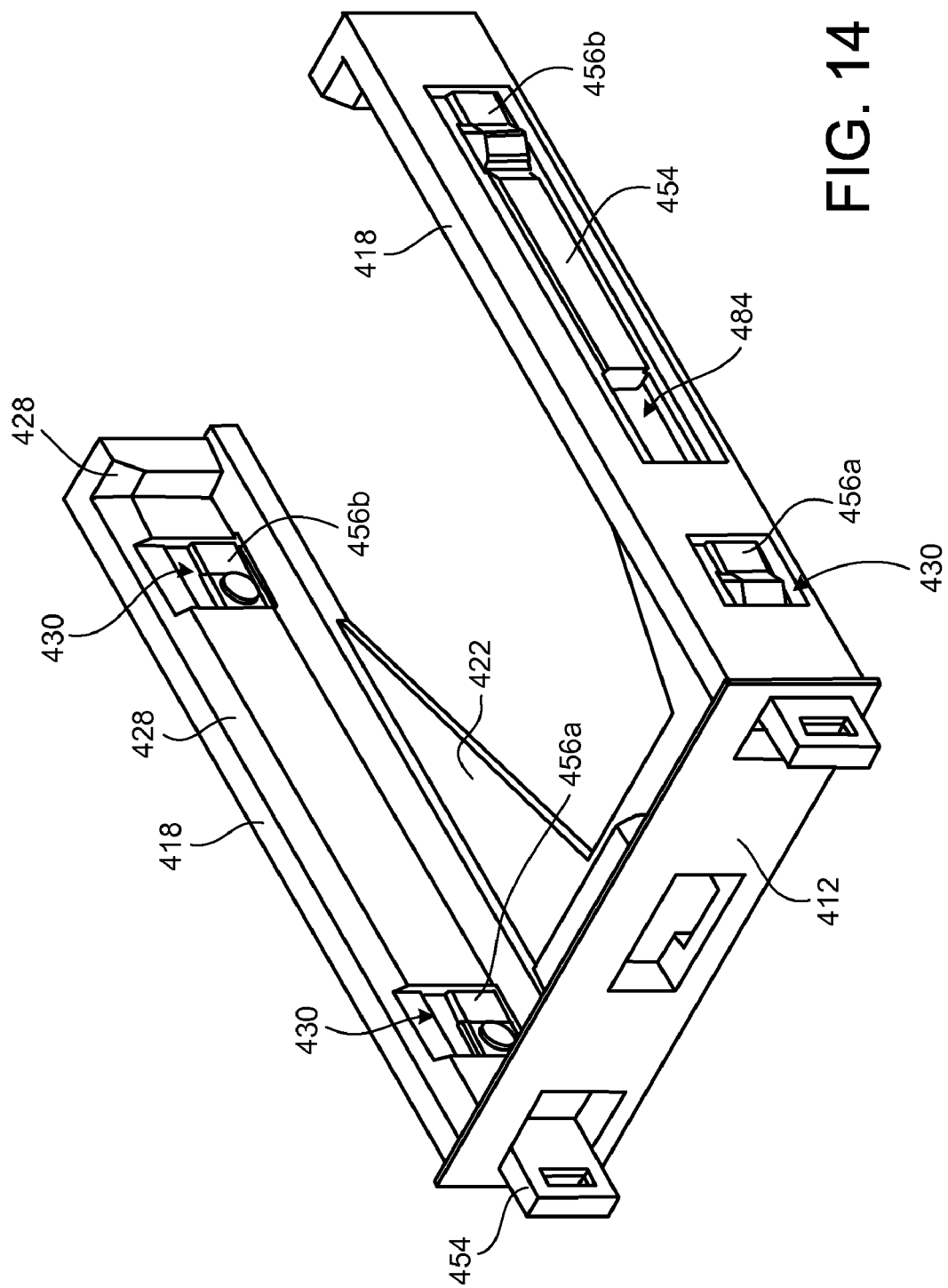

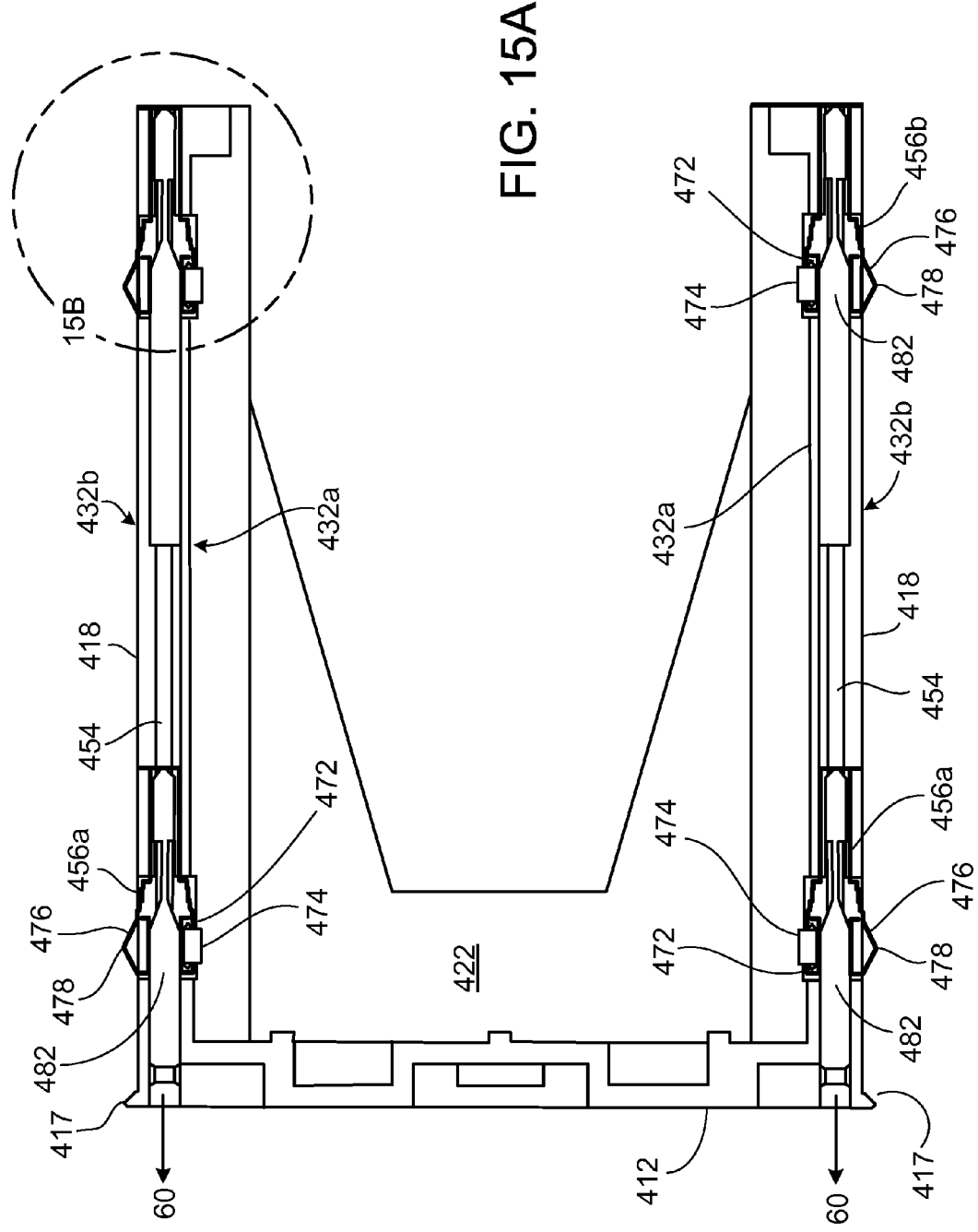

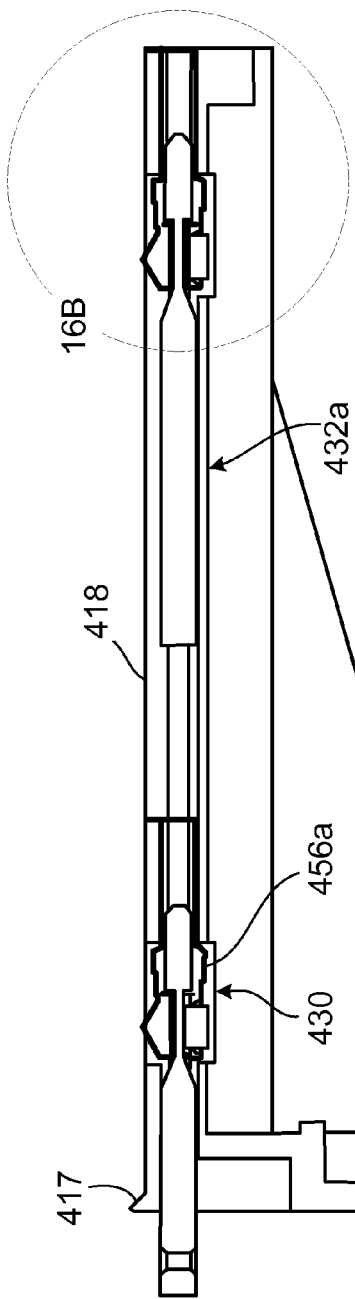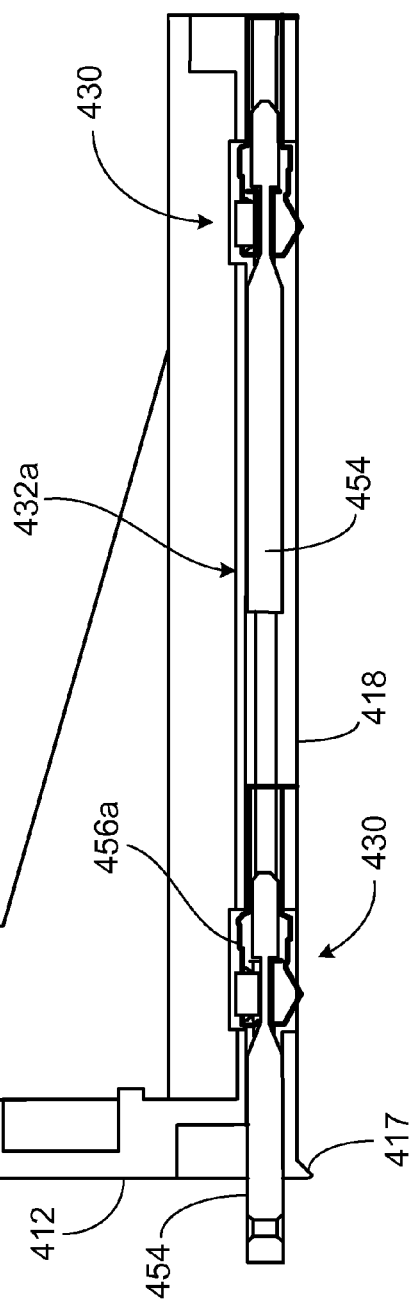
FIG. 16A

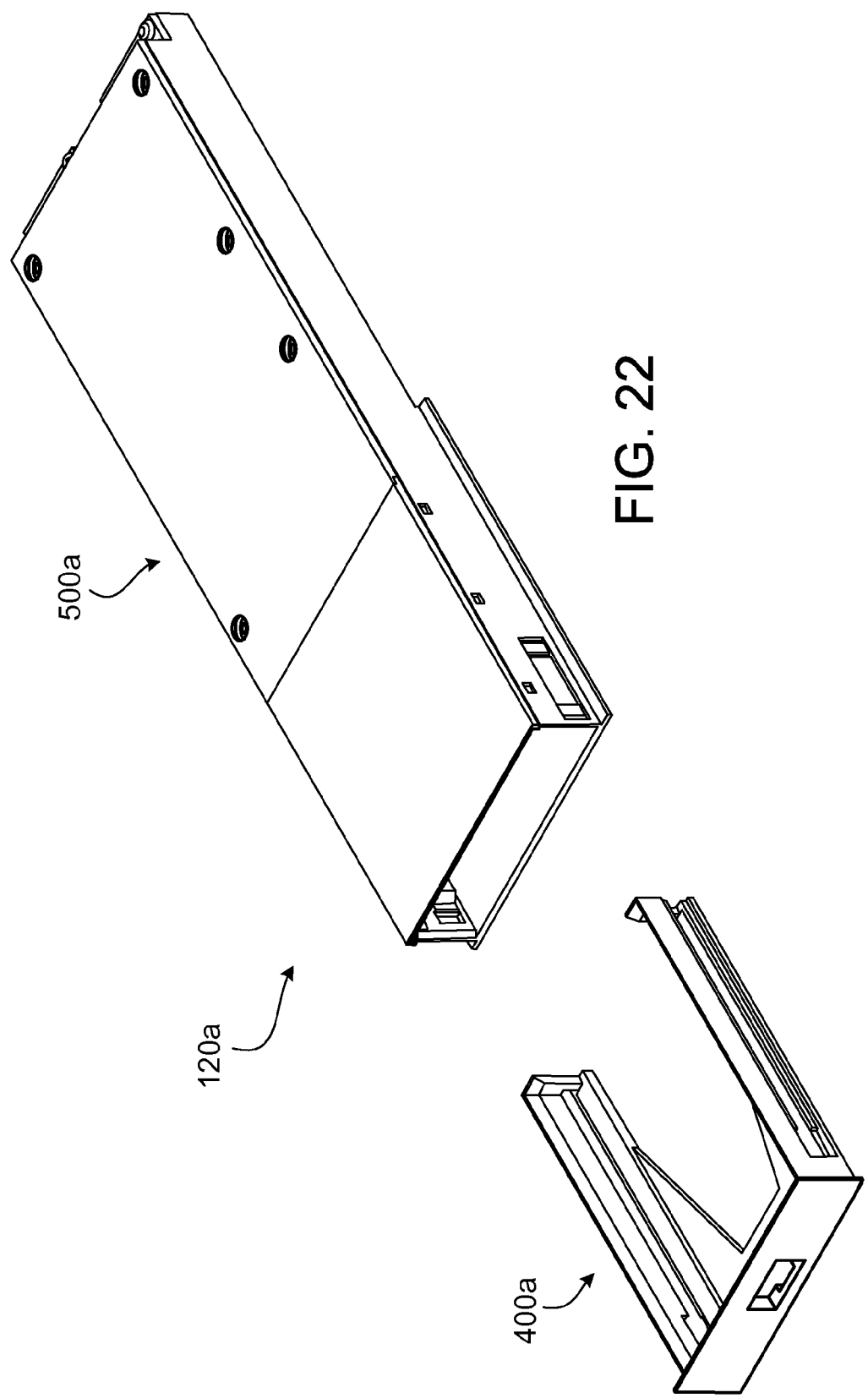

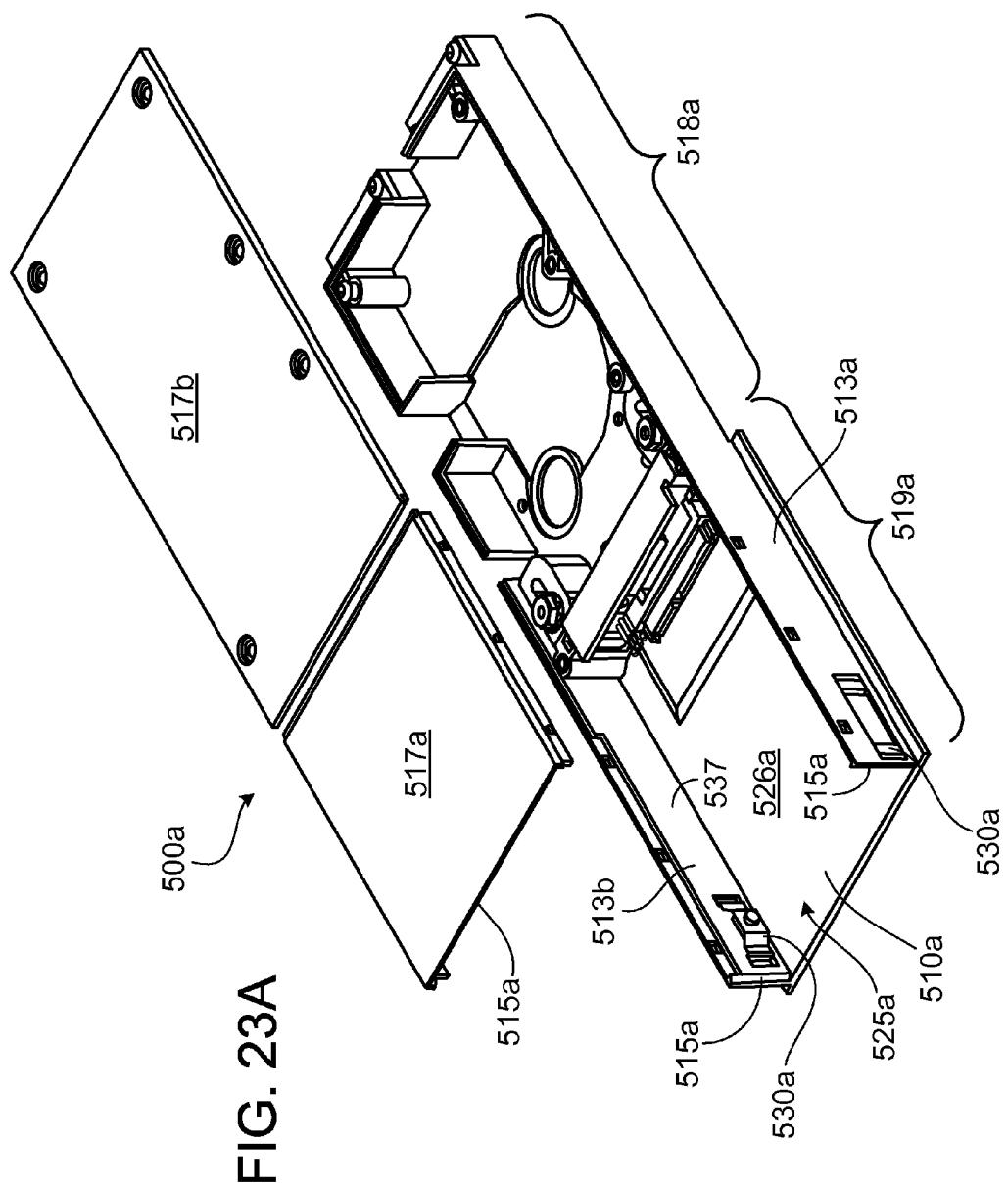

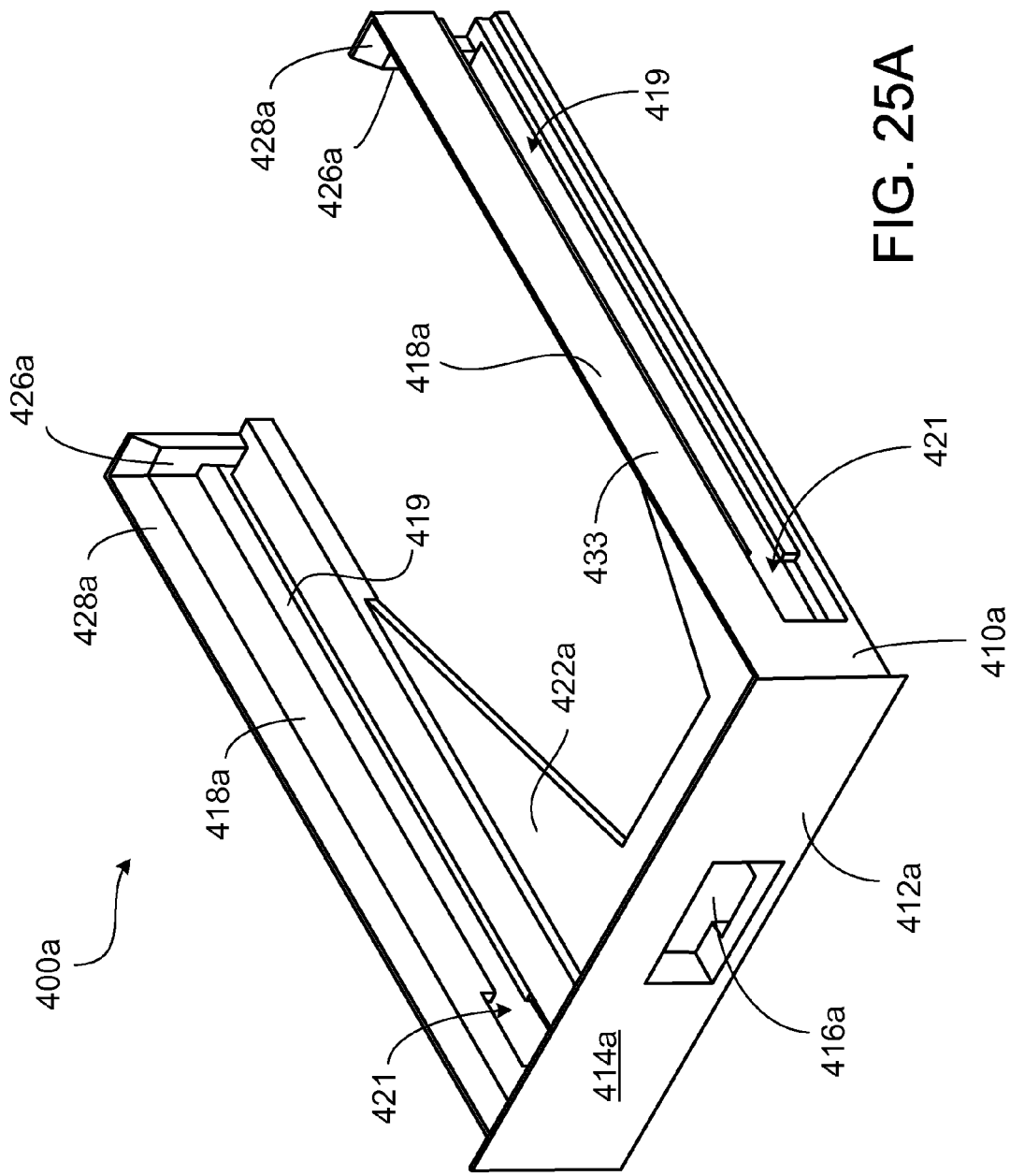

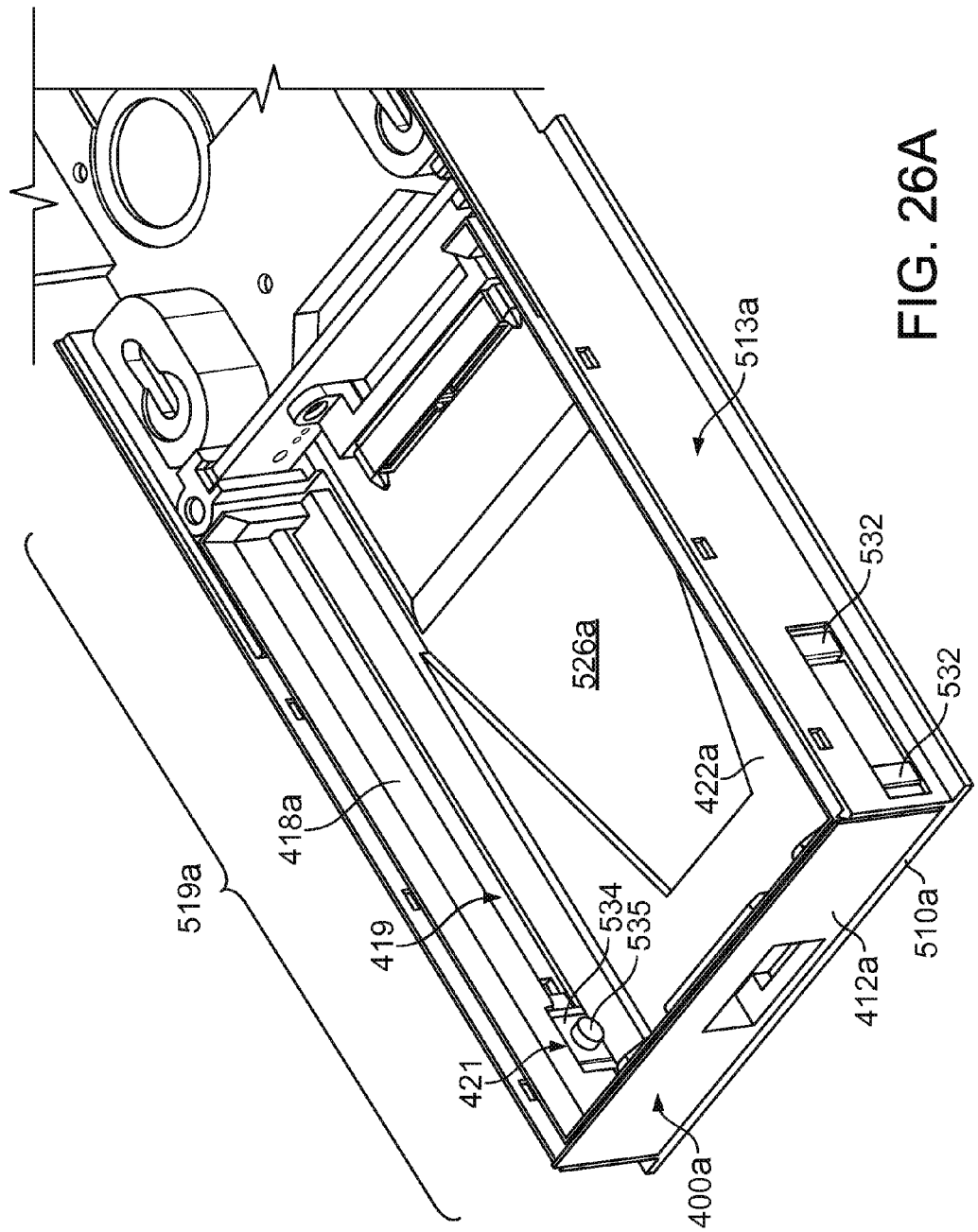

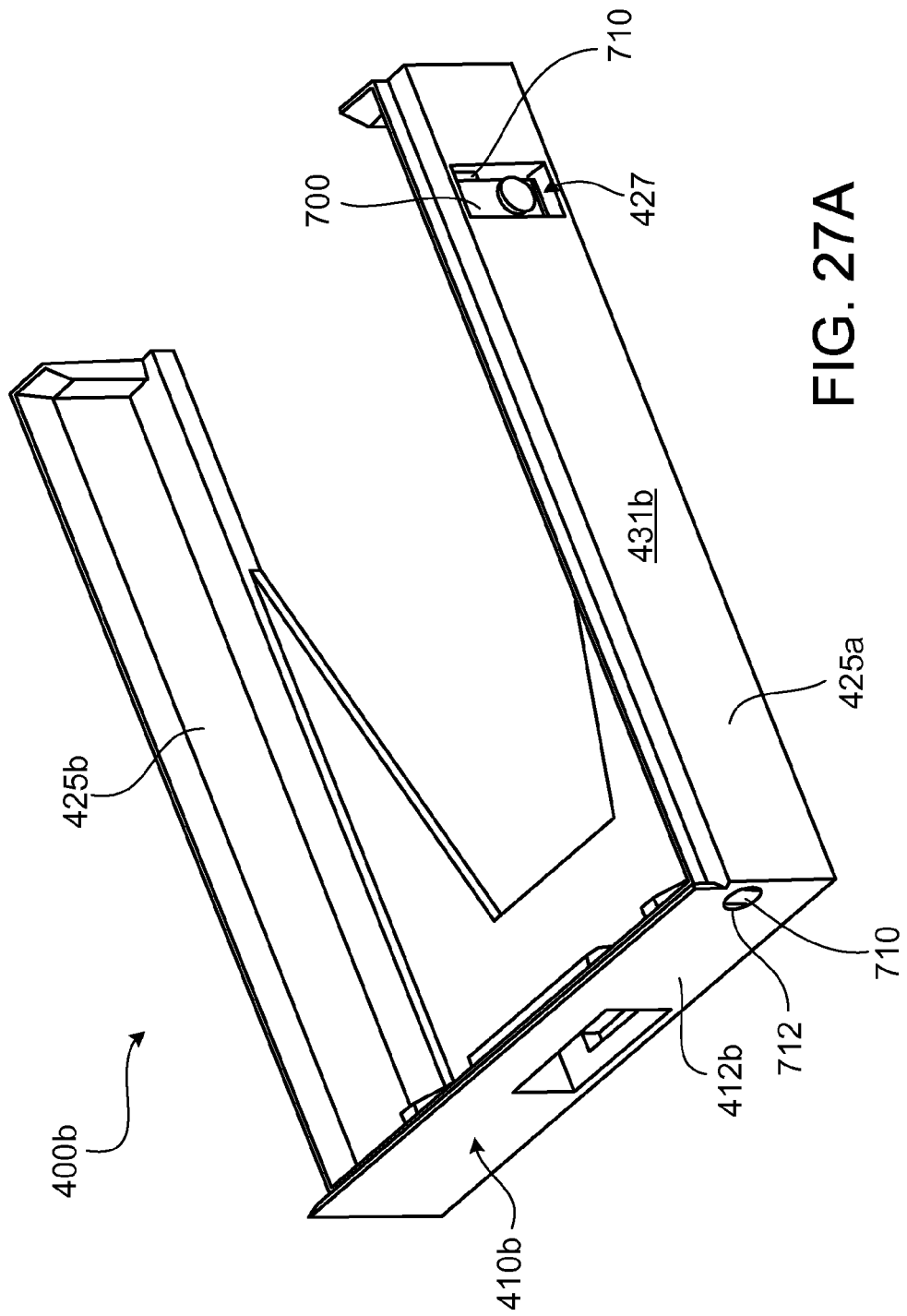

DISK DRIVE TRANSPORT, CLAMPING AND TESTING

CROSS REFERENCE TO RELATED APPLICATIONS

This application is a continuation and claims the benefit of priority under 35 U.S.C. §120 of U.S. application Ser. No. 11/959,133, filed Dec. 18, 2007. The disclosure of the prior application is considered part of, and is incorporated by reference in, the disclosure of this application.

TECHNICAL FIELD

This disclosure relates to the transport, clamping and testing of disk drives.

BACKGROUND

Disk drive manufacturers typically test manufactured disk drives for compliance with a collection of requirements. Test equipment and techniques exist for testing large numbers of disk drives serially or in parallel. Manufacturers tend to test large numbers of disk drives simultaneously or in batches. Disk drive testing systems typically include one or more tester racks having multiple test slots that receive disk drives for testing. In some cases, the disk drives are placed in carriers which are used for loading and unloading the disk drives to and from the test racks.

The testing environment immediately around the disk drive is closely regulated. Minimum temperature fluctuations in the testing environment are critical for accurate test conditions and for safety of the disk drives. The latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive runout (NRRO), which may result in lower yields and increased manufacturing costs. Current disk drive testing systems employ automation and structural support systems that contribute to excess vibrations in the system and/or require large footprints.

In some cases, in order to combat undesirable vibrations, disk drives are clamped to a carrier and/or to a tester rack in such a manner as to inhibit or dampen vibrations.

SUMMARY

In one aspect, a disk drive transporter, for transporting a disk drive and for mounting a disk drive within a test slot, includes a frame configured to receive and support a disk drive. The frame includes a pair of sidewalls configured to receive a disk drive therebetween and sized to be inserted into a test slot along with a disk drive. The frame also includes a clamping mechanism operatively associated with at least one of the sidewalls. The clamping mechanism includes a first engagement element and a first actuator operable to initiate movements of the first engagement element. The first actuator is operable to move the first engagement element into engagement with a test slot after a disk drive being supported by the frame is arranged in a test position in a test slot.

Embodiments can include one or more of the following features. In some embodiments, the first actuator is operable to move the first engagement element into engagement with a disk drive being supported by the frame.

In certain embodiments, the first engagement element includes first and second engagement members. In some cases, the first actuator is operable to initiate movements of the first and second engagement members.

In some embodiments, the first actuator is operable to move the first engagement member into engagement with a test slot after a disk drive being supported by the frame is arranged in a test position in a test slot. In some cases, the first actuator is operable to move the second engagement member into engagement with a disk drive being supported by the frame.

In certain embodiments, the second engagement member includes a dampener. The dampener may include a dampening material selected from thermoplastics and/or rubberthermosets. The dampener may include an isolating or dampening material.

In some embodiments, the first actuator is operable to move the first and second engagement members in substantially opposite directions relative to each other. In some cases, the first actuator is operable to move the first and second engagement members substantially simultaneously.

In certain embodiments, the first engagement element includes a protuberance configured to engage a mating feature in a test slot.

In some embodiments, the first engagement element includes a dampener. The dampener may include a dampening material selected from thermoplastics and/or rubberthermosets.

In certain embodiments, the first engagement element includes a spring clamp. The spring clamp includes a base portion and first and second spring arms. The first and second spring arms each include a proximal end connected to the base portion and a displaceable distal end. In some cases, the actuator is operable to initiate movements of the distal ends of the first and second spring arms.

In some embodiments, the first actuator is pivotable relative to the frame to initiate movements of the first engagement element.

In certain embodiments, the first actuator includes an elongate body extending from a proximal end to a distal end along a first axis. The first actuator is rotatable about the first axis to initiate movements of the first engagement member.

In some embodiments, the first actuator is linearly displaceable relative to the frame to initiate movements of the first engagement member.

In certain embodiments, a first one of the sidewalls defines a first actuator slot, and the first actuator is at least partially disposed within the first actuator slot. In some cases, the first actuator is moveable within the first actuator slot to initiate movements of the first engagement member.

In some embodiments, the clamping mechanism includes a second engagement element, and the first actuator is operable to initiate movements of the second engagement element. In some cases, the first actuator is operable to move the second engagement element into engagement with a test slot after a disk drive being supported by the frame is arranged in a test position in the test slot. In some cases, the first actuator is operable to move the second engagement element into engagement with a disk drive being supported by the frame.

In certain embodiments, the clamping mechanism includes a second engagement element, and a second actuator operable to initiate movements of the second engagement element. In some cases, the second actuator is operable independently of the first actuator to initiate movements of the second engagement element. In certain cases, the second actuator is operable to move the second engagement element into engagement with a test slot after a disk drive being supported by the frame is arranged in a test position in a test slot. In some cases, the second actuator is operable to move the second engagement element into engagement with a disk drive being supported by the frame.

In some embodiments. the first actuator defines actuating features for initiating movements of the first engagement element. In some cases, the actuating features include wedges and recesses.

In certain embodiments, the frame includes a base plate connected to the sidewalls. In some cases, the sidewalls and the base plate together define a substantially U-shaped opening for capturing a disk drive off of a support.

In another aspect, a disk drive test slot includes a housing that defines a test compartment for receiving and supporting a disk drive transporter carrying a disk drive for testing. The housing also defines an open end that provides access to the test compartment for insertion and removal of disk drive transporter carrying a disk drive for testing. The test slot also includes a first engagement element mounted to the housing. The first engagement element is configured to engage a disk drive carried by a disk drive transporter when a disk drive transporter is inserted in the test compartment.

Embodiments can include one or more of the following features. In some embodiments, the first engagement element includes a clamping spring.

In certain embodiments, the first engagement element includes a dampener. In some cases, the dampener is configured to engage a disk drive carried by a disk drive transporter when a disk drive transporter is inserted in the test compartment. In certain cases, the dampener includes a dampening material that includes thermoplastics and rubberthermosets.

In a further aspect, a disk drive testing system includes automated machinery and a disk drive transporter. The disk drive transporter includes a frame configured to receive and support a disk drive. The automated machinery is configured to releasably engage the frame to control movement of the disk drive transporter. The disk drive testing system also includes a loading station for storing disk drives to be tested, and a test slot configured to receive and support a disk drive transporter carrying a disk drive. The automated machinery is operable to remove disk drives from the loading station utilizing the disk drive transporter and insert the disk drive transporter, having a disk drive therein, into the test slot.

Embodiments can include one or more of the following features. In some embodiments, the automated machinery includes a robot. The robot can include, for example, a moveable arm and a manipulator connected to the moveable arm. In some cases, the manipulator is configured to releasably engage the frame to control movement of the disk drive transporter. In certain cases, the robot is operable to remove disk drives from the loading station utilizing the disk drive transporter and insert the disk drive transporter, having a disk drive therein, into the test slot.

In certain embodiments. the frame includes a face plate defining an indentation configured to be releasably engageable by the automated machinery.

In some embodiments, the frame includes a clamping mechanism. In some cases, the clamping mechanism includes a first engagement element and a first actuator operable to initiate movements of the first engagement element. In certain examples, the first actuator is operable to move the first engagement element into engagement with the test slot after a disk drive being supported by the frame is arranged in a test position in the test slot. In certain cases, the automated machinery is configured to control operation of the clamping mechanism. In some cases, the frame includes a pair of sidewalls configured to receive a disk drive therebetween and sized to be inserted into a test slot along with a disk drive for testing of the disk drive. In some examples, the clamping mechanism is operatively associated with at least one of the sidewalls.

In yet another aspect, a disk drive transporter, for transporting a disk drive and for mounting a disk drive within a test slot, includes a frame having a pair of sidewalls configured to receive a disk drive therebetween and sized to be inserted into a test slot along with a disk drive. The frame also includes a base plate connecting the sidewalls. The sidewalls and the base plate together define a substantially U-shaped opening for capturing a disk drive off of a support.

In a further aspect, a method of testing a disk drive includes actuating automated machinery to engage a disk drive transporter; capturing a disk drive with the disk drive transporter; and then actuating the automated machinery to insert the disk drive transporter and the captured disk drive into a test slot. Capturing the disk drive includes moving the disk drive transporter into engagement with the disk drive using the automated machinery.

Embodiments can include one or more of the following features. In certain embodiments, actuating the automated machinery includes actuating a robotic arm.

In some embodiments, the disk drive transporter includes a clamping mechanism operable to clamp the disk drive transporter to the test slot, and the method includes actuating the automated machinery to operate the clamping assembly and thereby clamping the disk drive transporter to the test slot after the disk drive transporter and the captured disk drive are inserted into the test slot.

In certain embodiments, capturing the disk drive includes actuating the automated machinery to move the disk drive transporter into a position underlying the disk drive; and actuating the automated machinery to raise the disk drive transporter into a position engaging the disk drive.

In another aspect, a method of testing a disk drive includes actuating automated machinery to insert a disk drive transporter carrying a disk drive into a test slot, and actuating the automated machinery to operate a clamping mechanism and thereby clamping the disk drive transporter to the test slot after the disk drive transporter and the captured disk drive are inserted into the test slot.

Embodiments can include one or more of the following features. In some embodiments, actuating automated machinery includes actuating a robotic arm.

In certain embodiments, the method may include actuating the automated machinery to engage the clamping assembly and thereby clamping the disk drive transporter to the captured disk drive.

In a further aspect, a test slot assembly includes a test slot and a disk drive transporter. The test slot includes a housing that defines a test compartment, and an open end, which provides access to the test compartment. The disk drive transporter includes a frame configured to receive and support a disk drive. The frame includes a pair of sidewalls configured to receive a disk drive therebetween and sized to be inserted into the test compartment along with a disk drive. The frame also includes a clamping mechanism operatively associated with at least one of the sidewalls. The clamping mechanism includes a first engagement element and a first actuator operable to initiate movements of the first engagement element. The first actuator is operable to move the first engagement element into engagement with the housing after a disk drive being supported by the frame is arranged in a test position in the test compartment.

Embodiments can include one or more of the following features. In some embodiments, the first engagement element includes first and second engagement members, and the first actuator is operable to initiate movements of the first and second engagement members. In some examples, the first actuator is operable to move the first engagement member into engagement with the test slot after a disk drive being supported by the frame is arranged in a test position in the test compartment, and the first actuator is operable to move the second engagement member into engagement with a disk drive being supported by the frame. In some cases, the second engagement member includes a dampener. In some implementations, the first actuator is operable to move the first and second engagement members in substantially opposite directions relative to each other. In some examples, the first actuator is operable to move the first and second engagement members substantially simultaneously.

In certain embodiments, the housing includes a pair of upstanding walls configured to receive the sidewalls of the frame therebetween. In some cases, a first one of the upstanding walls includes an engagement feature, and the first engagement element includes a protuberance configured to engage the engagement feature. In some examples, the first actuator is operable to move the protuberance into engagement with the engagement feature after the sidewalls are inserted into the test compartment.

In still another aspect, a test slot assembly includes a disk drive transporter and a housing. The disk drive transporter includes a frame configured to receive and support a disk drive. The frame includes a pair of sidewalls configured to receive a disk drive therebetween. A first one of the sidewalls defines a pass-through aperture. The housing defines a test compartment for receiving and supporting the disk drive transporter, and an open end providing access to the test compartment for insertion and removal of the disk drive transporter. The test slot assembly also includes a first engagement element mounted to the housing. The first engagement element is configured to extend through the pass-through aperture to engage a disk drive carried by the disk drive transporter when the disk drive transporter is inserted in the test compartment.

In a further aspect, a disk drive testing system includes automated machinery and a disk drive transporter. The disk drive transporter includes a frame configured to receive and support a disk drive. The disk drive transporter also includes a clamping mechanism. The clamping mechanism includes a first engagement element, and a first actuator operable to initiate movements of the first engagement element. The automated machinery is configured to control operation of the clamping mechanism.

Embodiments can include one or more of the following features. In some embodiments, the automated machinery is configured to releasably engage the frame to control movement of the disk drive transporter In certain embodiments, the automated machinery includes a robot. The robot may include a moveable arm and a manipulator connected to the moveable arm. In some cases, for example, the manipulator is configured to releasably engage the frame to control movement of the disk drive transporter. In some examples, the manipulator is operable to control operation of the clamping mechanism.

In some embodiments, the frame includes a face plate defining an indentation configured to be releasably engageable by the automated machinery.

In another aspect, a method of transporting disk drives for testing includes actuating automated machinery and thereby moving a disk drive transporter carrying a first disk drive between a first test slot and a loading station; and actuating the automated machinery to operate a clamping mechanism such that the disk drive transporter is clamped to the first disk drive during movement between the first test slot and the loading station.

Embodiments can include one or more of the following features. In some embodiments. In certain embodiments, moving the disk drive transporter between the first test slot and the loading station includes moving the disk drive transporter carrying the first disk drive from the loading station to the first test slot.

In some embodiments, moving the disk drive transporter between the first test slot and the loading station includes moving the disk drive transporter carrying the first disk drive from the first test slot to the loading station.

In certain embodiments, actuating the automated machinery to operate the clamping mechanism includes clamping the disk drive transporter to the first disk drive prior to moving the disk drive transporter between the first test slot and the loading station.

In some embodiments, actuating the automated machinery to operate the clamping mechanism includes clamping the disk drive transporter to the first disk drive as the disk drive transporter is being moved between the first test slot and the loading station.

In certain embodiments, the method includes actuating the automated machinery to operate the clamping mechanism and thereby unclamping the disk drive transporter from the first disk drive, and then actuating the automated machinery to insert the disk drive transporter and the first disk drive into the first test slot. The method may also include actuating the automated machinery to operate the clamping mechanism and thereby clamping the disk drive transporter to the first test slot after the disk drive transporter and the first disk drive are inserted into the first test slot.

In some embodiments, the method includes actuating the automated machinery to operate the clamping mechanism and thereby unclamping the disk drive transporter from the first test slot; and then actuating the automated machinery to remove the disk drive transporter from the first test slot. In some cases, the method may also include actuating the automated machinery to operate the clamping mechanism and thereby unclamping the disk drive transporter from the first disk drive prior to removing the disk drive transporter from the first test slot.

In certain embodiments, the method includes actuating the automated machinery to operate the clamping mechanism and thereby unclamping the disk drive transporter from a second test slot; and then actuating the automated machinery and thereby removing the disk drive transporter from the second test slot. In some cases, the method also includes capturing the first disk drive from the loading station with the disk drive transporter after removing the disk drive transporter from the second test slot. Capturing the first disk drive includes moving the disk drive transporter into engagement with the first disk drive using the automated machinery. In some examples, the method also includes actuating the automated machinery to operate the clamping mechanism and thereby unclamping the disk drive transporter from a second disk drive. Removing the disk drive transporter from the second test slot comprises removing the disk drive transporter carrying the second disk drive from the second test slot. The method may also include actuating the automated machinery and thereby moving the disk drive transporter carrying the second disk drive between the second test slot and the loading station, and actuating the automated machinery to operate the clamping mechanism such that the disk drive transporter is clamped to the second disk drive during movements between the second test slot and the loading station. In some cases, the method includes actuating the automated machinery to insert the disk drive transporter and the second disk drive into a disk drive receptacle at the loading station.

In some embodiments, the method includes actuating the automated machinery to insert the disk drive transporter into the first test slot; and then actuating the automated machinery to operate the clamping mechanism and thereby clamping the disk drive transporter to the first test slot after the disk drive transporter is inserted into the first test slot.

In a further aspect, a method of transporting disk drives for testing includes actuating automated machinery and thereby moving a disk drive transporter carrying a first disk drive between a first test slot and a second test slot; and actuating the automated machinery to operate a clamping mechanism such that the disk drive transporter is clamped to the first disk drive during movement between the first test slot and the second test slot.

Embodiments can include one or more of the following features. In some embodiments. In certain embodiments, actuating the automated machinery to operate the clamping mechanism includes clamping the disk drive transporter to the first disk drive prior to moving the disk drive transporter between the first test slot and the second test slot.

In some embodiments, actuating the automated machinery to operate the clamping mechanism includes clamping the disk drive transporter to the first disk drive as the disk drive transporter is being moved between the first test slot and the second test slot.

In certain embodiments, moving the disk drive transporter between the first test slot and the second test slot includes moving the disk drive transporter carrying the first disk drive from the first test slot towards the second test slot. In some cases, the method also includes actuating the automated machinery to operate the clamping mechanism and thereby unclamping the disk drive transporter from the first test slot; and then actuating the automated machinery to remove the disk drive transporter from the first test slot. The method may also include actuating the automated machinery to operate the clamping mechanism and thereby unclamping the disk drive transporter from the first disk drive prior to removing the disk drive transporter from the first test slot.

In some embodiments, the method includes actuating the automated machinery to operate the clamping mechanism and thereby unclamping the disk drive transporter from the first disk drive, and then actuating the automated machinery to insert the disk drive transporter and the first disk drive into the second test slot. In some examples, the method also includes actuating the automated machinery to operate the clamping mechanism and thereby clamping the disk drive transporter to the second test slot after the disk drive transporter and the first disk drive are inserted into the second test slot.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 10A and 10B are perspective views of a spring clamp.
FIG. 14 is a perspective view of a disk drive transporter.
FIG. 15A is a sectioned plan view a disk drive transporter with spring clamps in an engaged position.
FIG. 16A is a sectioned plan view of a disk drive transporter with spring clamps in a disengaged position.
FIG. 22 is a perspective view of a test slot assembly.
FIG. 23A is a perspective view of a test slot.
FIGS. 25A and 25B are perspective views of a disk drive transporter.
FIG. 26A is a perspective view showing a disk drive transporter inserted in a test slot.
FIGS. 27A and 27B are perspective views of a disk drive transporter.

Like reference symbols in the various drawings indicate like elements.

DETAILED DESCRIPTION

System Overview

Figure 1:
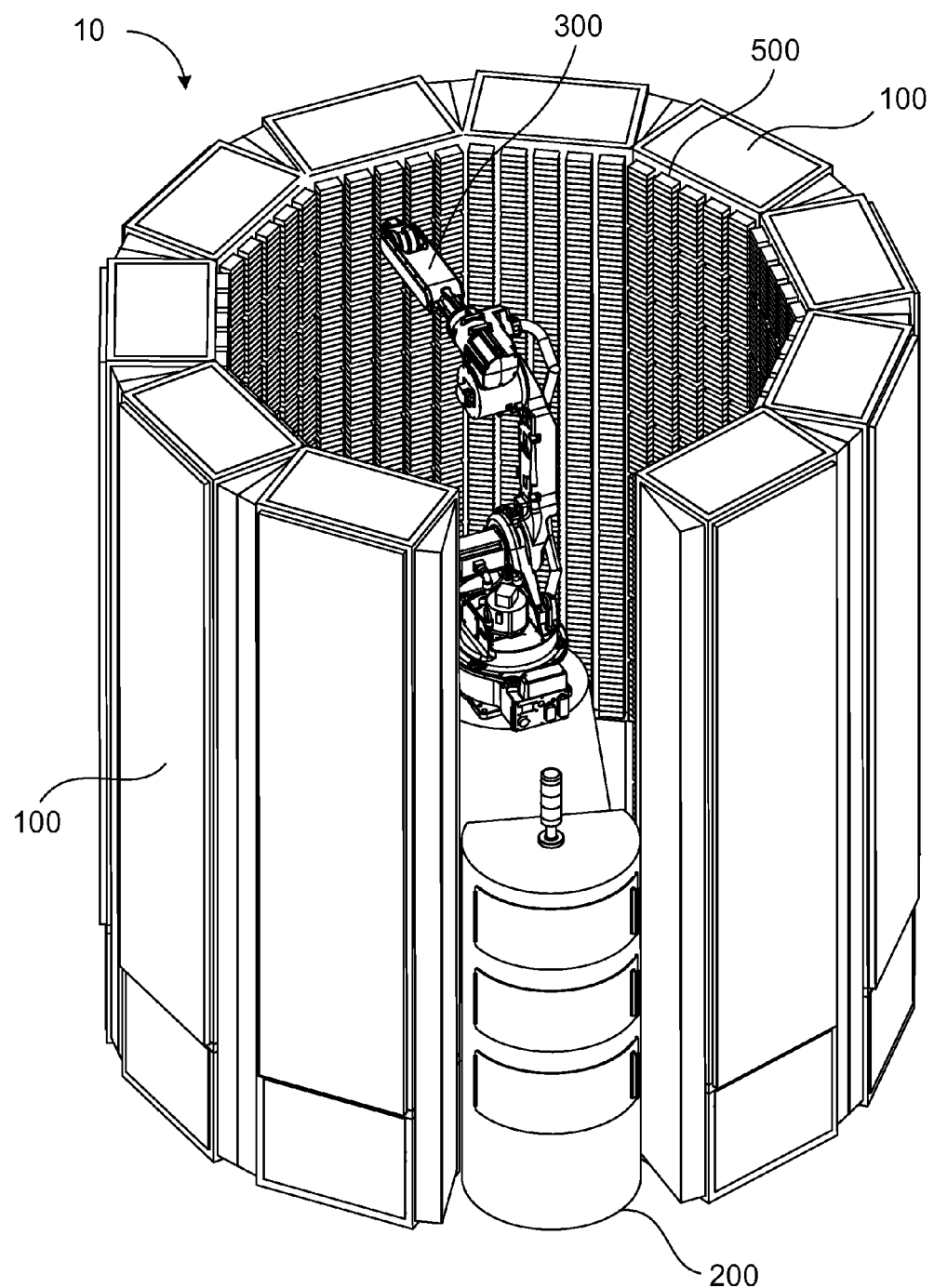
FIG. 1 is a perspective view of a disk drive testing system.
Figure 2B:
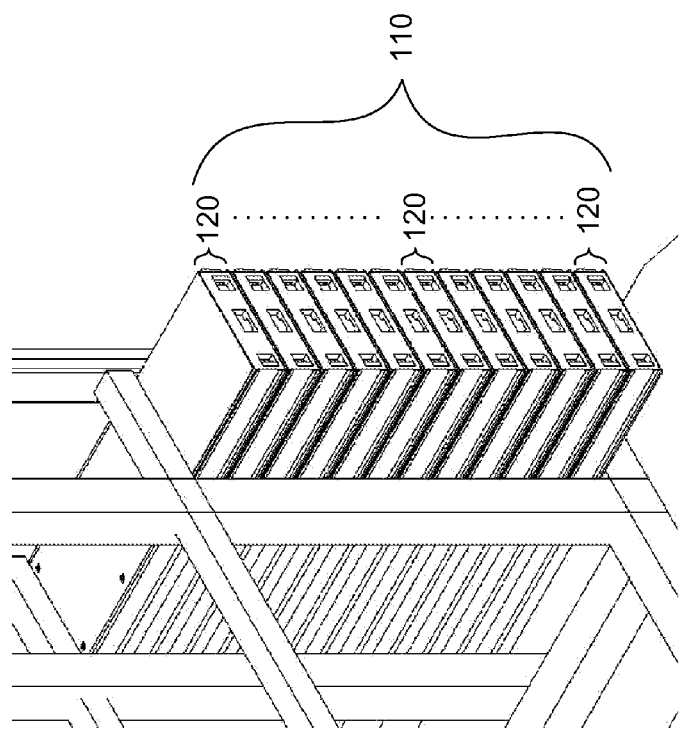
FIG. 2B is a detailed perspective view of a slot bank from the test rack of FIG. 2A.
Figure 2A:
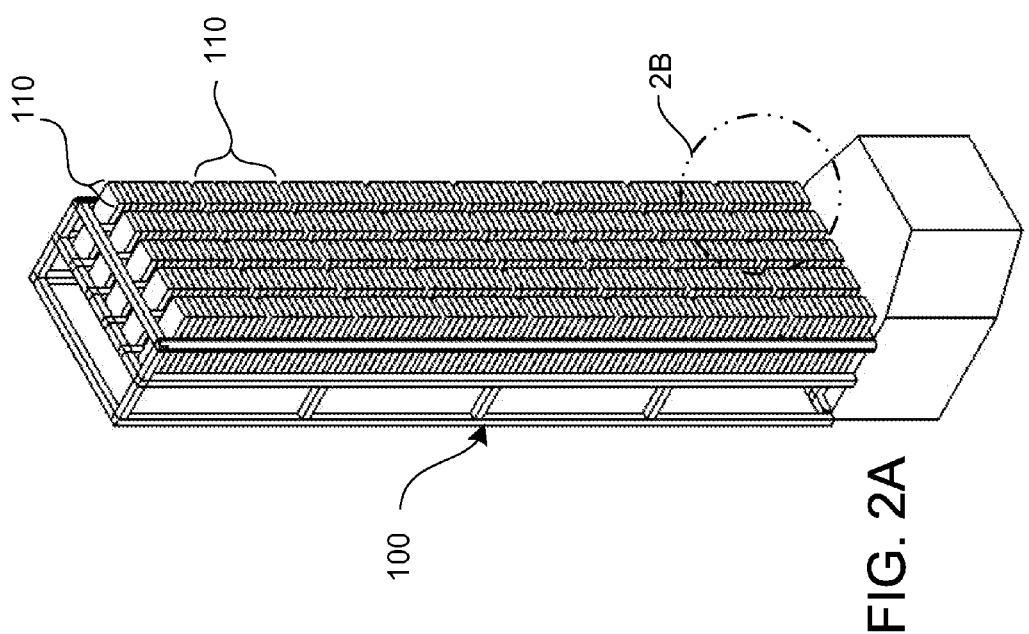
FIG. 2A is perspective view of a test rack.
Figure 3:
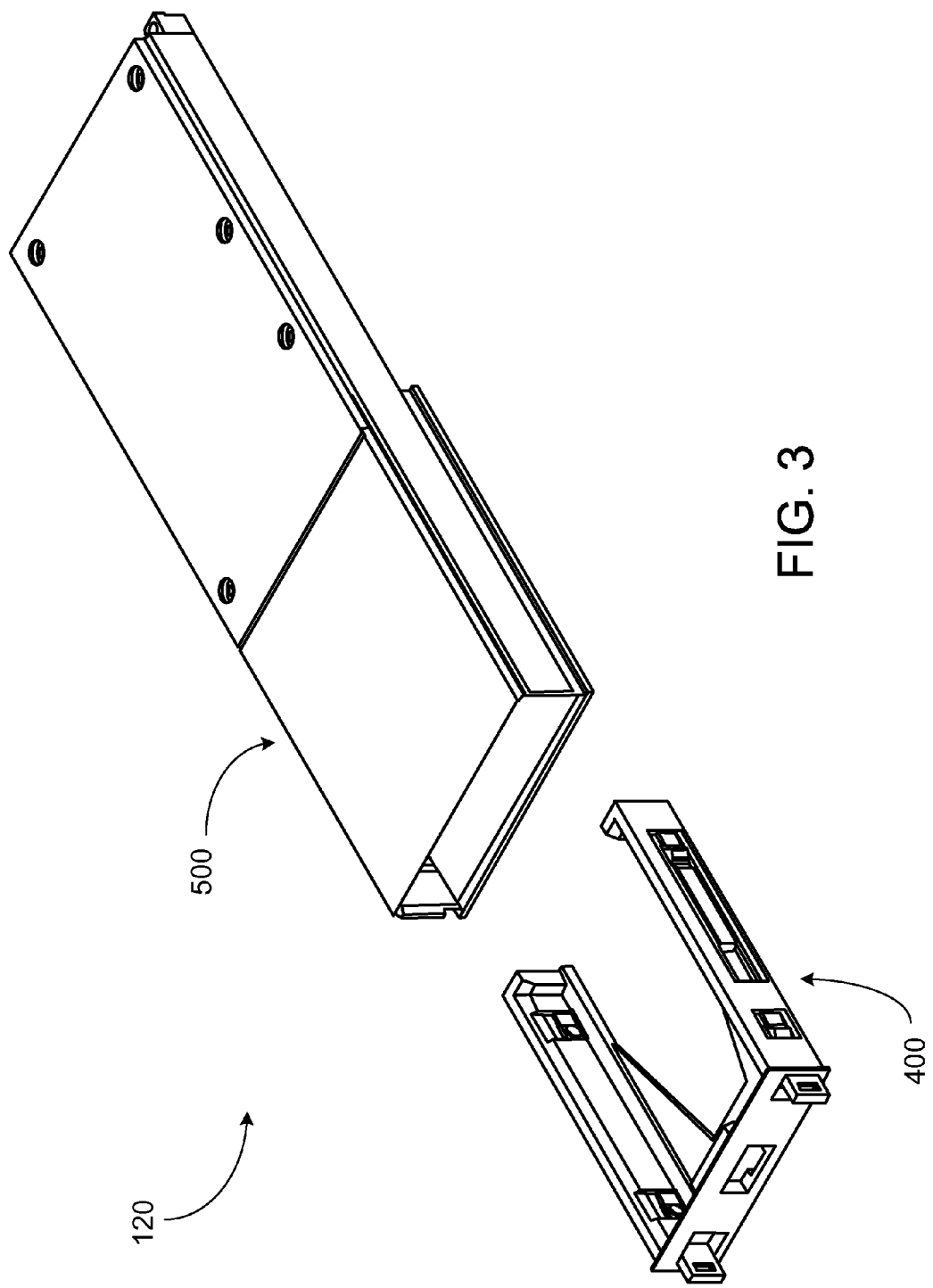
FIG. 3 is a perspective view of a test slot assembly.

As shown in FIG. 1, a disk drive testing system 10 includes a plurality of test racks 100 (e.g., 10 test racks shown), a loading station 200, and a robot 300. As shown in FIGS. 2A and 2B, each test rack 100 includes a plurality of slot banks 110, and each slot bank 110 holds a plurality of test slot assemblies 120. As shown in FIG. 3, each test slot assembly 120 includes a disk drive transporter 400 and a test slot 500. The disk drive transporter 400 is used for capturing disk drives 600 (FIG. 6) (e.g., from the loading station) and for transporting the disk drive 600 to one of the test slots 500 for testing.

Figure 4A:
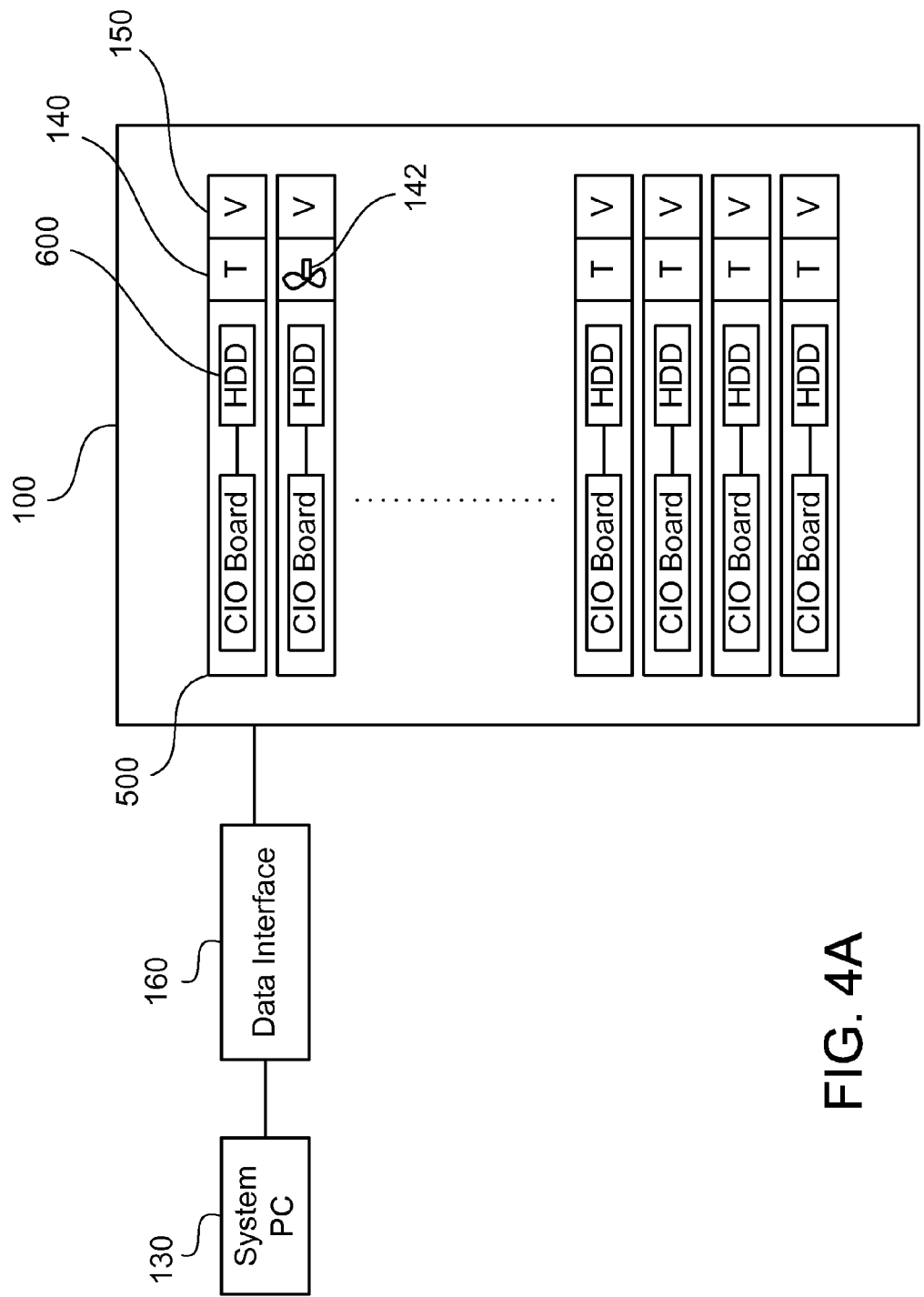
FIGS. 4A and 4B are schematic views of self-test and functional test circuitry.

Referring to FIG. 4A, in some implementations, the disk drive testing system 10 also includes at least one computer 130 in communication with the test slots 500. The computer 130 may be configured to provide inventory control of the disk drives 600 and/or an automation interface to control the disk drive testing system 10. A temperature control system 140 controls the temperature of each test slot 500. The temperature control system 140 can include an air mover (e.g., a fan 142) operable to circulate air through the test slot 500. A vibration control system 150 controls the vibration of each test slot 500. A data interface 160 is in communication with each test slot 500. The data interface 160 is configured to communicate with a disk dive 600 within the test slot 500.

Figure 4B:
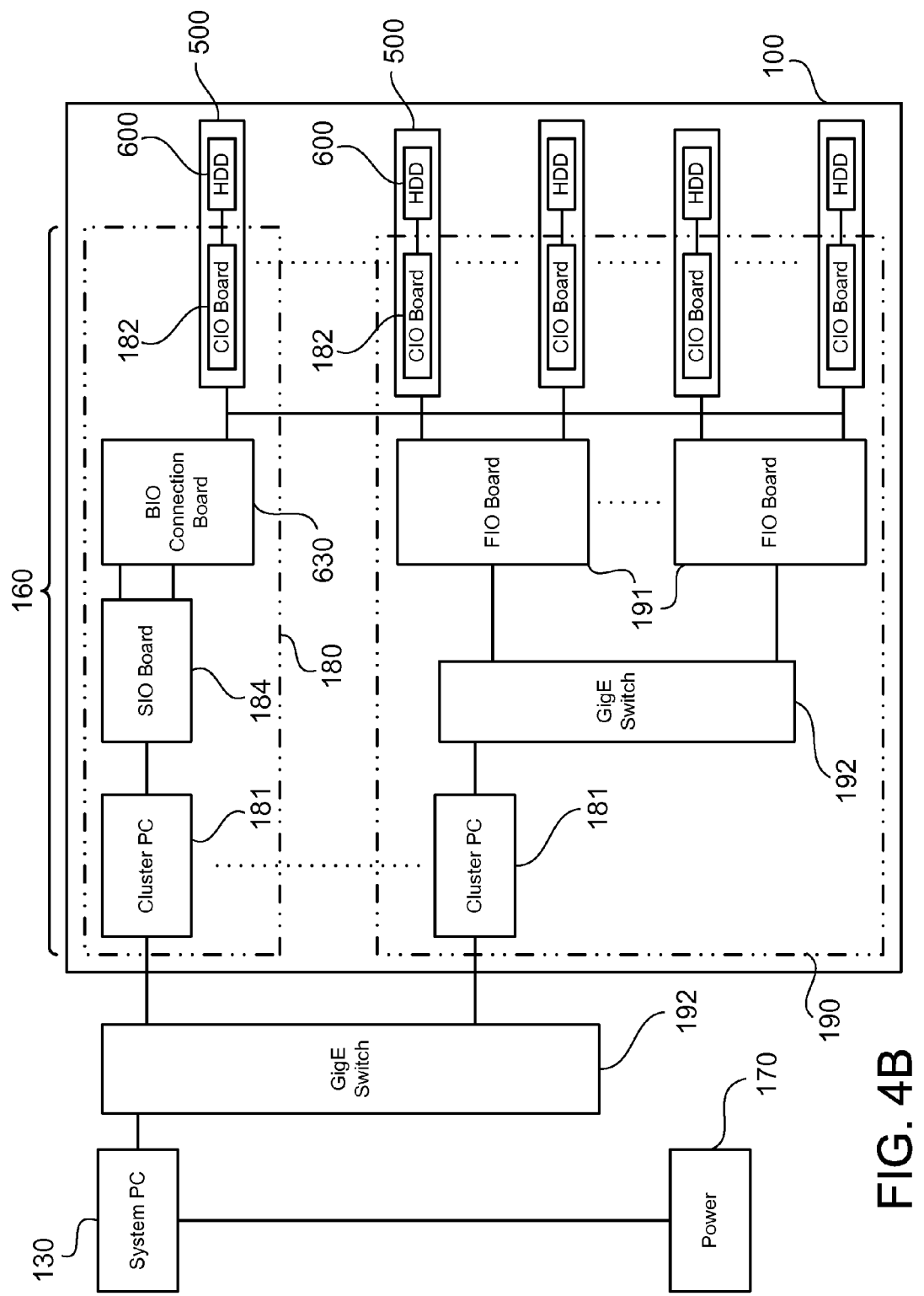

As shown in FIG. 4B, a power system 170 supplies power to the disk drive testing system 10. The power system 170 may monitor and/or regulate power to the disk drive 600 in the test slot 500. In the example illustrated in FIG. 4B, each rack 100 includes at least one self-testing system 180 in communication with at least one test slot 500. The self-testing system 180 includes a cluster controller 181, a connection interface circuit 182 in electrical communication with a disk drive 600 within the test slot 500, and a block interface circuit 183 in electrical communication with the connection interface circuit 182. The cluster controller 181, in some examples, is configured to run one or more testing programs with a capacity of approximately 120 self-tests and/or 60 functionality test of disk drives 600. The connection interface circuit 182 and the block interface circuit 183 are configured to self-test. However, the self-testing system 180 may include a self-test circuit 184 configured to execute and control a self-testing routine on one or more components of the disk drive testing system 10. The cluster controller 181 may communicate with the self-test circuit 184 via Ethernet (e.g. Gigabit Ethernet), which may communicate with the block interface circuit 183 and onto the connection interface circuit 182 and disk drive 600 via universal asynchronous receiver/transmitter (UART) serial links. A UART is usually an individual (or part of an) integrated circuit used for serial communications over a computer or peripheral device serial port. The block interface circuit 183 is configured to control power and temperature of the test slot 500, and may control up to six test slots 500 and/or disk drives 600.

Each rack 100, in some examples, includes at least one functional testing system 190 in communication with at least one test slot 500. The functional testing system 190 includes a cluster controller 181 and at least one functional interface circuit 191 in electrical communication with the cluster controller (e.g., cluster PC 181). A connection interface circuit 182 is in electrical communication with a disk drive 600 within the test slot 500 and the functional interface circuit 182. The functional interface circuit 182 is configured to communicate a functional test routine to the disk drive 600. The functional testing system 190 may include a communication switch 192 (e.g. Gigabit Ethernet) to provide electrical communication between the cluster controller 181 and the one or more functional interface circuits 182. The computer 130, communication switch 192, cluster controller 181, and functional interface circuit 191 may communicate on an Ethernet network. However, other forms of communication may be used. The functional interface circuit 191 may communicate to the connection interface circuit 182 via Parallel AT Attachment (a hard disk interface also known as IDE, ATA, ATAPI, UDMA and PATA), SATA, or SAS (Serial Attached SCSI).

Figure 5:
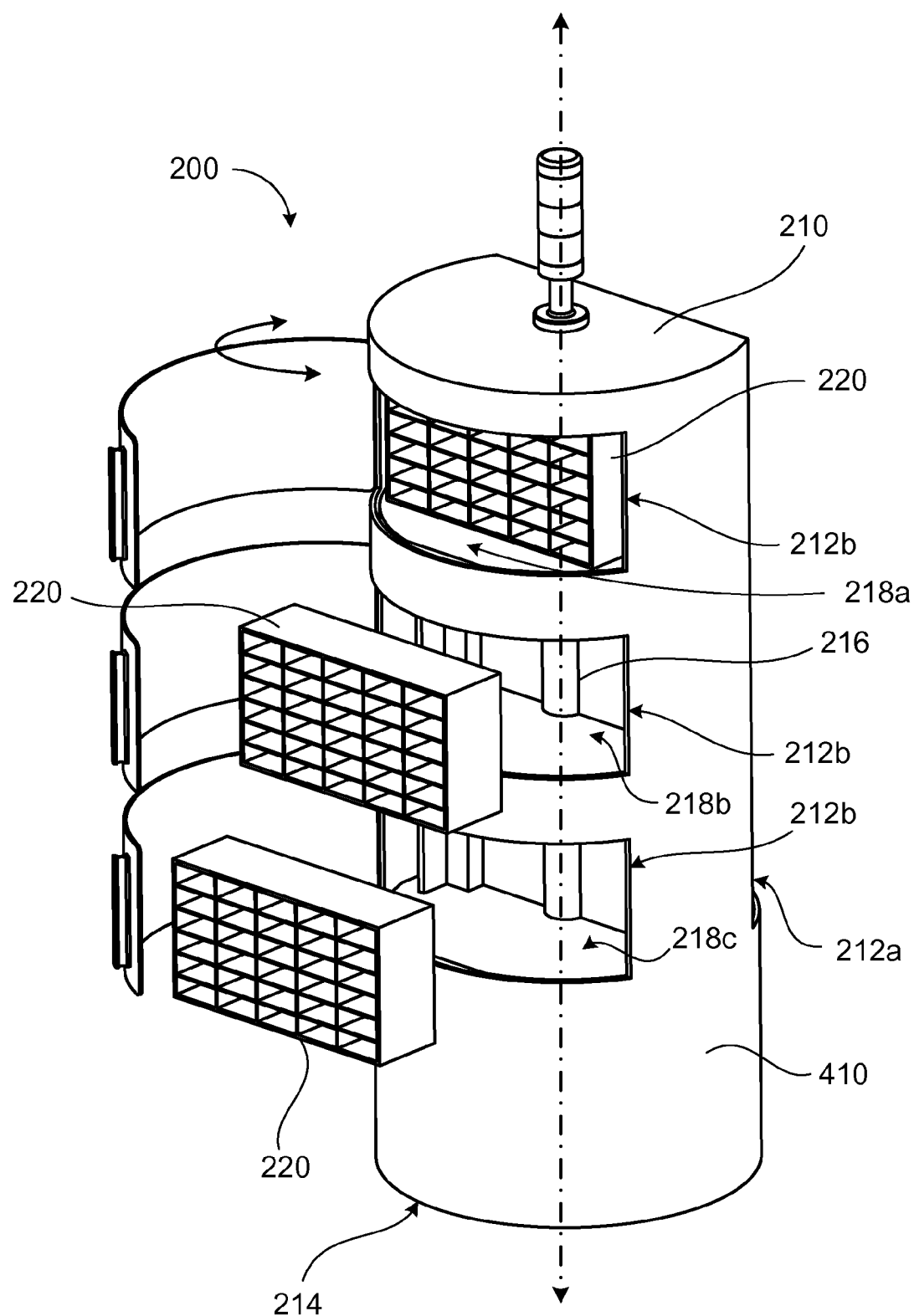
FIG. 5 is a perspective view of a load station.

As shown in FIG. 5, the load station 200 includes a load station body 210 that defines first and second sets of tote receptacles 212a, 212b disposed on opposite sides of the load station body 210. The load station 200 also includes a load station base 214 and a spindle 216 that extends substantially normal to and upwardly from the load station base 214. First, second, and third body portions 218a, 218b, 218c are rotatably secured to the spindle 216. Each of the first, second, and third body portions 218a, 218b, 218c is independently rotatable relative to the others.

Figure 6:
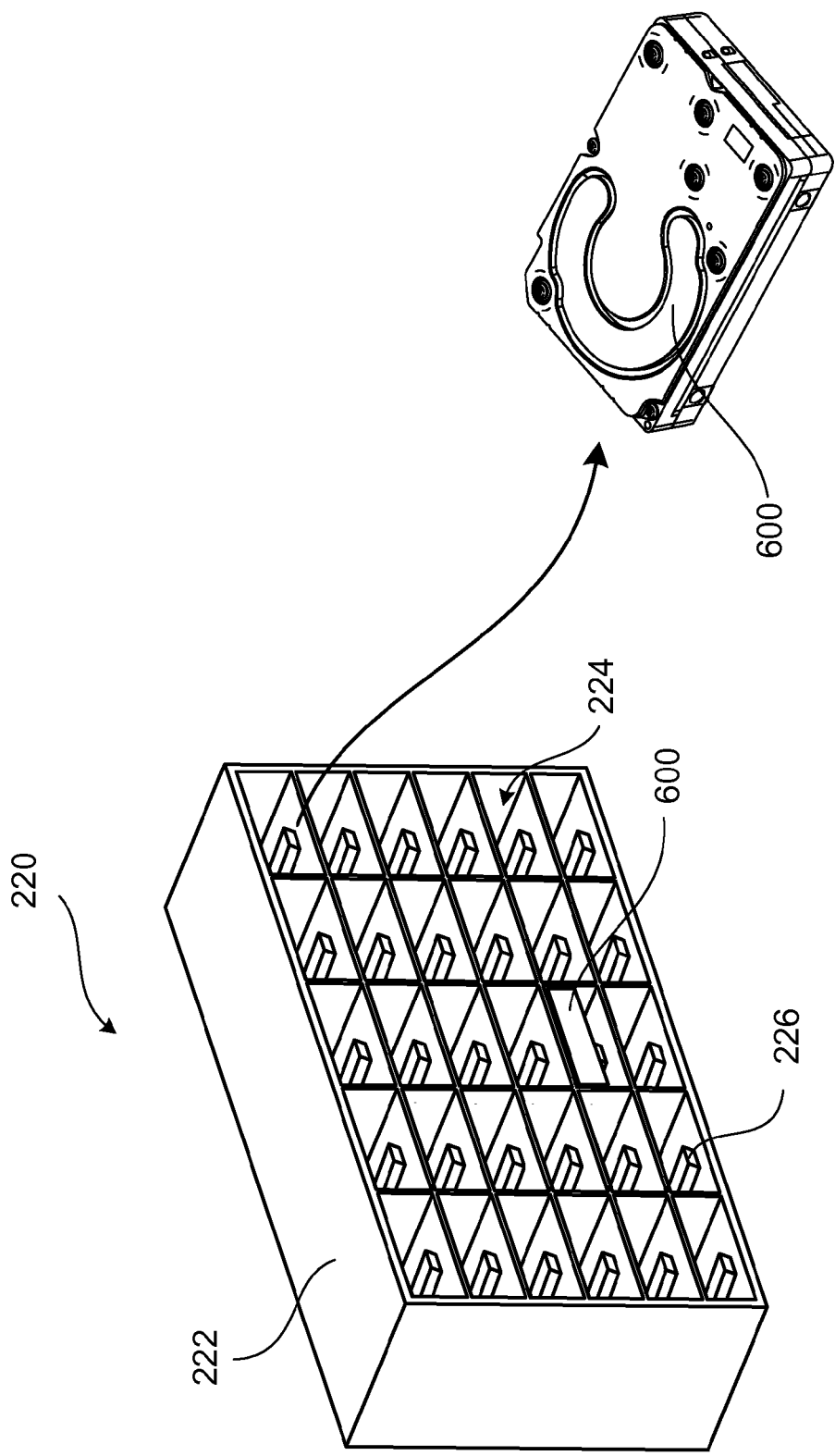
FIG. 6 is a perspective view of a tote and disk drive.

The load station 200 also includes totes 220 configured to be removably mounted within the tote receptacles 212a, 212b. As shown in FIG. 6, the totes 220 include a tote body 222 which defines a plurality of disk drive receptacles 224 (e.g., 30 shown) configured to each house a disk drive 600. Each of the disk drive receptacles 224 includes a disk drive support 226 configured to support a central portion of a received disk drive 600 to allow manipulation of the disk drive 600 along non-central portions. Referring again to FIG. 5, the totes 200 can be loaded through the first tote receptacles 212a and then rotated into alignment with the second tote receptacles 212b via the first, second, and third body portions 218a-c for servicing by the robot 300.

Figure 7:
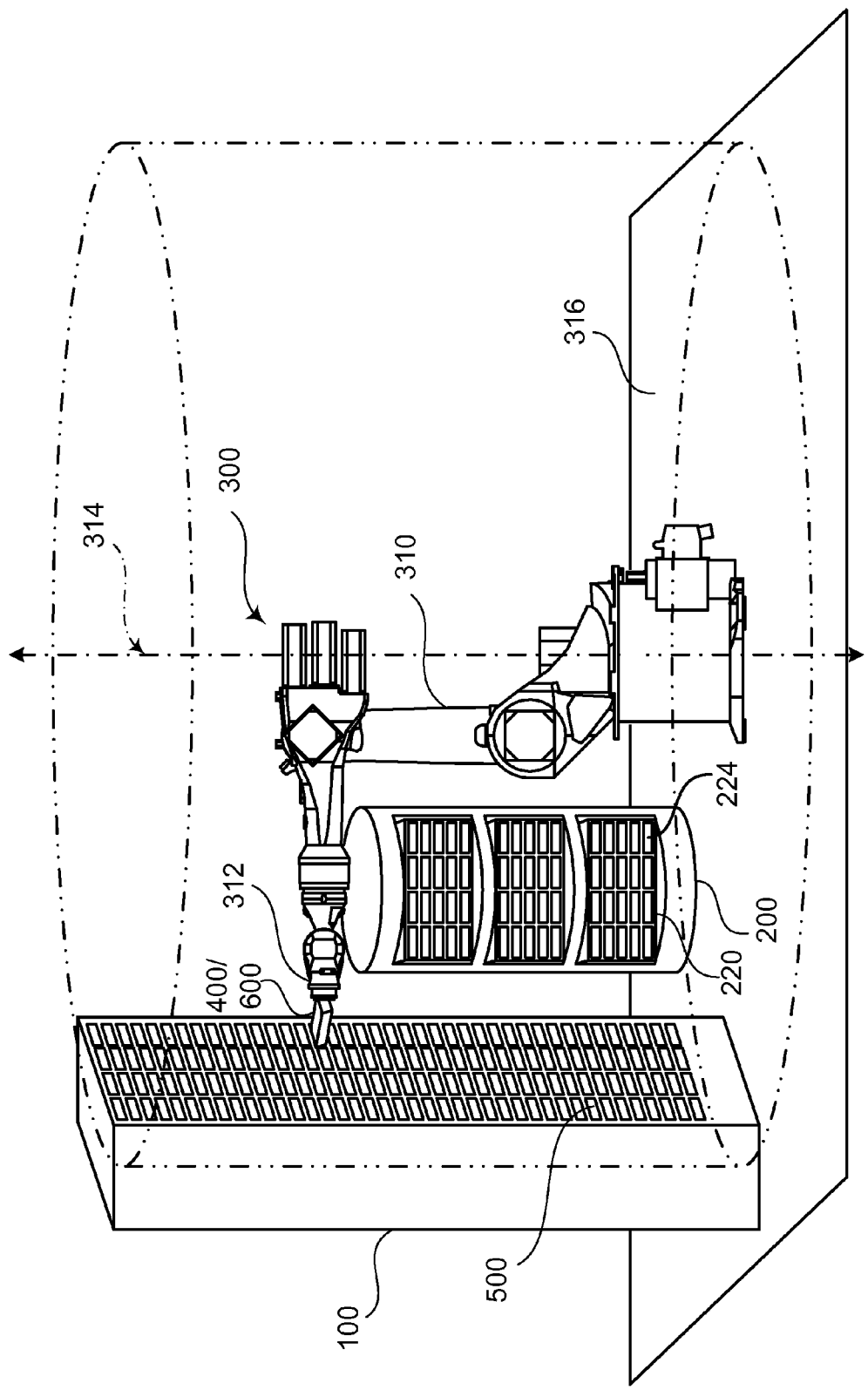
FIG. 7 is a schematic view of a disk drive testing system.

As shown in FIG. 7, the robot 300 includes a robotic arm 310 and a manipulator 312 disposed at a distal end of the robotic arm 310. The robotic arm 310 defines a first axis 314 substantially normal to a floor surface 316 and is operable to rotate through a predetermined arc about and extends substantially radially from the first axis 314. The robotic arm 310 is configured to independently service each test slot 500 by transferring disk drives 600 between the load station 200 and one of the test racks 100. In particular, the robotic arm 310 is configured to remove a disk drive transporter 400 from one of the test slots 500 with the manipulator 312, then pick up a disk drive 600 from one the disk drive receptacles 224 at the load station 200 with the disk drive transporter 400, and then return the disk drive transporter 400, with a disk drive 600 therein, to the test slot 500 for testing of the disk drive 600. After testing, the robotic arm 310 retrieves the disk drive transporter 400, along with the supported disk drive 600, from the test slot 500 and returns it to one of the disk drive receptacles 224 at the load station 200.

Disk Drive Transporter

Figure 8:
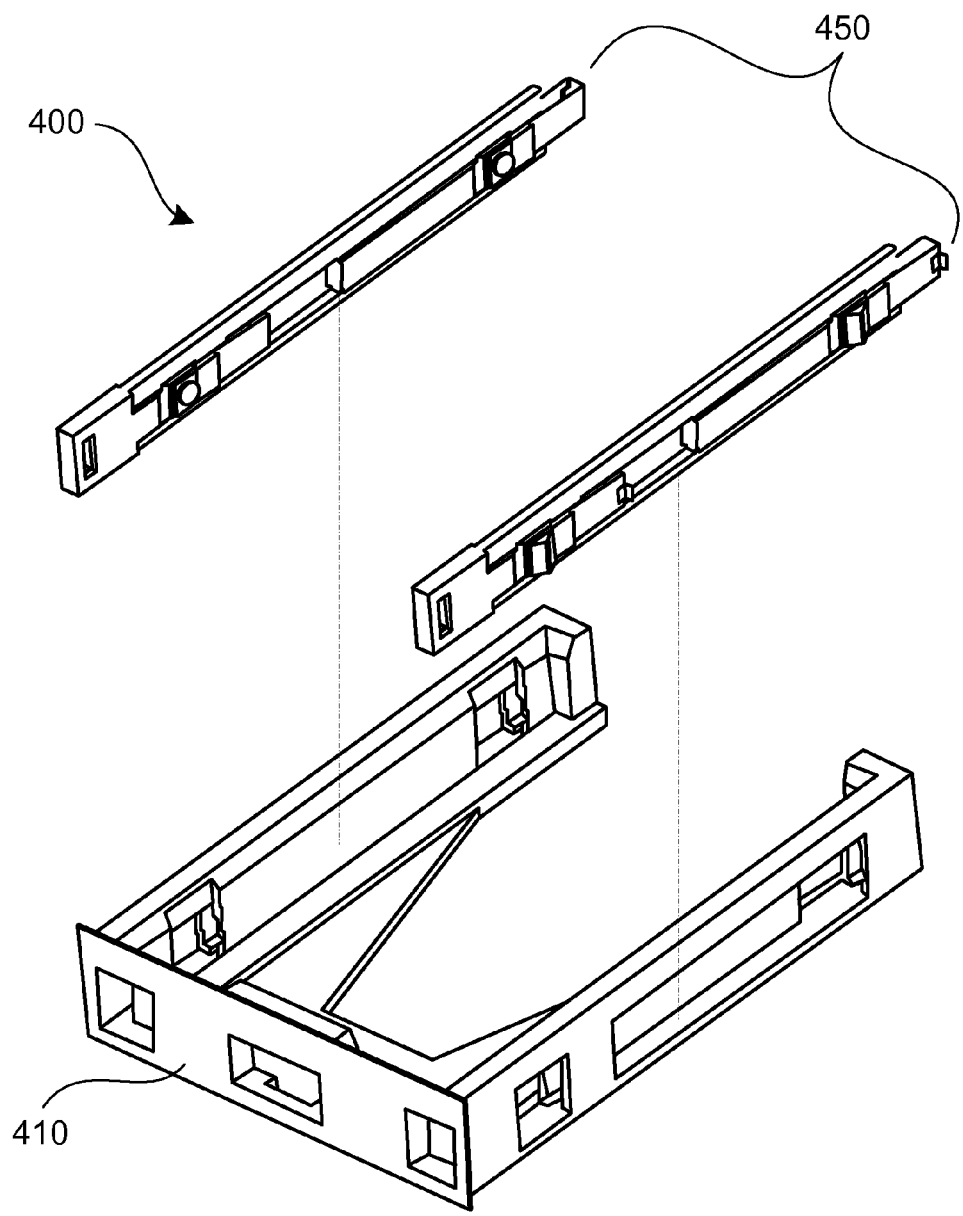
FIG. 8 is an exploded perspective view of a disk drive transporter.
Figure 9:
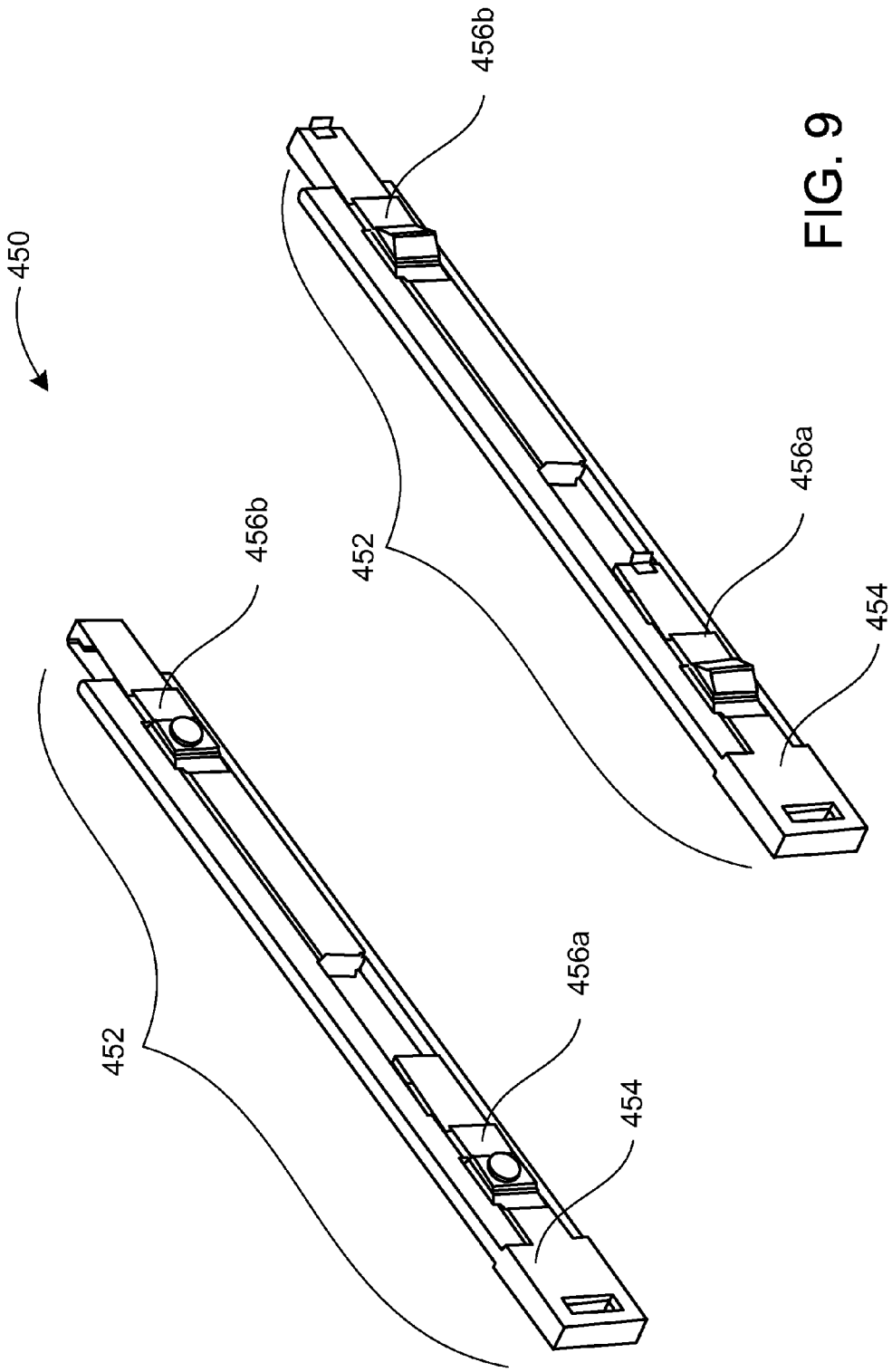
FIG. 9 is a perspective view of a clamping mechanism.
Figure 10B:
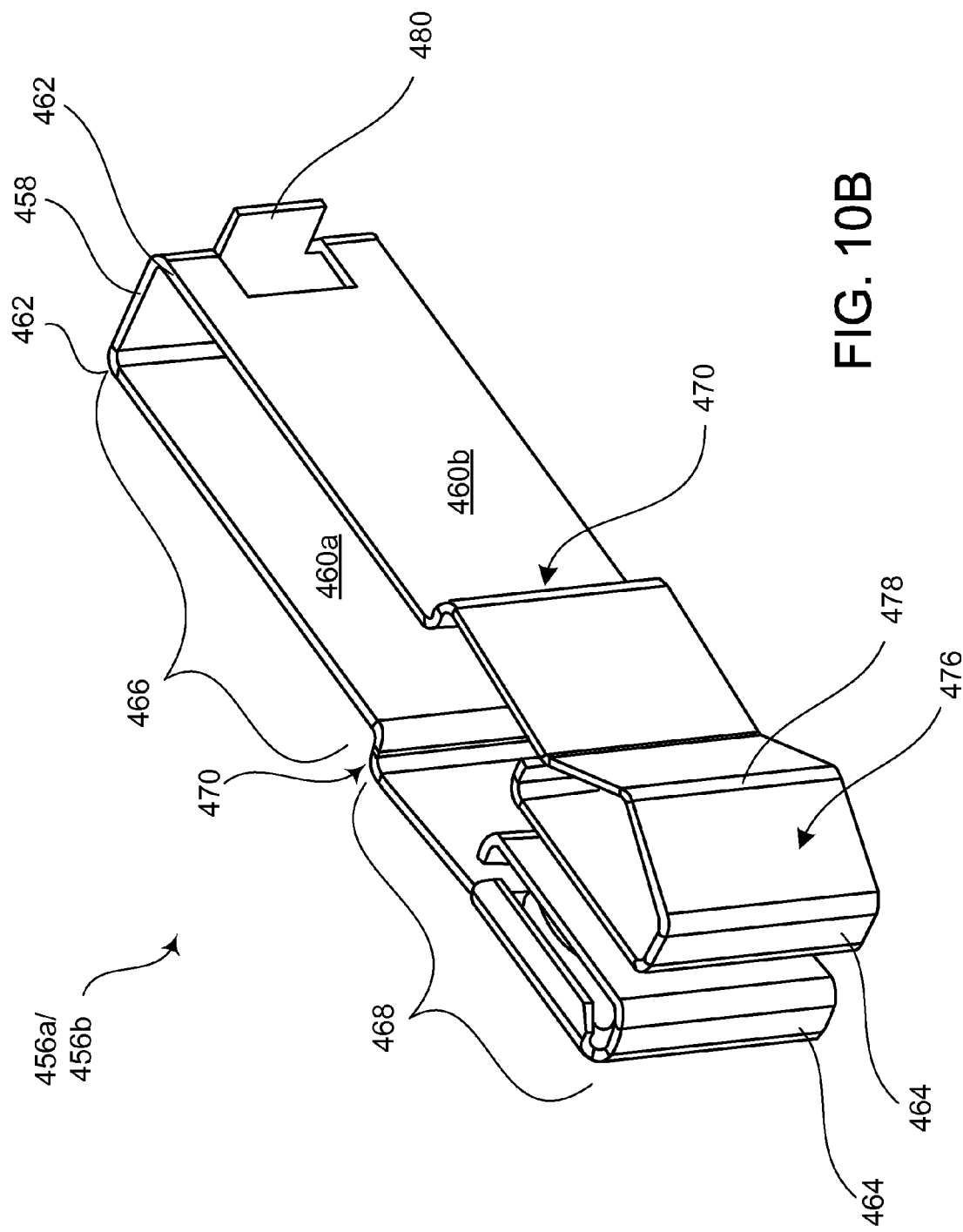

As shown in FIG. 8, the disk drive transporter 400 includes a frame 410 and a clamping mechanism 450. As shown in FIG. 9, the clamping mechanism includes a pair of clamping assemblies 452 each including an actuator 454 and a pair of spring clamps (i.e., proximal and distal spring clamps 456a, 456b). As shown in FIGS. 10A and 10B, the spring clamps 456a, 456b include a base portion 458 and first and second spring arms 460a, 460b each having a proximal end 462 connected to the base portion 458 and a displaceable distal end 464. The spring clamps 456a, 456b can be formed from sheet metal, e.g., stainless steel. Between their proximal and distal ends 462, 464 the spring arms 460a, 460b define a narrow region 466, a broad region 468 and a pair of edges 470 therebetween. As shown in FIG. 10A, the first spring arm 460a includes a first engagement member 472 having a dampener 474. The dampener 474 can be formed from, e.g., thermoplastics, thermosets, etc. As shown in FIG. 10B, the second spring arm 460b includes a second engagement member 476 which defines a protuberance 478. Each of the spring clamps 456a, 456b also include a mounting tab 480 that extends outwardly from the base portion 458. As discussed in greater detail below, following assembly, the spring clamps 456a, 456b are mounted to the frame 410 and are operatively associated with the actuators 454 (e.g., for clamping a hard drive 600 within the frame and/or for clamping the frame within one of the test slots 500).

Figure 11:
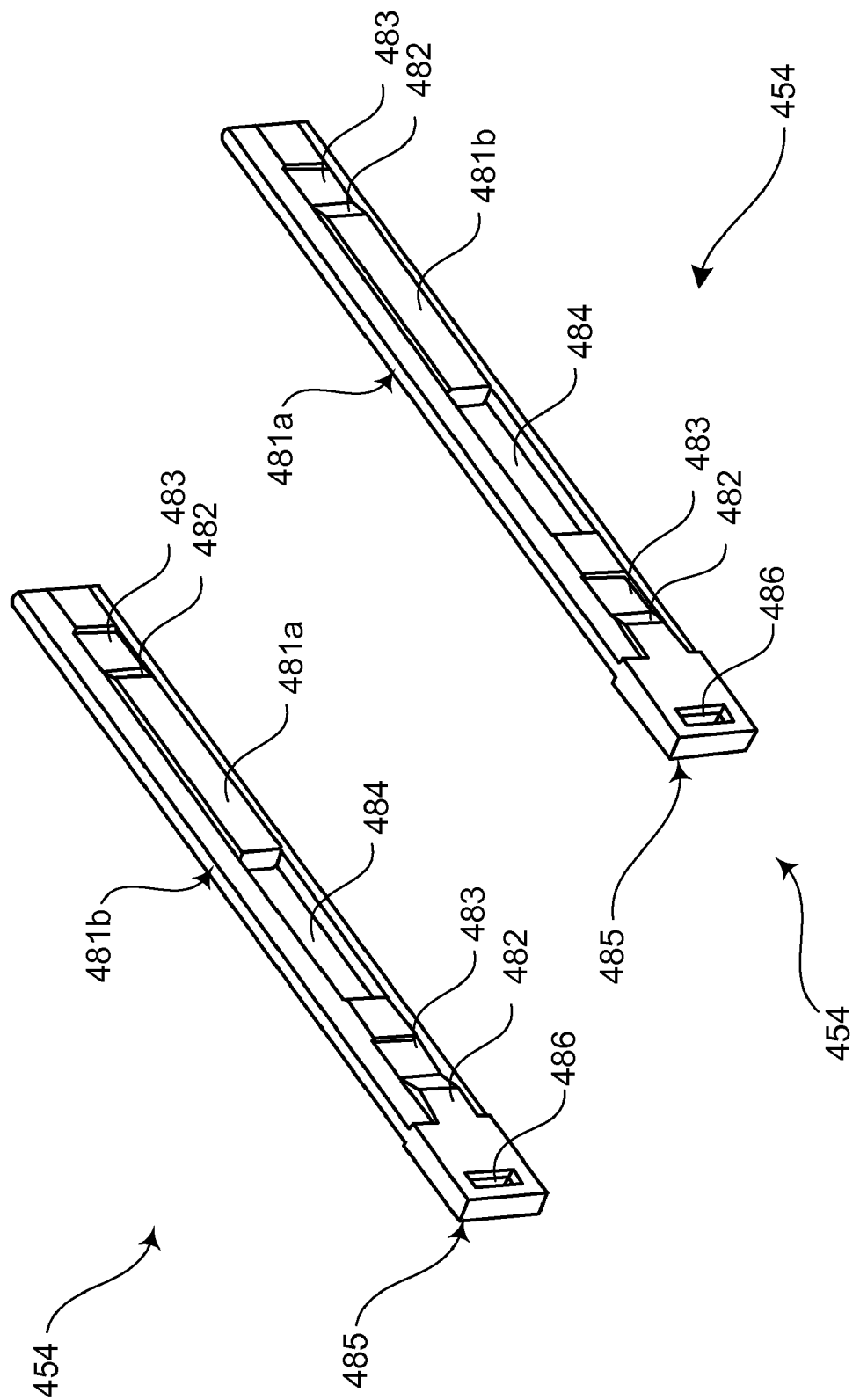
FIG. 11 is a perspective view of an actuator.

As shown in FIG. 11, each of the actuators 454 includes inner and outer surfaces 481a, 481b which define actuating features. The actuating features include wedges 482 and recesses 483. The actuators 454 also define openings 484 which extend between the inner and outer surfaces 481a, 481b. At their proximal ends 485, the actuators 454 include actuator sockets 486 which are configured to be engageable with the manipulator 312 for controlling movement of the actuators 454 relative to the frame 410.

Figure 12A:
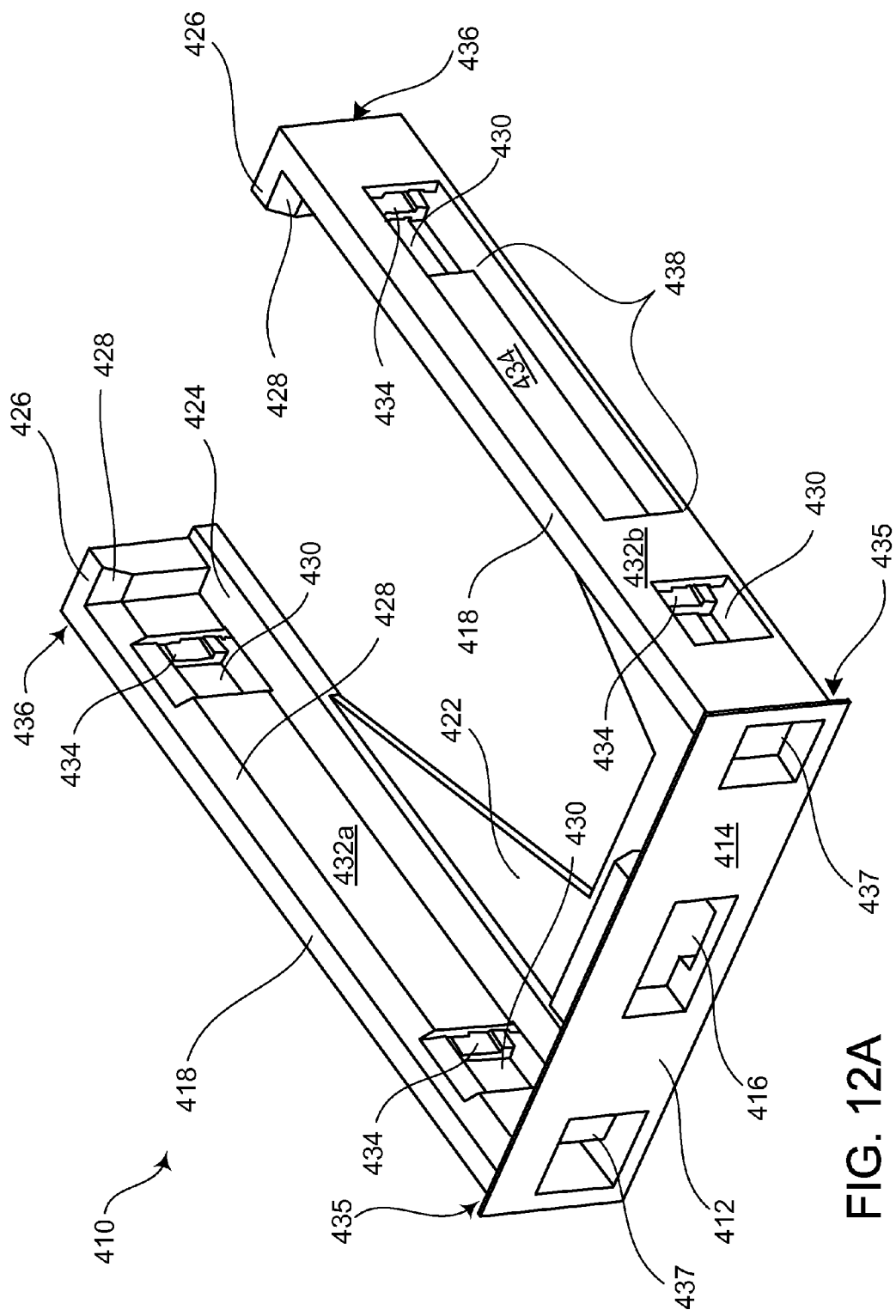
FIGS. 12A and 12B are perspective views of a disk drive transporter frame.
Figure 12B:
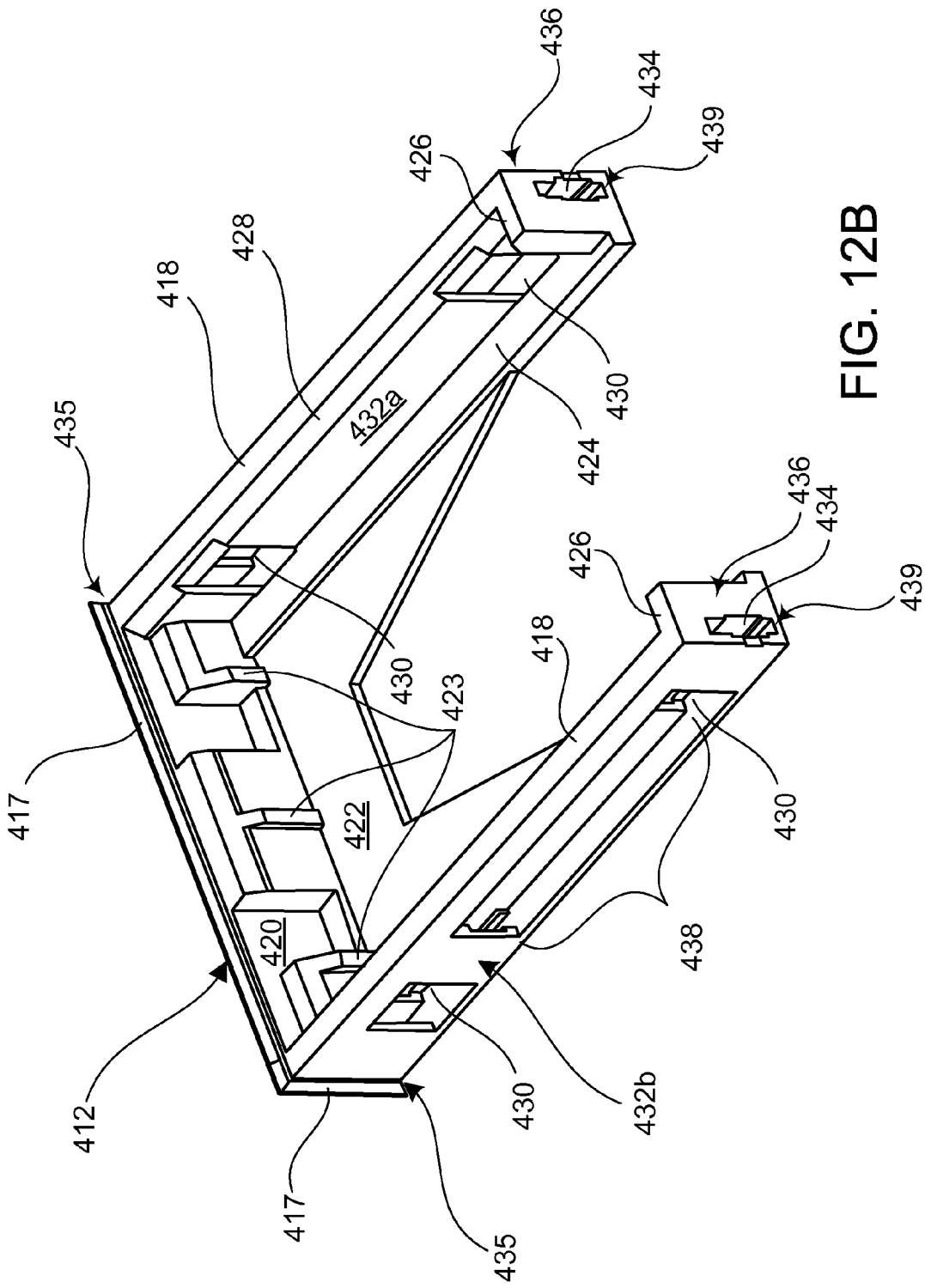

As shown in FIGS. 12A and 12B, the frame 410 includes a face plate 412. Along a first surface 414, the face plate 412 defines an indentation 416. The indentation 416 can be releaseably engaged by the manipulator 312 of the robotic arm 310, which allows the robotic arm 310 to grab and move the disk drive transporter 400. The face plate 412 also includes beveled edges 417. When the disk drive transporter 400 is inserted into one of the test slots 500, the beveled edges 417 of the face plate 412 abut complimentary beveled edges 515 of the test slot 500 to form a seal, which, as described below, helps to inhibit the flow of air into and out of the test slot 500.

Figure 19A:
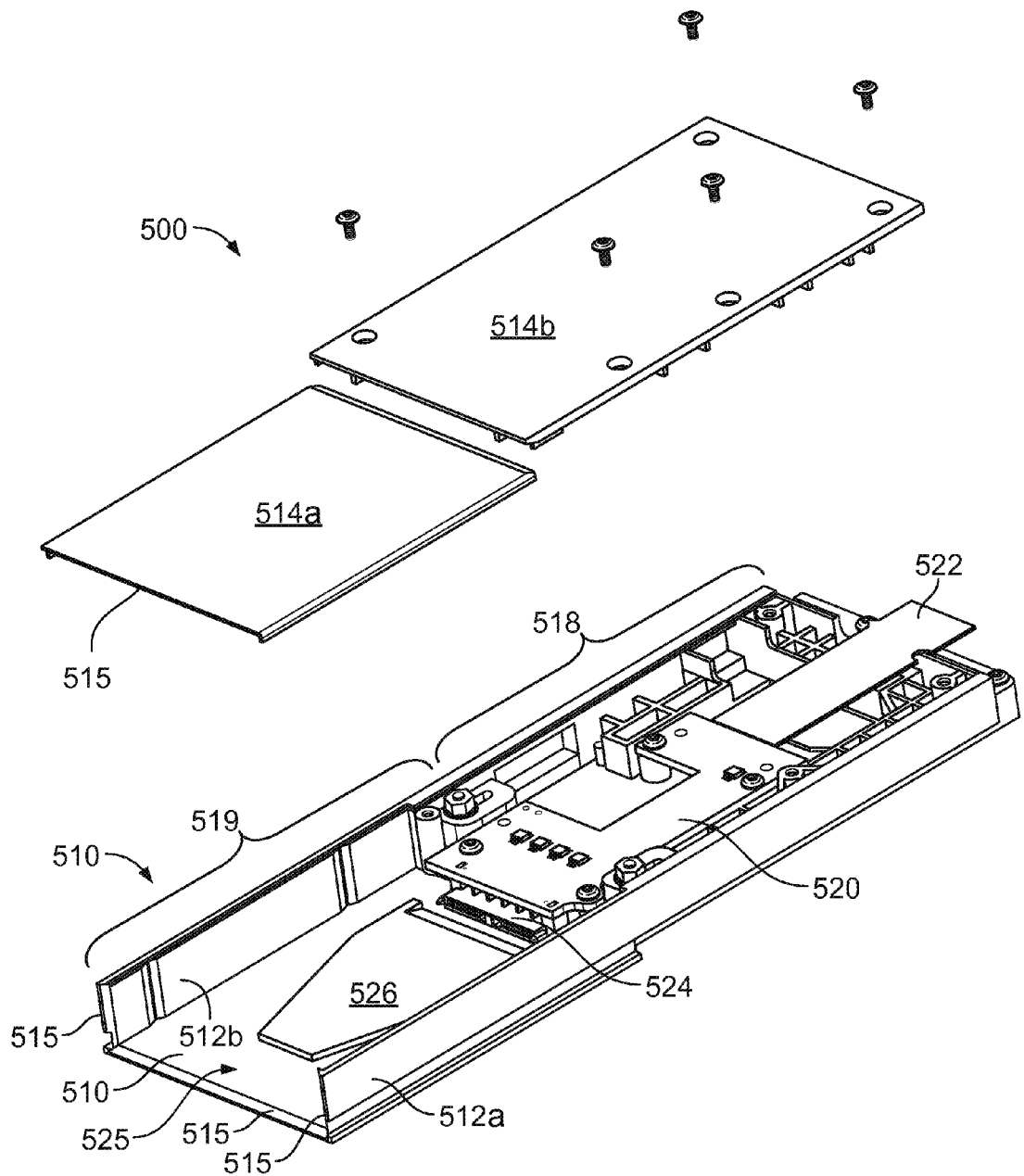
FIG. 19A is a perspective view of a test slot.
Figure 19B:
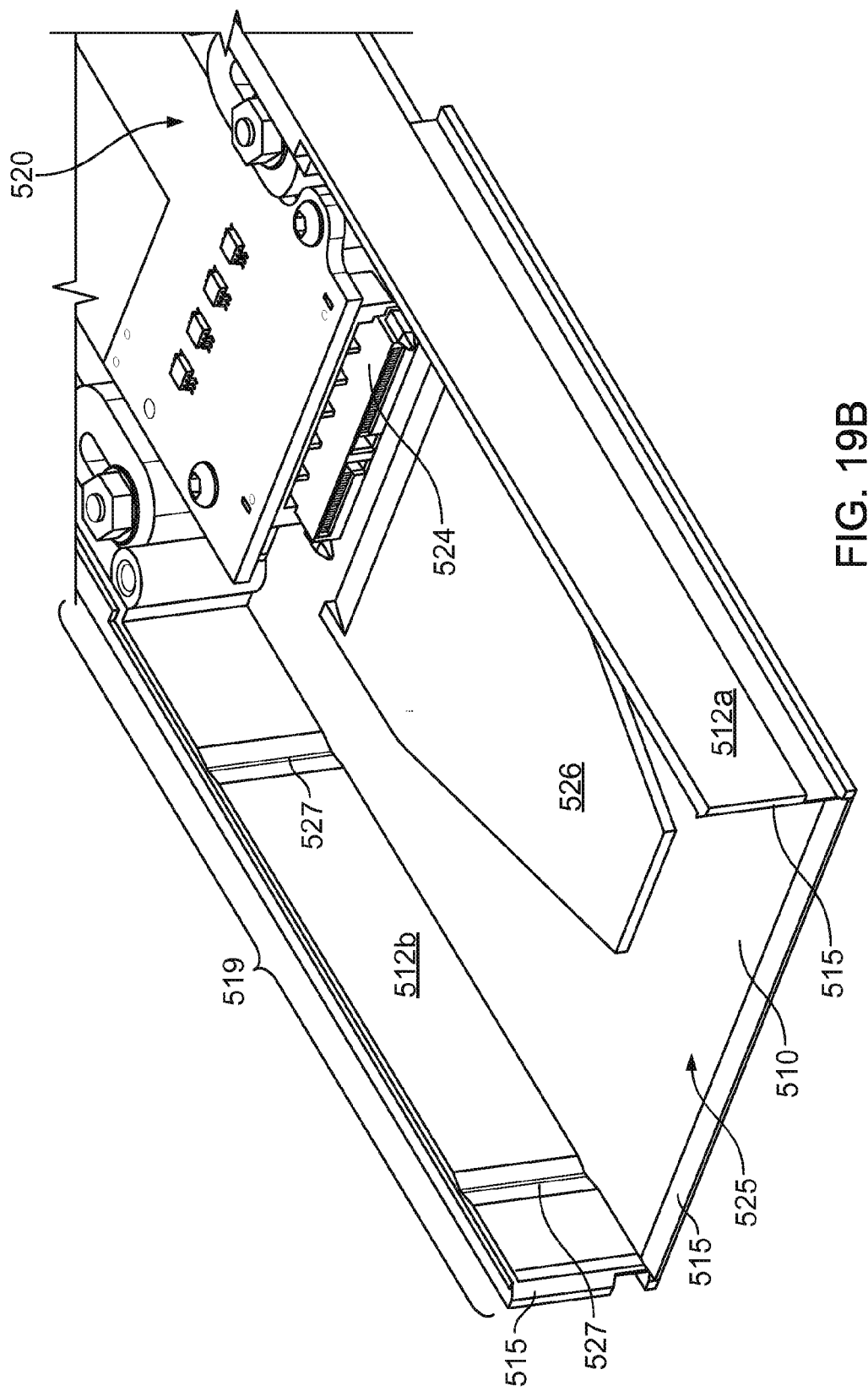
FIG. 19B is a perspective view of a test compartment from the test slot of FIG. 19A.

Referring still to FIGS. 12A and 12B, the frame 410 also includes a pair of sidewalls 418, which extend outwardly from a second surface 420 of the face plate 412, and a base plate 422 that extends between and connects the sidewalls 418. The sidewalls 418 and the base plate 422 together define a substantially U-shaped opening, which, as described in greater detail below, allows the disk drive transporter 400 to be used to capture a disk drive 600 off of the disk drive supports 226 in the totes 220. As shown in FIG. 12B, along the second surface 420, the face plate 412 defines projections 423, which can aid in applying force to the disk drive 600 to help ensure a mating connection between the disk drive connector 610 (FIG. 17A) and the test slot connector 524 (FIGS. 19A & 19B).

The sidewalls 418 are spaced to receive a disk drive 600 (shown in hidden lines) therebetween, and define surfaces 424 for supporting a disk drive 600. The sidewalls 418 also define back hooks 426, which can be useful for extracting the disk drive 600 from a test slot 500 (e.g., for separating a connector on the disk drive from a mating connector in the test slot 500). The sidewalls 418 also define lead-ins 428 (e.g., chamfered edges), which can aid in centering a disk drive 600 in the frame 410.

The sidewalls 418 each define a pair of pass-through apertures 430, which extend between inner and outer surfaces 432a, 432b of the sidewalls 418. Following assembly, a corresponding one of the spring clamps 456a, 456b is associated with each of the pass-through apertures 430. The sidewalls 418 also define actuator slots 434 which extend from a proximal end 435 to a distal end 436 of each sidewall 418. The face plate 412 defines a pair of apertures 437 which extend between the first and second surfaces 414, 420 thereof, and which allow access to the actuator slots 434. The sidewalls 418 also define partial through-holes 438 which provide access to the actuator slots 434 from the outer surfaces 432b of the sidewalls 418.

Figure 13A:
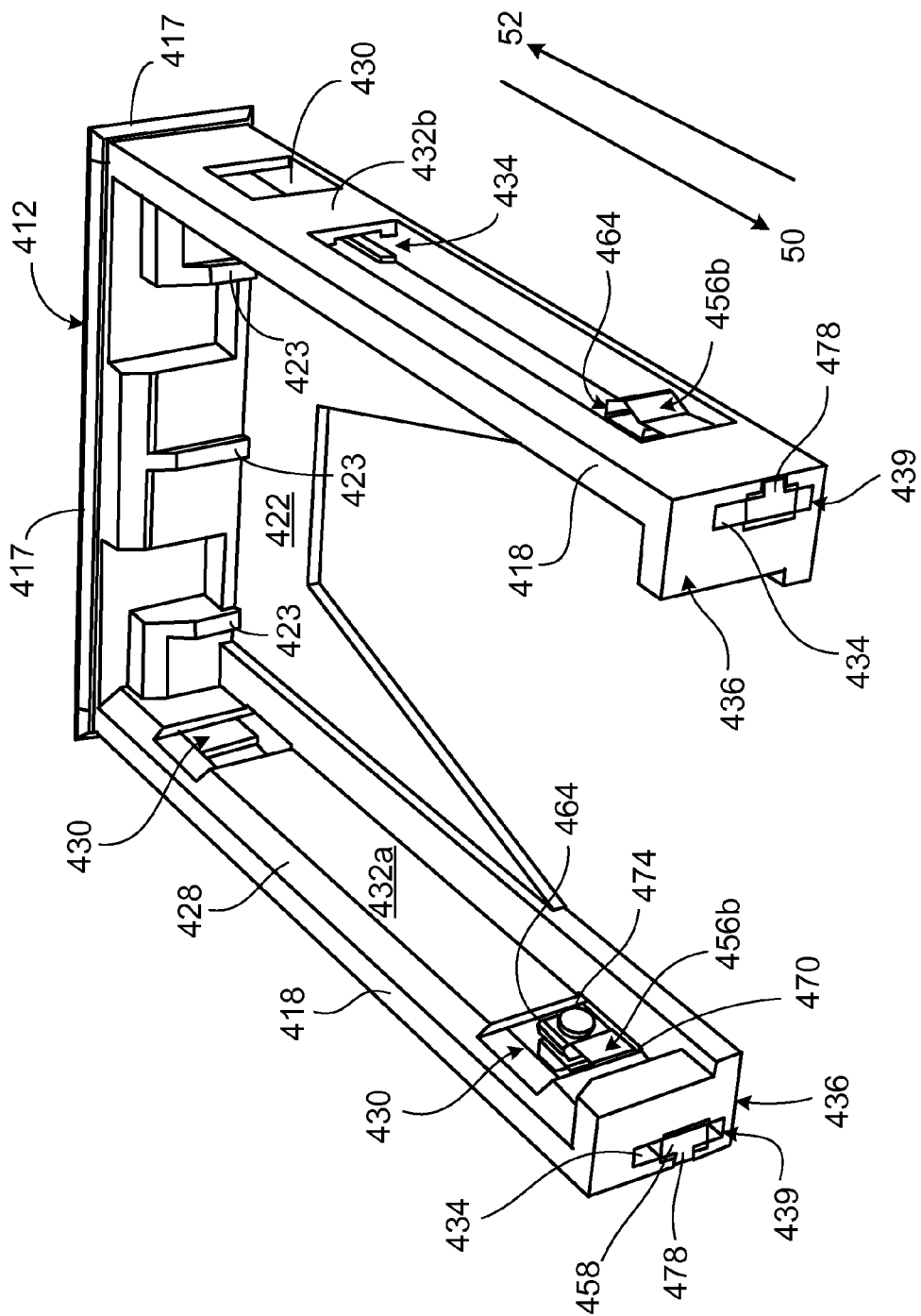
FIGS. 13A-13D illustrate the assembly of a disk drive transporter.

FIGS. 13A-D, illustrate the assembly of the clamping mechanism 450 with the frame 410. As shown in FIG. 13a, the distal spring clamps 456b are inserted into the actuator slots 434 through openings 439 in the distal ends 436 of the sidewalls 418. During insertion, the displaceable distal ends 464 of the distal spring clamps 456b are compressed by the inner surfaces of the actuator slot 434 such that the broad regions 468 of the distal spring clamps 456b fit within the corresponding actuator slots 434. The distal spring clamps 456b are then advanced into the actuator slot 434 until the edges 470 reach the distal pass-through apertures 430, at which point the distal ends 464 of the distal spring clamps 456b extend outwardly toward their rest position with the edges 470 abutting surfaces of the pass-though apertures 430. In this position, the edges 470 inhibit reward movement (indicated by arrow 50) of the distal spring clamps 456b and the tabs 480 abut the distal ends 436 of the sidewalls 418 to inhibit forward movement (indicated by arrow 52) of the distal spring clamps 456b. In this manner, the distal spring clamps 456b are substantially fixed against further linear movement within the actuator slots 434.

Figure 13B:
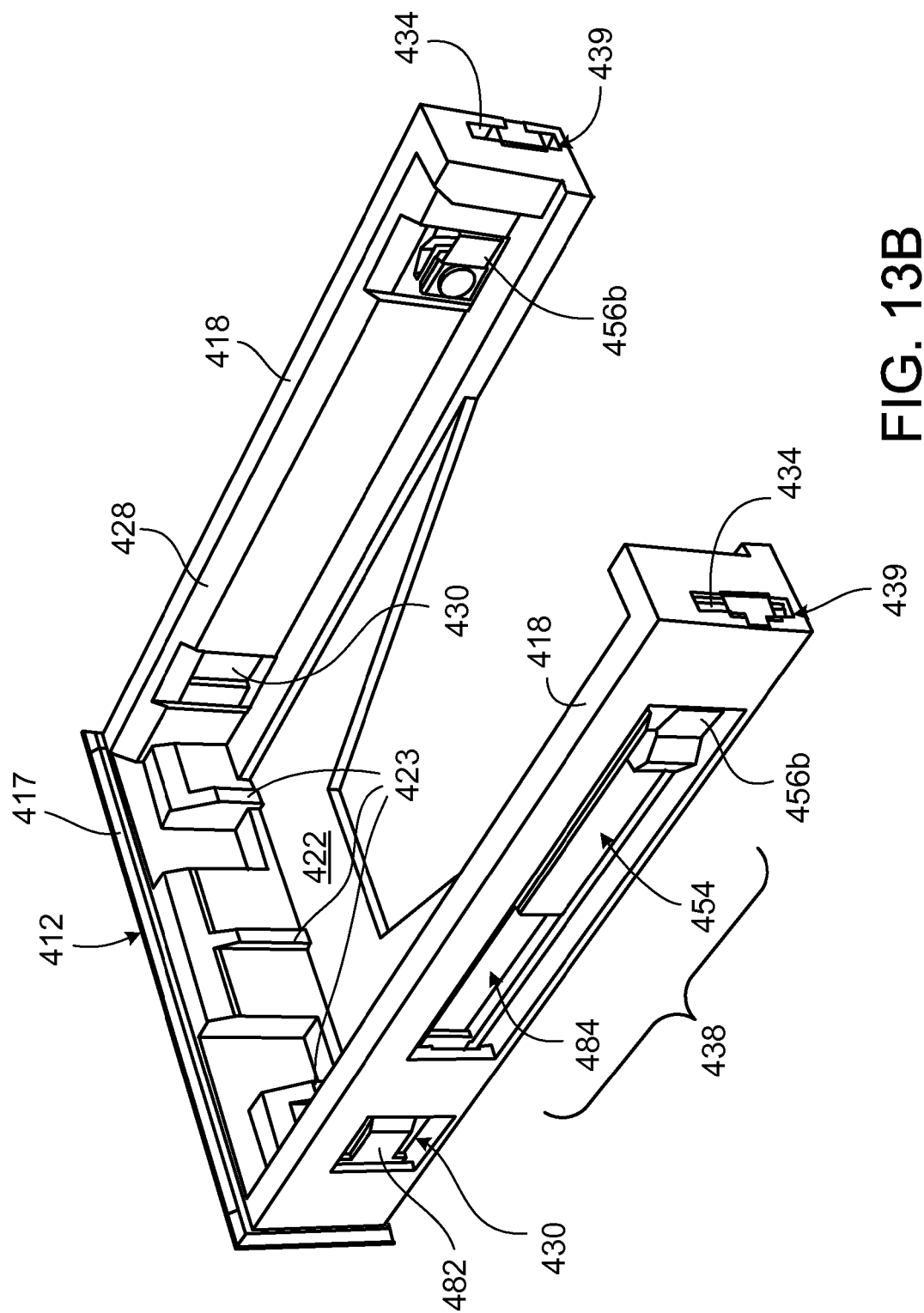
Figure 13C:
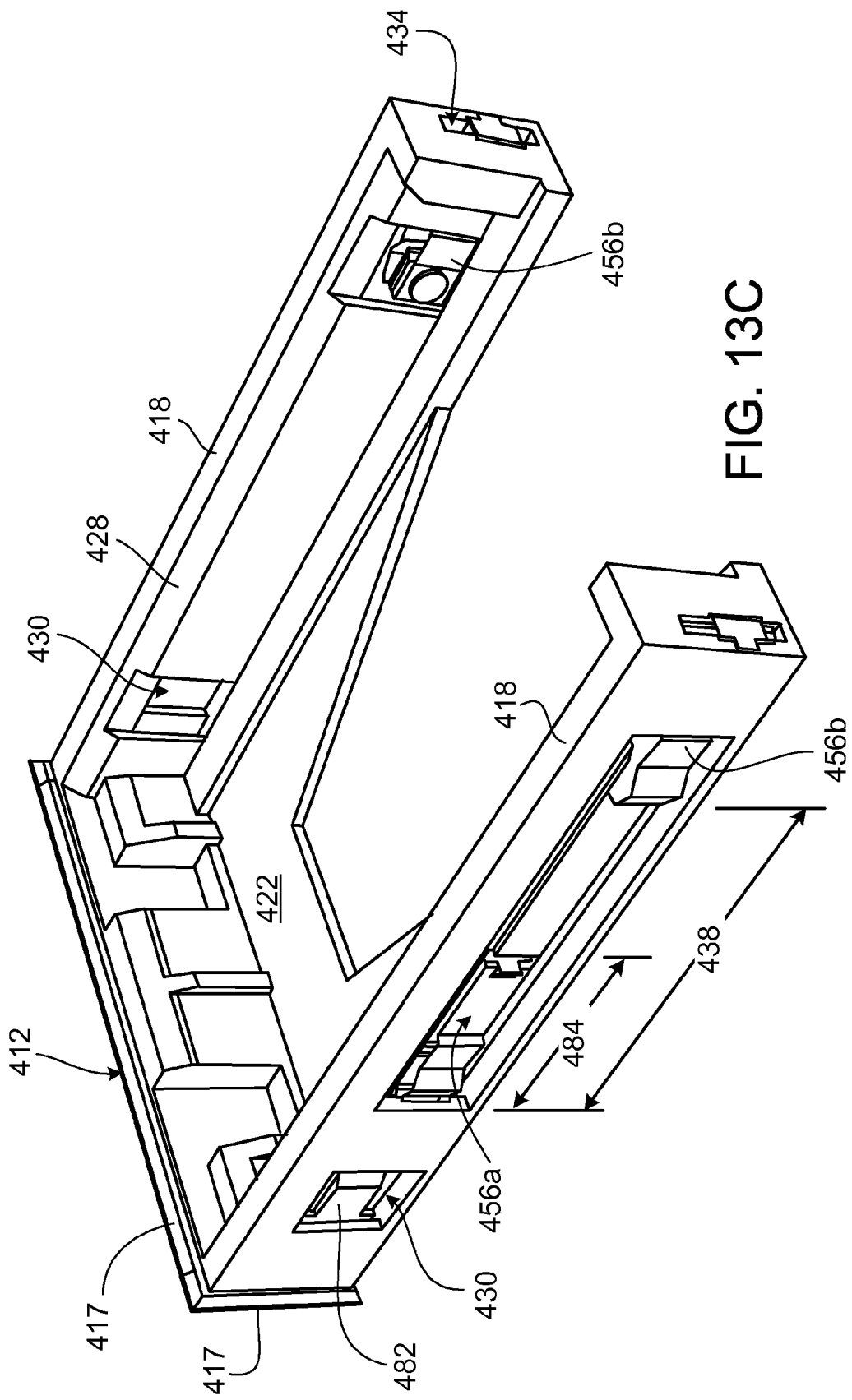
Figure 13D:
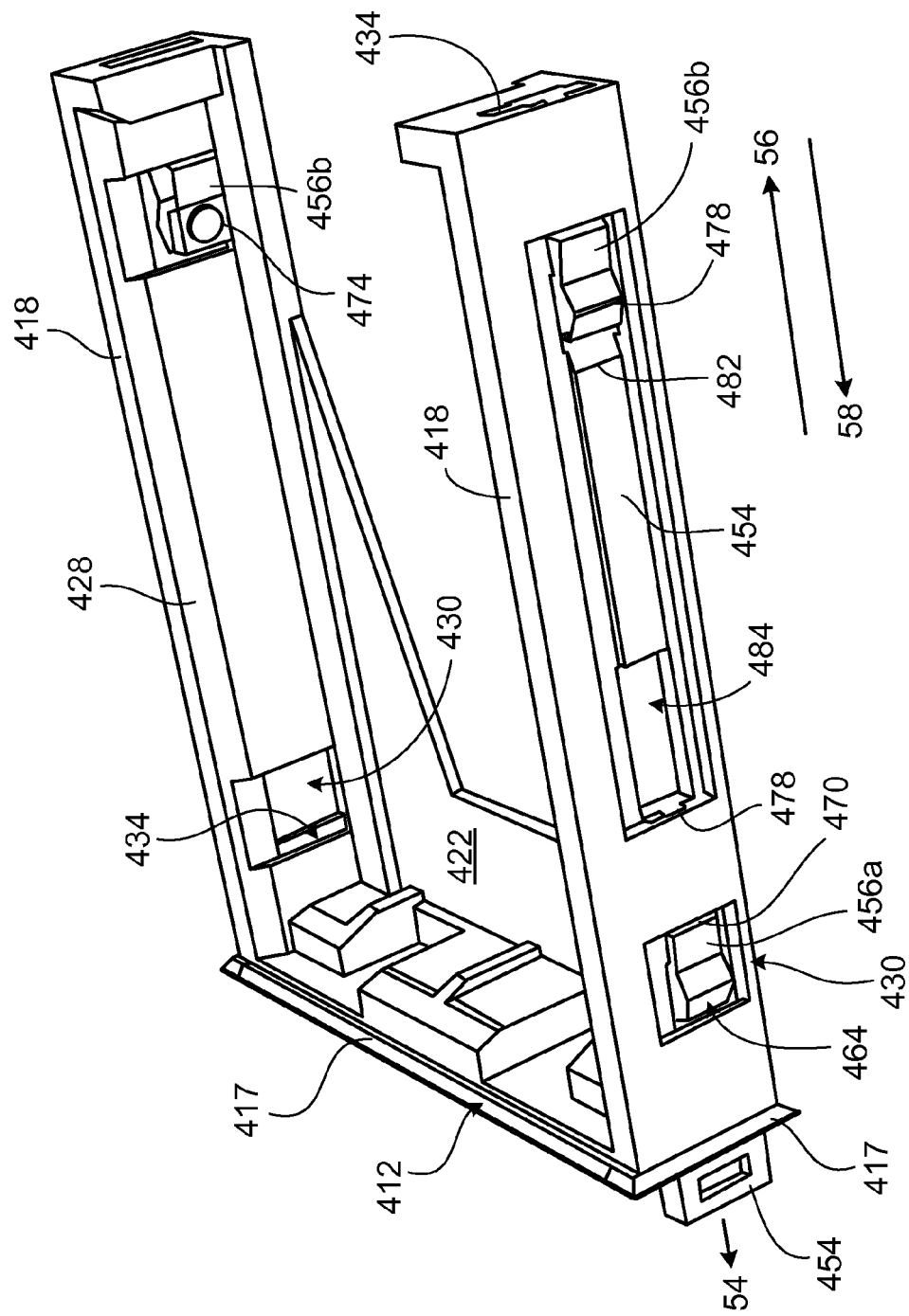

Next, as shown in FIG. 13B, a first one of the actuators 454 is inserted into a first one of the actuator slots 434 through the face plate 412 and is advanced into the slot 434 until the opening 484 in the actuator 454 is aligned with the partial through-hole 438 in the associated sidewall 418. With the actuator 454 in this position, a first one of the proximal spring clamps 456a can be aligned in the opening 484 through the partial through-hole 438, as shown in FIG. 13C. Referring to FIG. 13D, with the proximal spring clamp 456a so aligned, the actuator 454 can be retracted (as indicated by arrow 54) to push the proximal spring clamp 456a forward. During forward movement, the displaceable distal ends 464 of the proximal spring clamp 456a are compressed by the inner surfaces of the actuator slot 434 such that the broad regions 468 of the spring clamp 456a fit within the corresponding actuator slot 434. The proximal spring clamp 456a is advanced, via movement of the actuator 454, into the actuator slot 434 until the edges 470 reach the proximal pass-through apertures 430, at which point the distal ends 464 of the proximal spring clamp 456a extend outwardly toward their rest position with the edges 470 abutting surfaces of the pass-though aperture 430. In this position, the edges 470 inhibit reward movement (indicated by arrow 56) of the proximal spring clamps 456a and the tabs 480 abut the surface forming the partial through-hole 438 to inhibit forward movement (indicated by arrow 58) of the proximal spring clamp 456a. In this manner, the proximal spring clamp 456a is substantially fixed against further linear movement within the actuator slots 434. Assembly of the other proximal spring clamp 456a in on the other sidewall 418 is performed in the same manner.

Figure 15B:
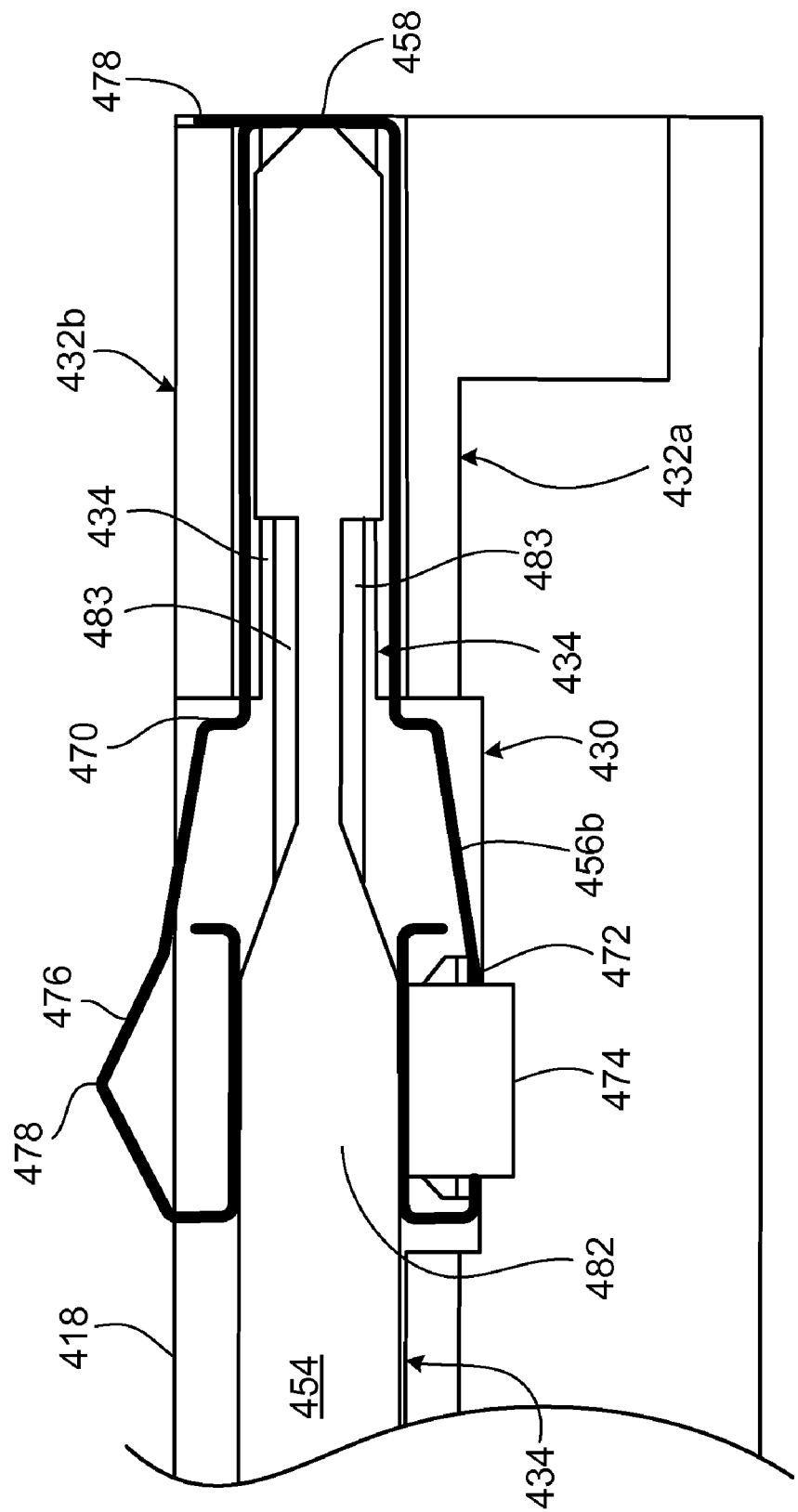
FIG. 15B is a detailed view of one of the spring clamps of FIG. 15A.
Figure 16B:
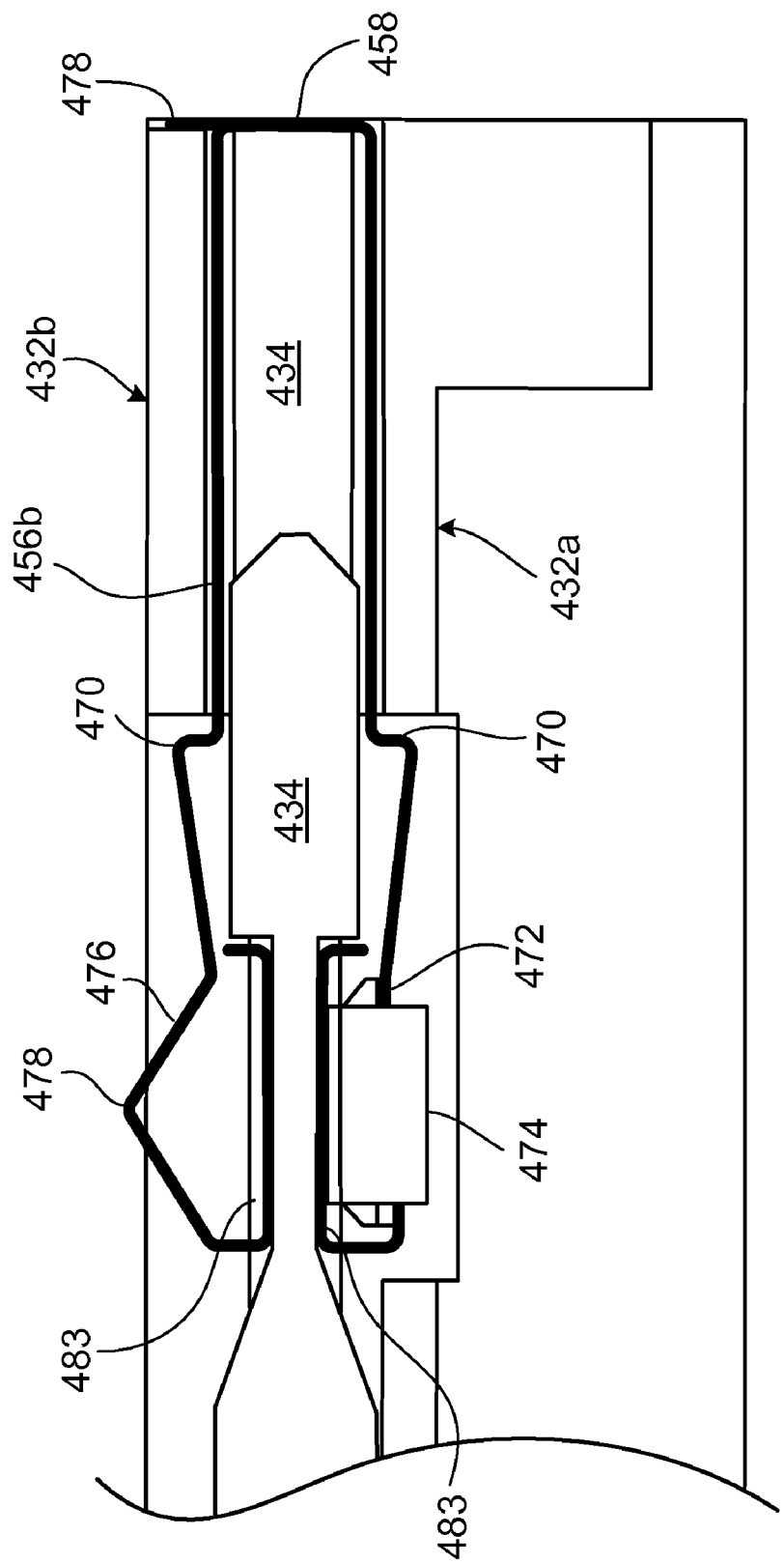
FIG. 16B is a detailed view of one of the spring clamps of FIG. 16A.

Referring to FIG. 14, following assembly, the actuators 454 are each independently slidable within the corresponding actuator slot 434 and are moveable relative to the sidewalls 418 between an engaged and a release position. As shown in FIGS. 15A and 15B, in the engaged position, the wedges 482 of the actuators 454 engage the spring clamps 456a, 456b to cause the first and second engagement members 472, 476 of the spring arms 460a, 460b to extend outwardly from the inner and outer surfaces 432a, 432b of the sidewalls 418. The first and second engagement members 472, 476 of the spring clamps 456a, 456b can also be retracted by pulling the actuators 454 outwardly from the first surface 414 of the face plate 414 (as indicated by arrow 60). As shown in FIGS. 16A and 16B, when the actuators 454 have been retracted to the release position, the engagement members 472, 476 are allowed to retract to a rest position within the recesses 483 of the actuators 454.

Figure 17A:
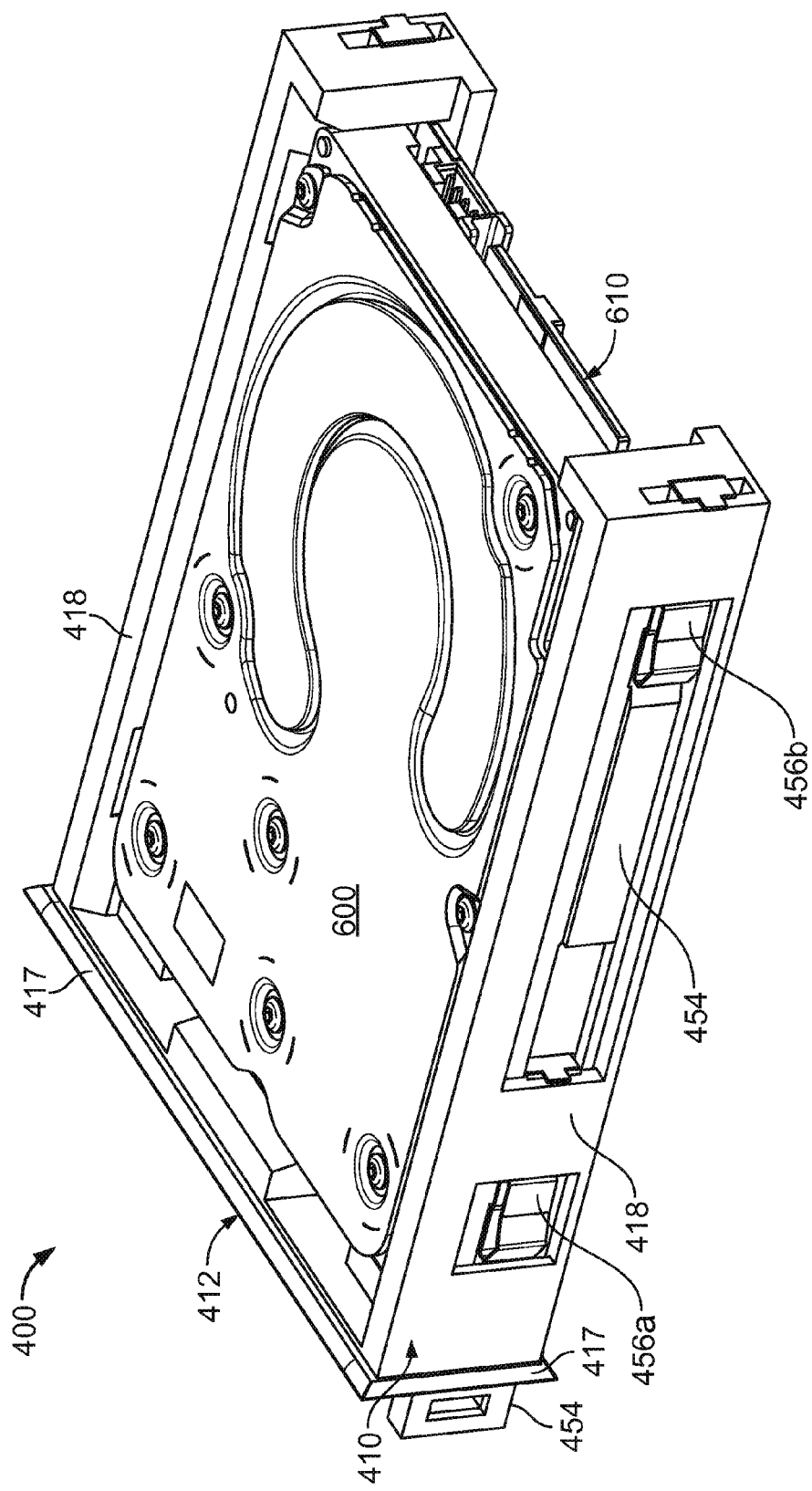
FIGS. 17A and 17B are perspective and plan views of a disk drive transporter supporting a disk drive.
Figure 17B:
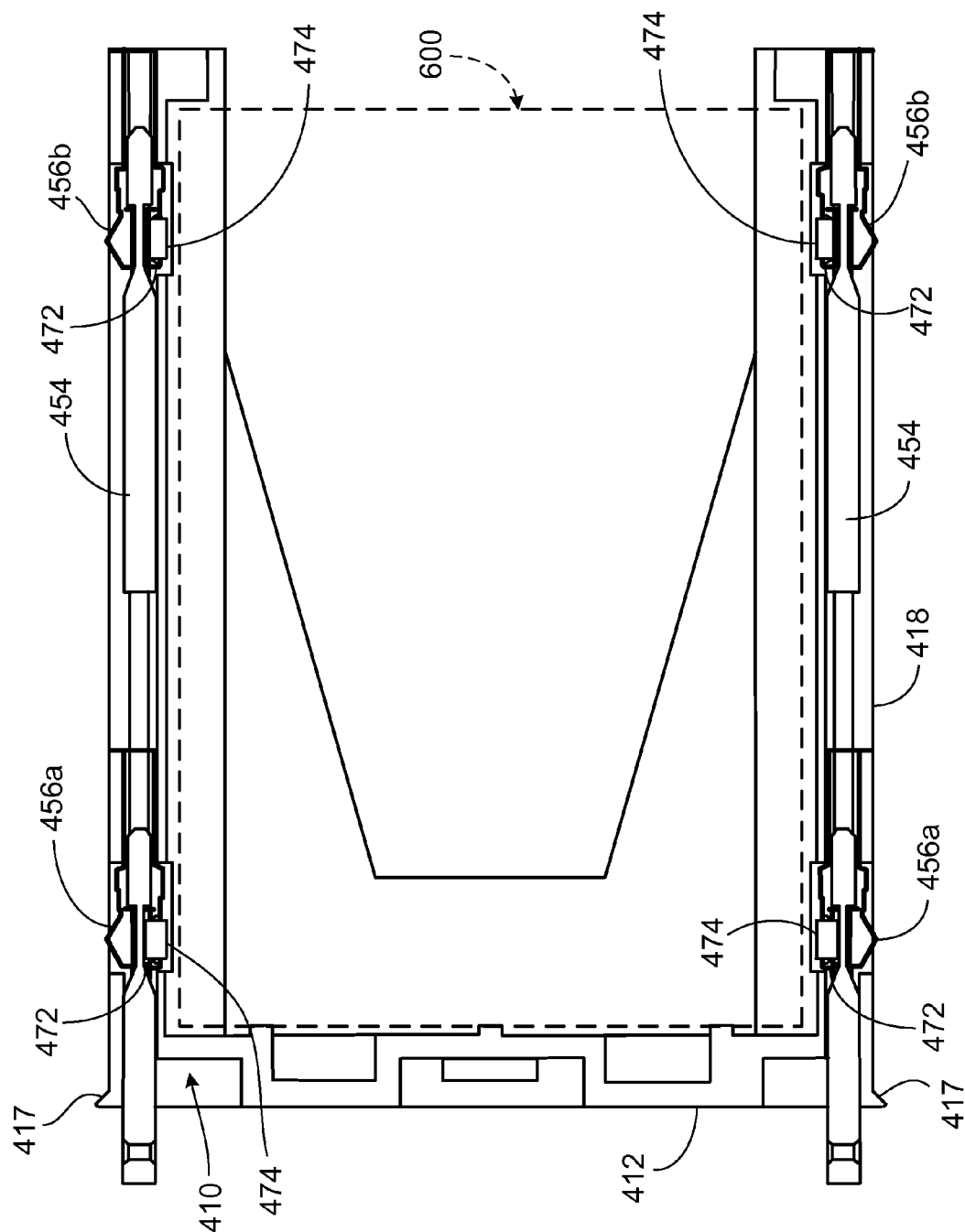
Figure 18:
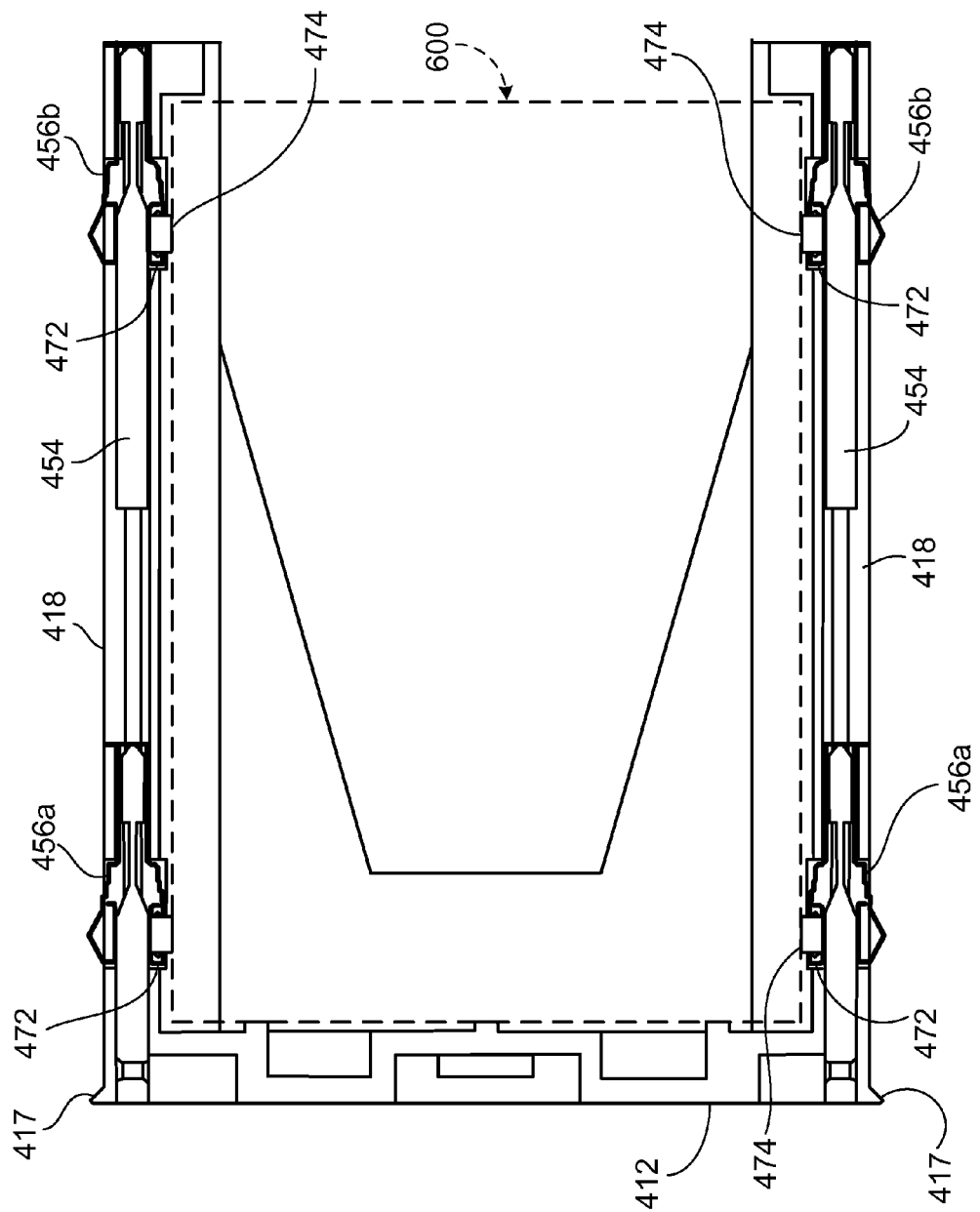
FIG. 18 is a plan view of a disk drive transported clamped to a disk drive.

As shown in FIGS. 17A and 17B, when the actuators 454 are in the release position, with the spring clamps 456a, 456b retracted, a disk drive 600 (shown hidden in FIG. 17B) can be inserted into the frame 410 between the sidewalls 418. With a disk drive 600 inserted in the frame 410, the actuators 454 can be moved towards the engaged position to displace the first engagement members 472 into contact with the disk drive 600 to clamp the disk drive 600 against movement relative to the frame 410, as shown in FIG. 18. When engaged with the disk drive 600, the dampeners 474 can help to inhibit the transfer of vibrations between disk drive transporter 400 and the disk drive 600. The dampeners 474 can also help to limit metal to metal contact between the spring clamps 456a, 456b and the disk drive 600.

Test Slot

As shown in FIG. 19A, the test slot 500 includes a base 510, upstanding walls 512a, 512b and first and second covers 514a, 514b. The test slot 500 includes a rear portion 518 and a front portion 519. The rear portion 518 houses a connection interface board 520, which carries the connection interface circuit 182 (FIGS. 4A and 4B). The connection interface board 520 includes a ribbon cable 522, which provides for electrical communication between the connection interface circuit 182 (FIGS. 4A and 4B) and the test circuitry (e.g., self test system 180 and/or functional test system 190) in the associated test rack 100. The connection interface board 520 also includes a test slot connector 524, which provides for electrical communication between the connection interface circuit 182 and a disk drive in the test slot 500. The front portion 519 of the test slot 500 defines a test compartment 526 for receiving and supporting one of the disk drive transporters 400. The base 510, upstanding walls 512a, 512b, and the first cover 514a together define a first open end 525, which provides access to the test compartment 526 (e.g., for inserting and removing the disk drive transporter 400), and the beveled edges 515, which abut the face plate 412 of a disk drive transporter 400 inserted in the test slot 500 to provide a seal that inhibits the flow of air into and out of the test slot 500 via the first open end 525.

Figure 20A:
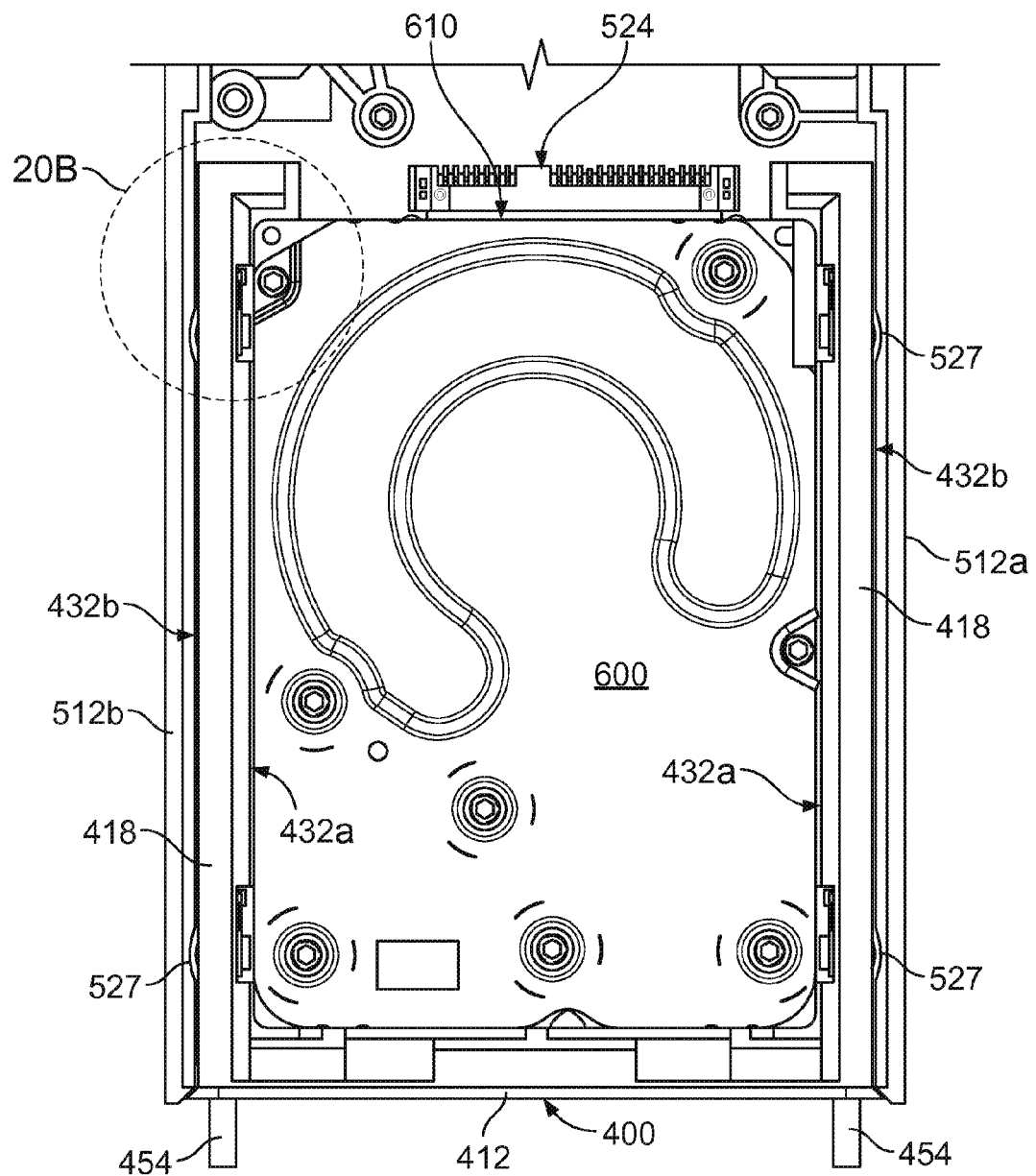
FIG. 20A is a plan view showing a disk drive transporter, supporting a disk drive, inserted in a test slot.
Figure 20B:
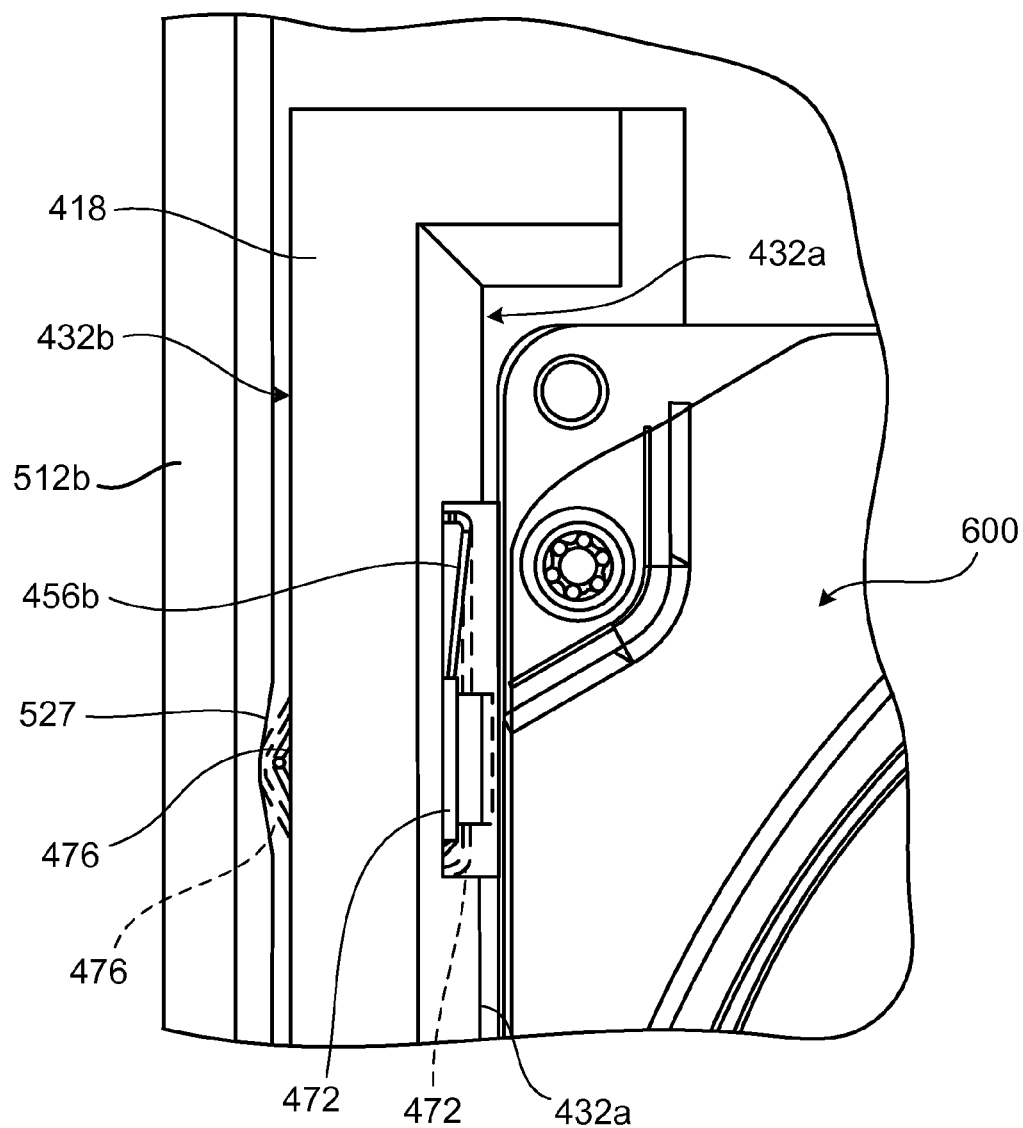
FIG. 20B is a detailed view of a spring clamp from FIG. 20A.

As shown in FIG. 19B, in the region of the test compartment 526, the upstanding walls 512a, 512b define engagement features 527, which provide mating surfaces for the spring clamps 456a, 456b of the disk drive transporter 400 allowing the disk drive transporter 400 to be clamped within the test slot 500. For example, with a disk drive 600 in the disk drive transporter 400 and with the actuators 454 in the release position, the disk drive transporter 400 can be inserted into a test slot 500 until a connector 610 on the disk drive 600 mates with the test slot connector 524, as shown in FIG. 20A. With the disk drive transporter 400 in a fully inserted position within the test slot 500 (i.e., with the disk drive connector 610 mated with the test slot connector 524), the actuators 454 can be moved towards the engaged position to displace the first and second engagement members 472, 476 of the spring clamps 456a, 456b to extend outwardly from the inner and outer surfaces 432a, 432b of the sidewalls 418. As shown in hidden lines in FIG. 20B, in the engaged position, the second engagement members 476 extend outwardly from the outer surfaces 432b of sidewalls 418 and engage the engagement features 527 in the test slot 500 to clamp the disk drive transporter 400 against movement relative to the test slot 500. At the same time, the first engagement members 472 extend outwardly from the inner surfaces 432a of the sidewalls 418 and engage the disk drive 600 to clamp the disk drive 600 against movement relative to the disk drive transporter 400. The disk drives 600 can be sensitive to vibrations. Fitting multiple disk drives 600 in a single test rack 100 and running the disk drives 600 (e.g., during testing), as well as the insertion and removal of disk drives 600 from the various test slots 500 in the test rack 100 can be sources of undesirable vibration. In some cases, for example, one of the disk drives 600 may be operating under test within one of the test slots 500, while others are being removed and inserted into adjacent test slots 500 in the same test rack 100. Retracting the engagement members 476 during insertion and removal, and clamping the disk drive transporter 400 to the test slot 500 after the disk drive transporter 400 is fully inserted into the test slot 500, as described above, can help to reduce or limit vibrations by limiting the contact and scraping between the disk drive transporters 400 and the test slots 500 during insertion and removal of the disk drive transporters 400. Additionally, the ability to retract the engagement members 476 can also help to reduce particle generation that may otherwise result from scraping between the disk drive transporters 400 and the test slots 500 during insertion and removal of the disk drive transporters 400, which may be beneficial since particulate matter can be deleterious to the disk drives 400.

Methods of Operation

Figure 21:
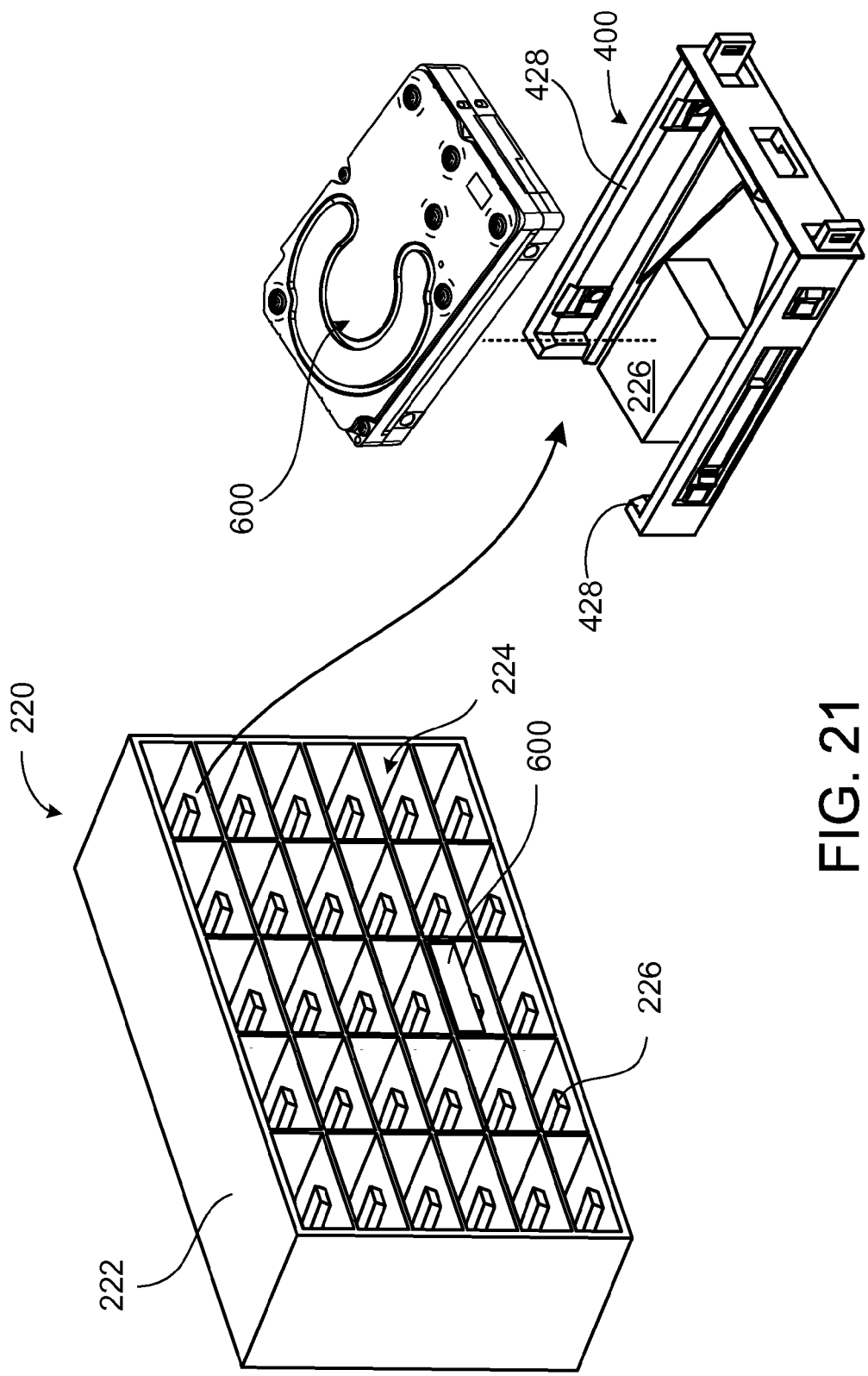
FIG. 21 is a schematic illustration of a disk drive transporter capturing a disk drive from a tote.

In use, one of the disk drive transporters 400 is removed from one of the test slots 500 with the robot 300 (e.g., by grabbing the indentation 416 of the disk drive transporter 400 with the manipulator 312 of the robot 300). As illustrated in FIG. 21, the U-shaped opening formed by the sidewalls 418 and base plate 422 allows the frame 410 to fit around the disk drive support 226 in the tote 220 so that the disk drive transporter 400 can be moved (e.g., via the robotic arm 310) into a position beneath one of the disk drives 600 in the tote 220. The disk drive transporter 400 can then be raised (e.g., by the robotic arm 310) into a position engaging the disk drive 600. As the disk drive transporter 400 is raised, the lead-ins 428 on the sidewalls 418 aid in centering a disk drive 600 in the frame 410.

With the disk drive 600 in place within the disk drive transporter 400, the disk drive transporter 400 can be moved by the robotic arm 310 to position the frame 310 and the disk drive 600 within one of the test slots 500. The manipulator 312 is operable to control actuation of the clamping mechanism 450 (e.g., by controlling movements of the actuators 454). This allows the clamping mechanism 450 to be actuated before the disk drive transporter 400 is moved from the tote 220 to the test slot 500 to inhibit movement of the disk drive 600 relative to the disk drive transporter 400 during the move. Prior to insertion, the manipulator 312 can again move the actuators 454 to the release position to allow for insertion of the disk drive transporter 400 into one of the test slots 500.

Moving the actuators 454 to the release position prior to insertion also allows the disk drive 600 to move relative to the disk drive transporter 400 during insertion, which can aid in aligning the disk drive connector 610 with the test slot connector 524. The disk drive transporter 400 and disk drive 600 are advanced into the test slot 500, via movement of the robotic arm 310, until the disk drive 600 is in a test position with the disk drive connector 610 engaged with the test slot connector 524. Once the disk drive 600 is in the test position, the actuators 454 are moved to the engaged position (e.g., by the manipulator 312) such that the first engagement members 472 engage the disk drive 600 to clamp the disk drive 600 against movement relative to the disk drive transporter 400 and such that the second engagement members 476 engage the engagement features 527 in the test slot 500 to inhibit movement of the disk drive transporter 400 relative to the test slot 500. The clamping of the disk drive transporter 400 in this manner can help to reduce vibrations during testing.

Following testing, the clamping mechanism can be disengaged by moving the actuators 454 (e.g., with the manipulator 312) to the release position to disengage the engagement members 472, 476 from the disk drive 600 and the test slot 500. Once the clamping mechanism 450 is disengaged the disk drive transporter 400 and disk drive 600 can be withdrawn from the test slot 500, e.g., by engaging the indentation 416 in the face plate 412 with the manipulator 312 and pulling the disk drive transporter 400 out of the test slot 500 with the robotic arm 310. During withdrawal, the back hooks 426 of the sidewalls 418 can help in disengaging the disk drive connector 610 from the test slot connector 524.

The disk drive transporter 400 and the tested disk drive 600 can then be returned to the loading station 200 with the robotic arm 310. In some cases, for example, once the disk drive transporter 400 is sufficiently withdrawn from the test slot 500, the clamping mechanism 450 can again be actuated (e.g., with the manipulator 312) before the disk drive transporter 400 is moved from the test slot 500 to the loading station 200 to inhibit movement of the disk drive 600 relative to the disk drive transporter 400 during the move. The process can be repeated for each of the disk drives in the loading station 200.

Other Embodiments

Other embodiments are within the scope of the following claims.

For example, while the test slot assemblies described above includes particular mechanisms for clamping with the disk drive transporter, the test slot assemblies can also include other mechanisms for clamping. For example, FIG. 22 illustrates another embodiment of a test slot assembly 120a including a disk drive transporter 400a and a test slot 500a in which the test slot 500a performs a clamping function. As shown in FIG. 23A, the test slot 500a includes a base 510a, upstanding walls 513a, 513b and first and second covers 517a, 517b. The test slot 500a includes a rear portion 518a and a front portion 519a. The front portion 519a of the test slot 500a defines a test compartment 526a for receiving and supporting one of the disk drive transporters 400. The base 510a, upstanding walls 513a, 513b, and the first cover 517a together define a first open end 525a, which provides access to the test compartment 526a (e.g., for inserting and removing the disk drive transporter 400a).

Figure 23B:
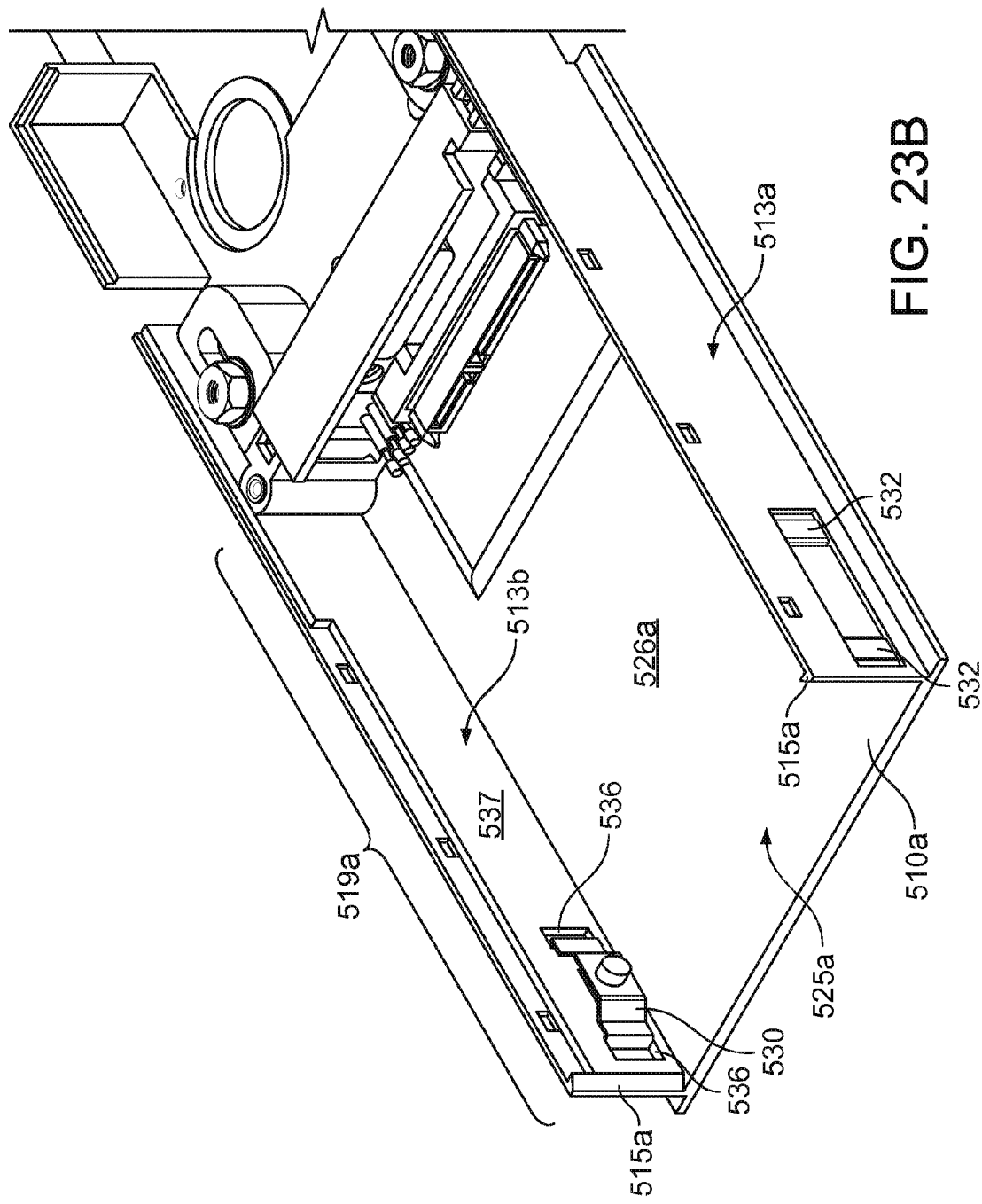
FIG. 23B is a perspective view of a test compartment from the test slot of FIG. 23A.
Figure 24:
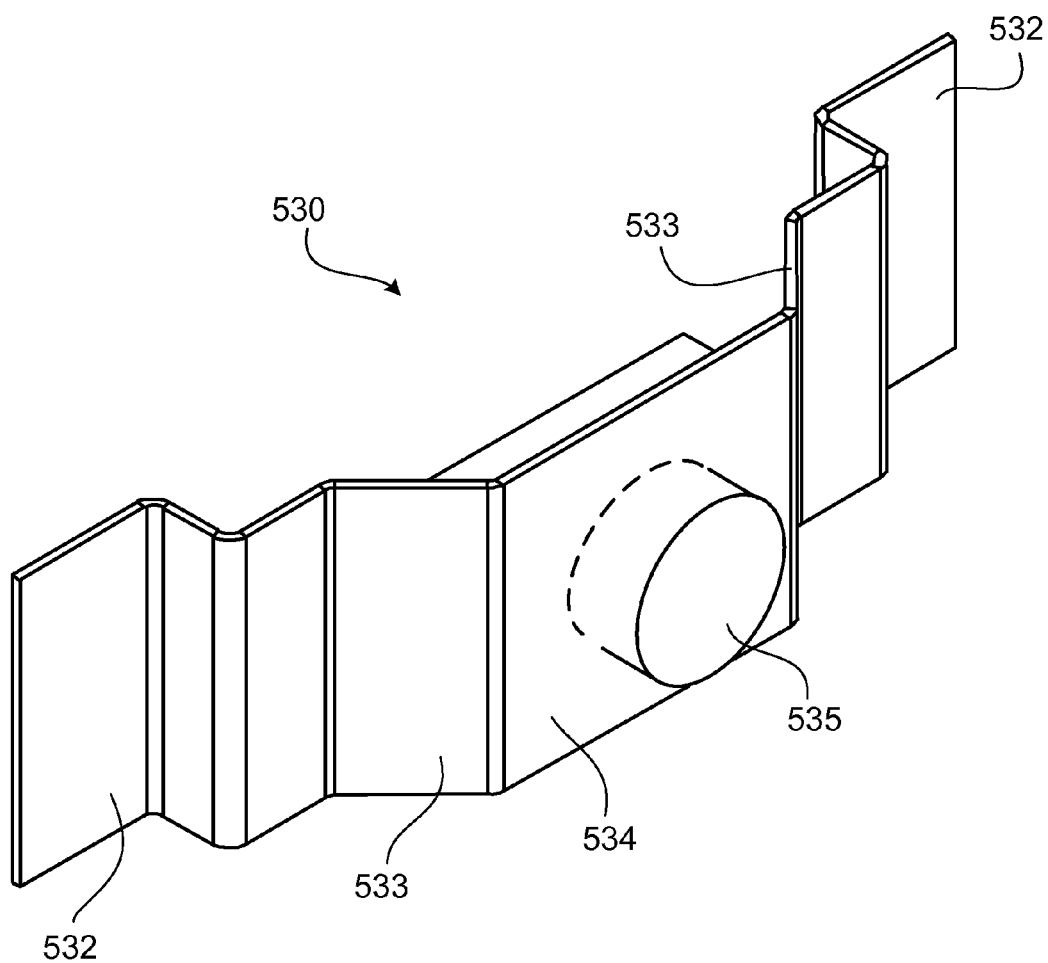
FIG. 24 is a perspective view of a clamping spring.

As shown in FIG. 23B, in the region of the test compartment 526a, the test slot 500a also includes clamping springs 530. As shown in FIG. 24, the clamping springs 530 include retaining tabs 532, ramp surfaces 533, and an engagement member 534 including a dampener 535. Referring again to FIG. 23B, the upstanding walls 513a, 513b include mounting holes 536. The retaining tabs 532 of the clamping springs 530 sit within the mounting holes 536 and retain the clamping springs 530 in place on inner surfaces 537 of the upstanding walls 513a, 513b.

Figure 25B:
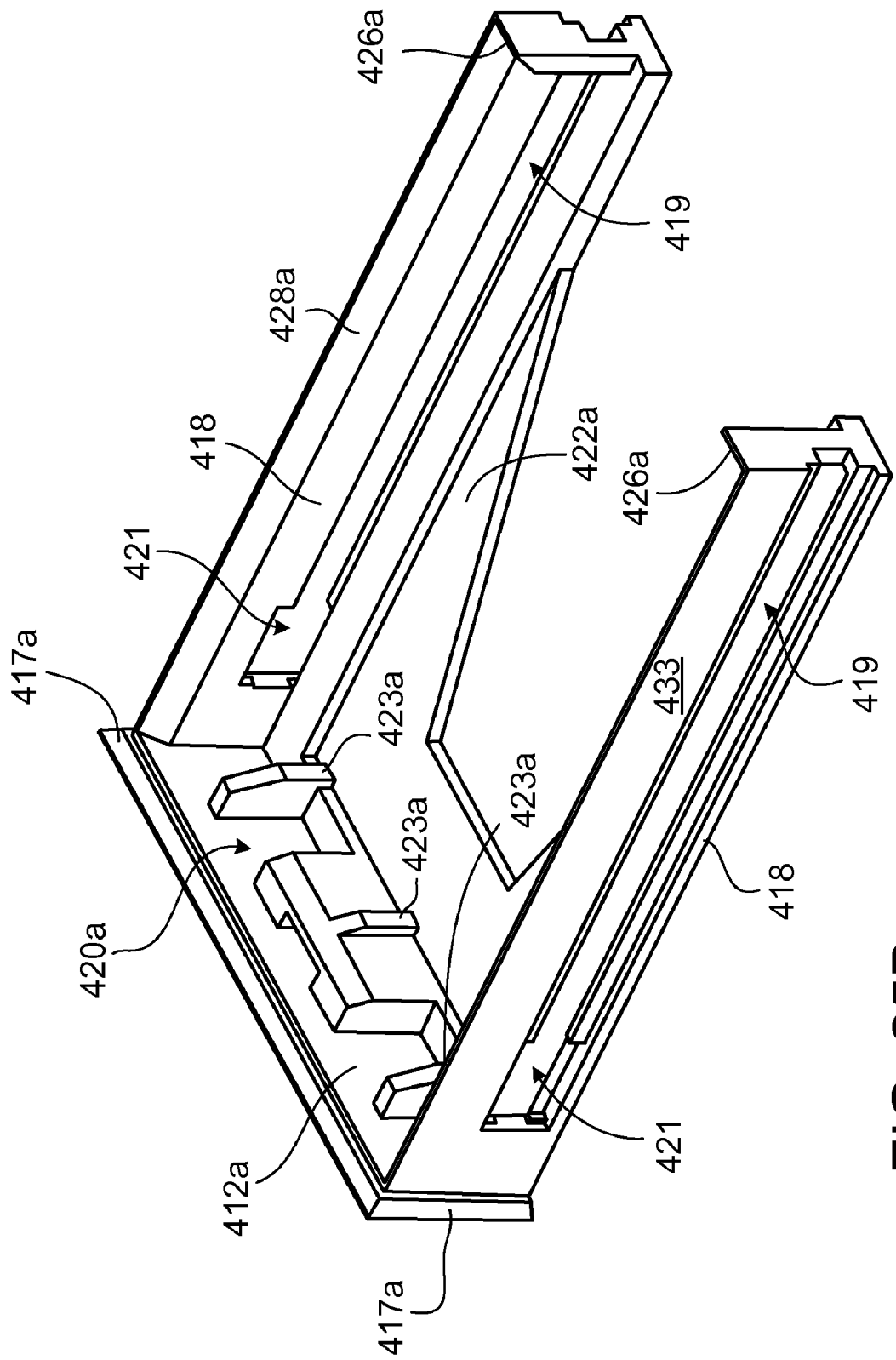

As shown in FIGS. 25A and 25B, the disk drive transporter 400a generally includes a frame 410a. The frame 410a includes a face plate 412a. Along a first surface 414a, the face plate 412a defines an indentation 416a. The indentation 416a is releasably engageable by a mating protrusion on the manipulator 312 of the robotic arm 310, which allows the robotic arm 310 to grab and move the disk drive transporter 400a. The face plate 412a also includes beveled edges 417a. When the disk drive transporter 400a is inserted into one of the test slots 500a, the beveled edges 417a of the face plate 412a abut complimentary beveled edges 515a of the test slot 500a to form a seal, which helps to inhibit the flow of air into and out of the test slot 500a.

Referring still to FIGS. 25A and 25B, the frame 410a also includes a pair of sidewalls 418a, which extend outwardly from a second surface 420a of the face plate 412a, and a base plate 422a that extends between and connects the sidewalls 418a. As shown in FIG. 25B, along the second surface 420a, the face plate 412a defines projections 423a, which can aid in applying force to the disk drive 600a as the disk drive transporter 400a is inserted into the test slot 500a.

Figure 25C:
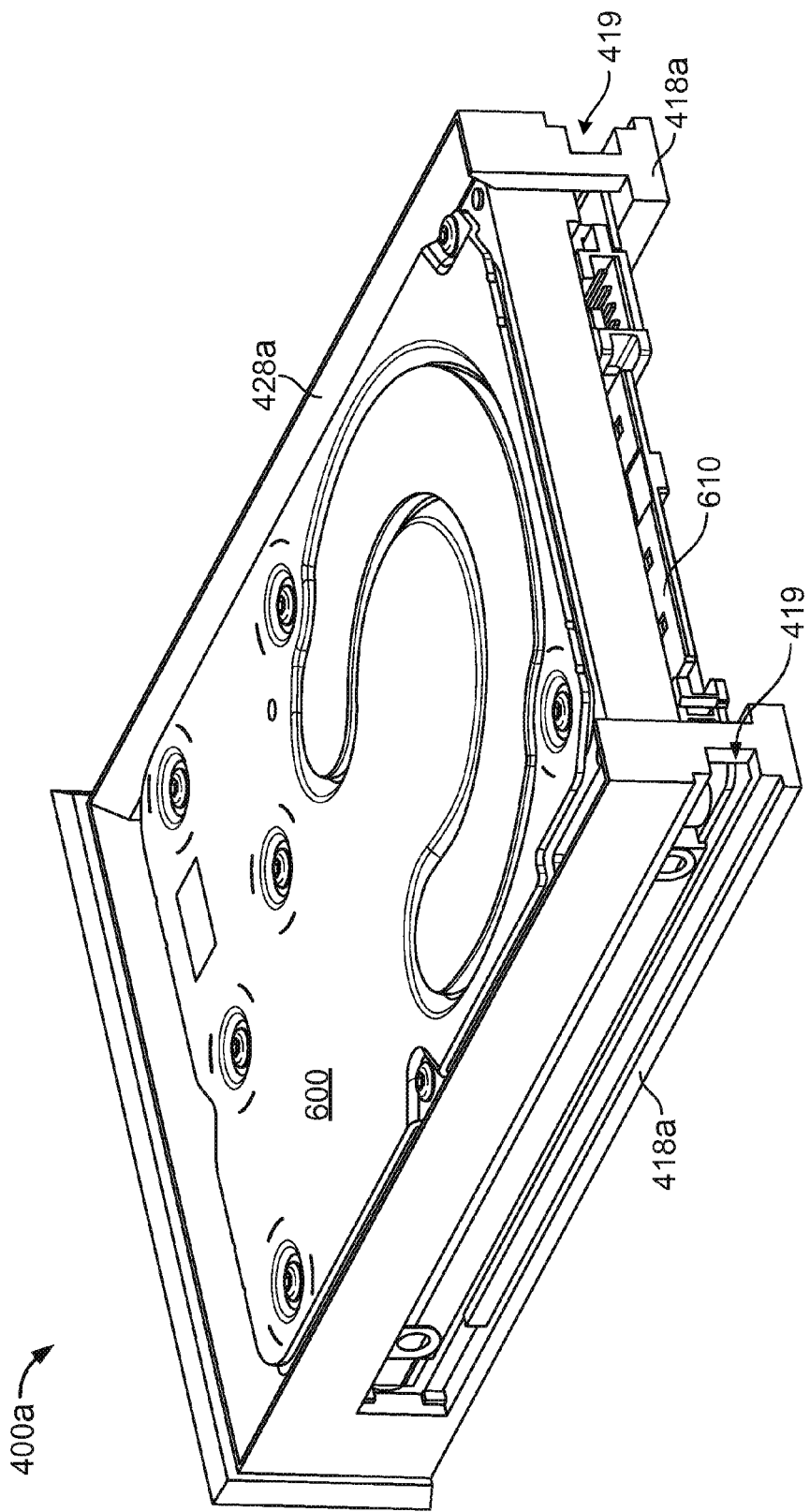
FIG. 25C is a perspective view of the disk drive transporter of FIGS. 25A and 25B supporting a disk drive.

As shown in FIG. 25C, the sidewalls 418a are spaced to receive a disk drive 600 therebetween, and define surfaces 424a for supporting a disk drive 600. The sidewalls 418a also define back hooks 426a, which can be useful for extracting the disk drive 600 from the test slot 500a. The sidewalls 418a also define lead-ins 428a, which can aid in centering a disk drive 600 in the frame 410a.

Figure 26B:
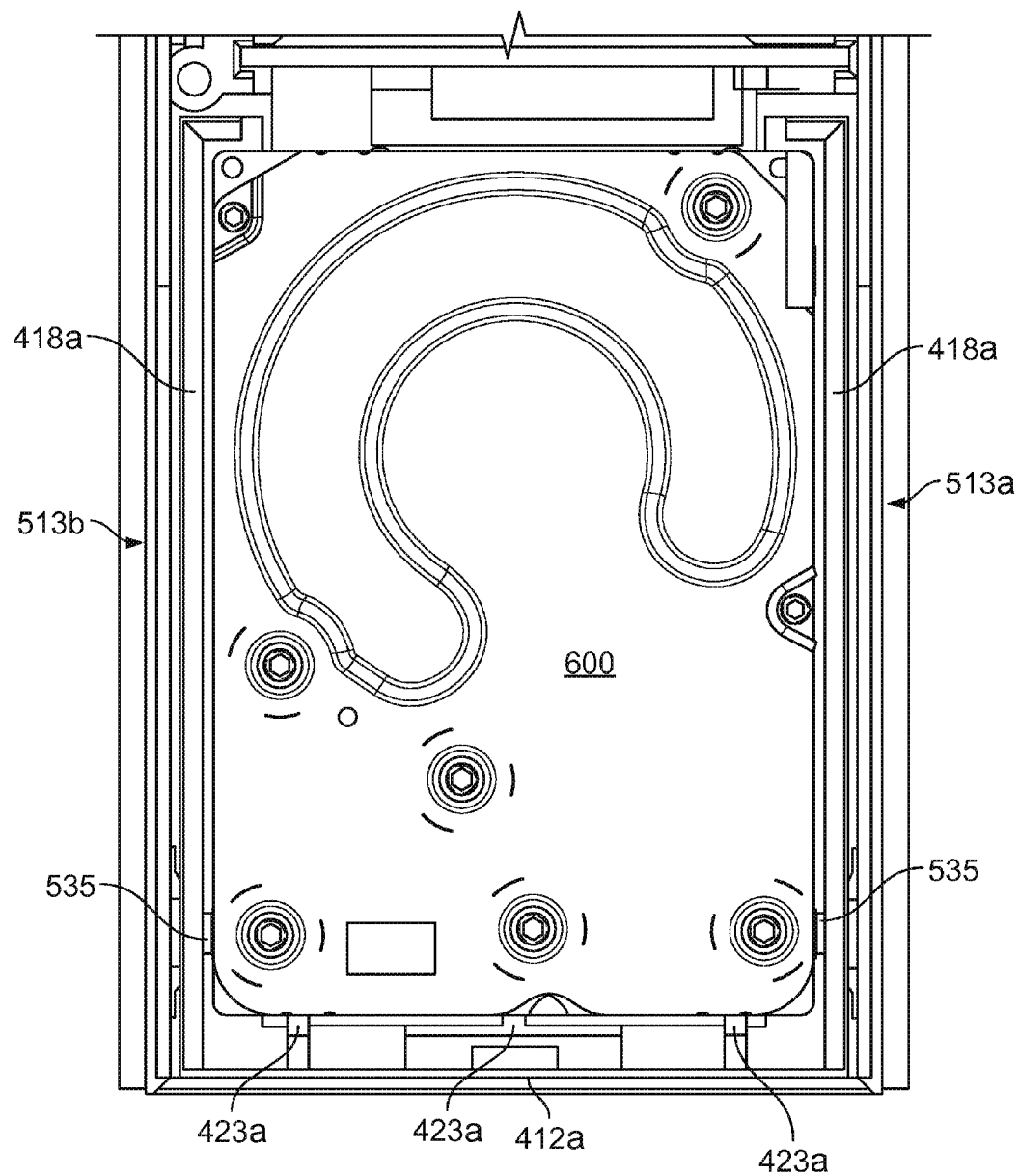
FIG. 26B is plan view showing a disk drive transporter, supporting a disk drive, inserted in a test slot.

Referring again to FIGS. 25A and 25B, the sidewalls 418a define slots 419 which extend from distal ends 436a of the side walls 418a and terminate in pass-through apertures 421. The pass through apertures 421 are sized to allow the engagement members 534 to pass therethrough. During insertion of the disk drive transporter 400a into the test slot 500a outer surfaces 433 of the side walls 418a engage the ramp surfaces 533 of the clamping springs 530 causing the clamping springs 530 to be compressed and the engagement members 534 to be displaced towards the inner surfaces 537 of the upstanding walls 513a, 513b. As the disk drive transporter 400a is advanced into the test slot 500a the dampeners 535 slide within the slots 419 in the side walls 418a. As shown in FIGS. 26A and 26B, when the disk drive transporter 400a reaches the fully inserted position, the engagement members 534 extend through the pass through apertures 421 in the side walls 418a such that the dampeners 535 can engage a disk drive 600 (FIG. 26B) carried by the disk drive transporter 400a.

Figure 27B:
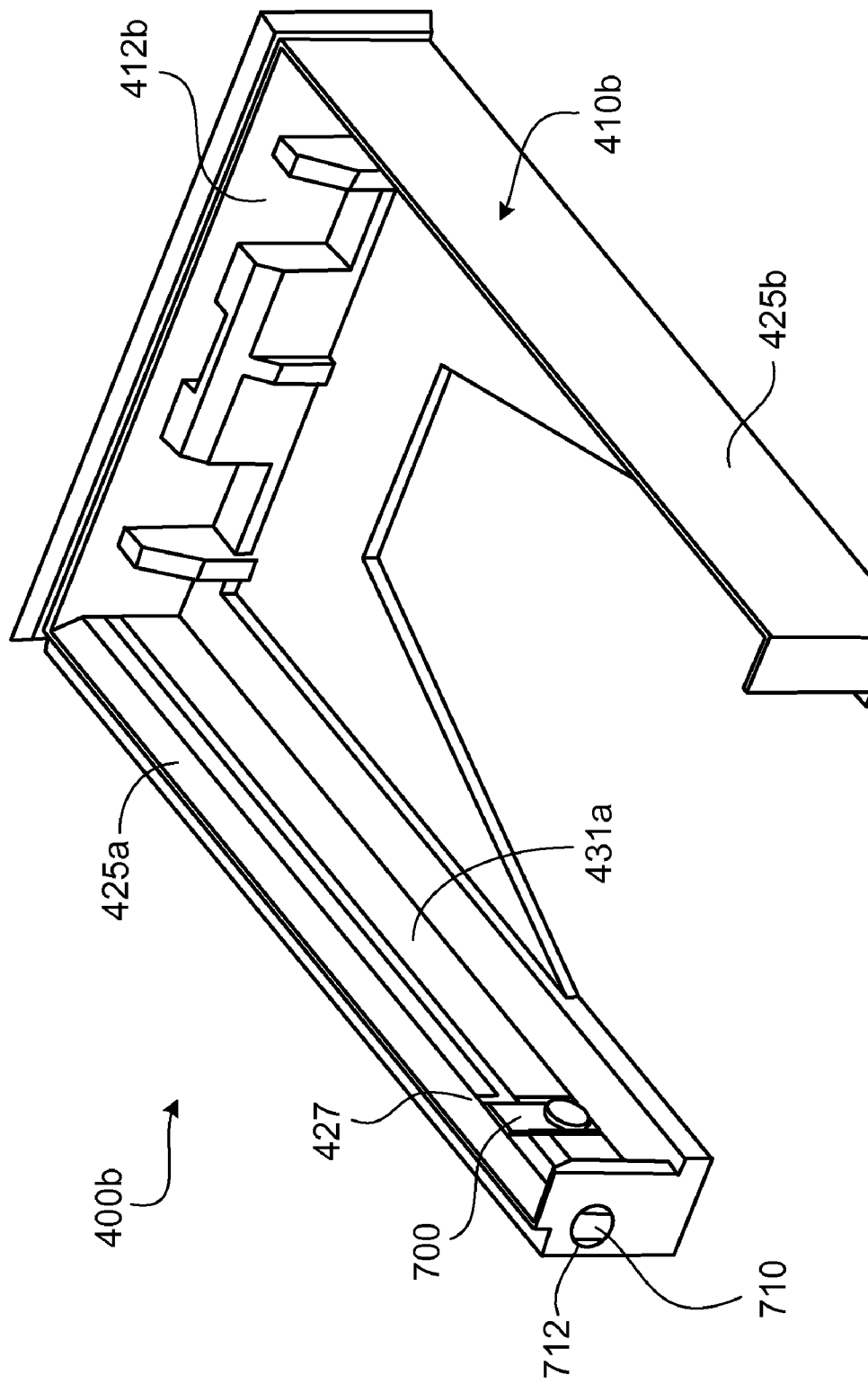

FIGS. 27A and 27B, illustrate another embodiment of a disk drive transporter 400b having a clamping mechanism. The disk drive transporter 400b includes a frame 410b having a face plate 412b and a pair of sidewalls 425a, 425b. A first one of the sidewalls 425a defines a pass-through aperture 427 which extends between inner and outer surfaces 431a, 431b of the first sidewall 425a. An engagement element (e.g., spring clamp 700) is disposed within the pass-through aperture 427.

Figure 28:
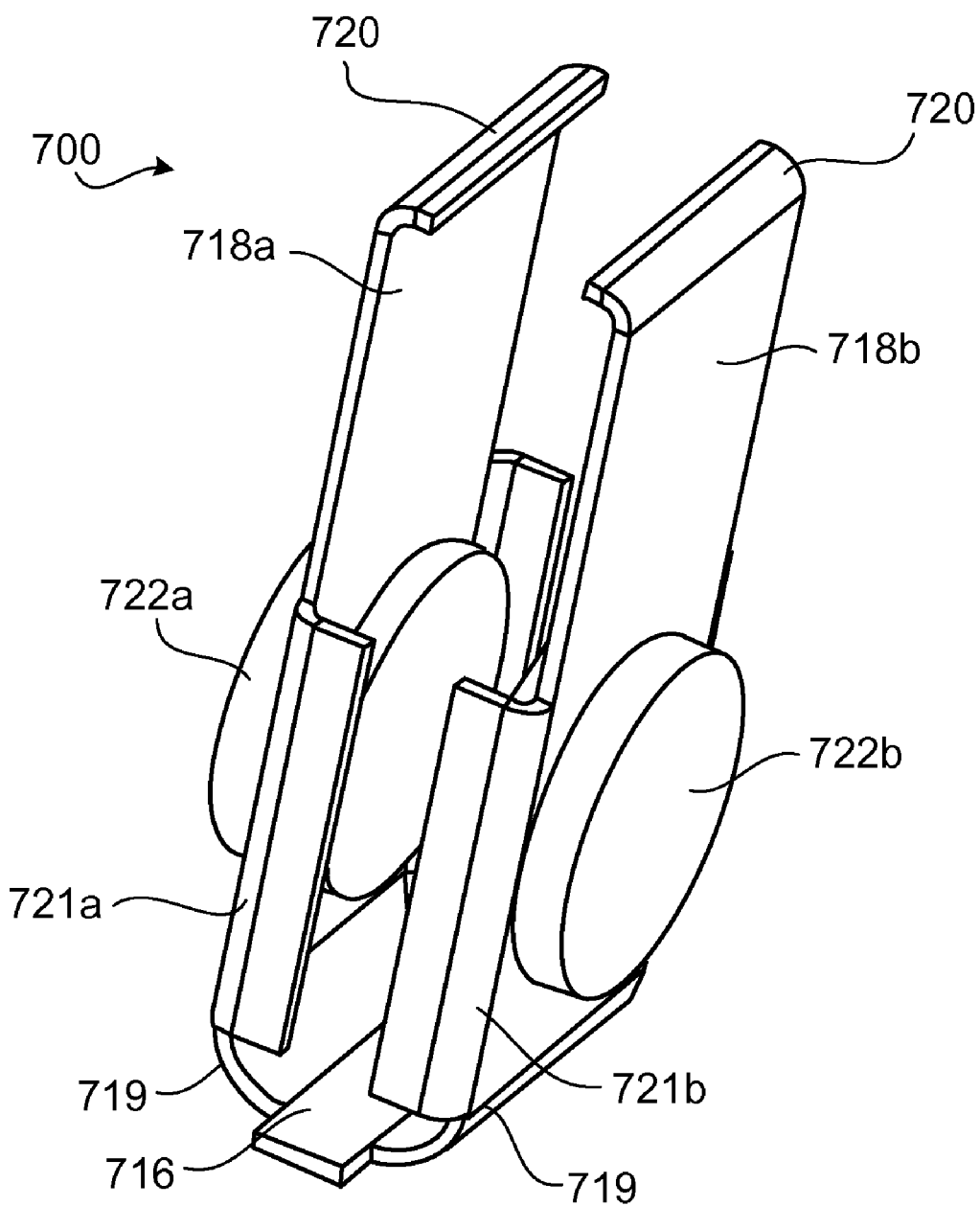
FIG. 28 is a perspective view of a spring clamp.
Figure 29:
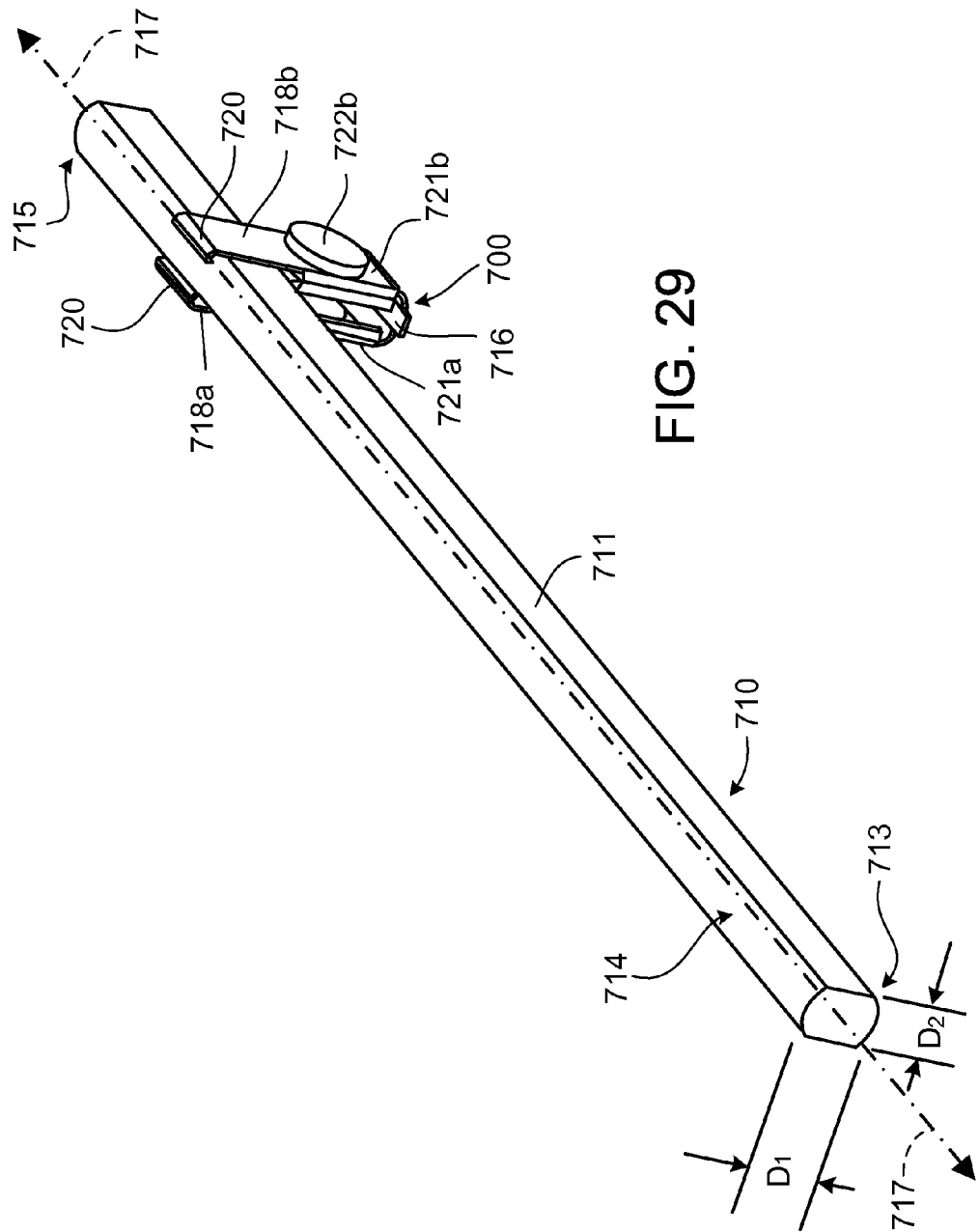
FIG. 29 is a perspective view of a clamping assembly.

As shown in FIG. 28, the spring clamp 700 includes a base portion 716 and first and second spring arms 718a, 718b each having a proximal end 719 connected to the base portion 716 and a displaceable distal end 720. The first spring arm 718a includes a first engagement member 721a having a first dampener 722a, and the second spring arm 718b includes a second engagement member 721b having a second dampener 722b. An actuator 710 is operatively associated with the spring clamp 700. The actuator 710 passes through the face plate 412b and into an actuator slot 712 in the first sidewall 425a. As shown in FIG. 29, the actuator 710 has an elongate body 711 extending from a proximal end 713 to a distal end 715 along a first axis 717. Along its length the actuator 710 has a cross-section that includes a broad dimension D1 and a narrow dimension D2.

Figure 30A:
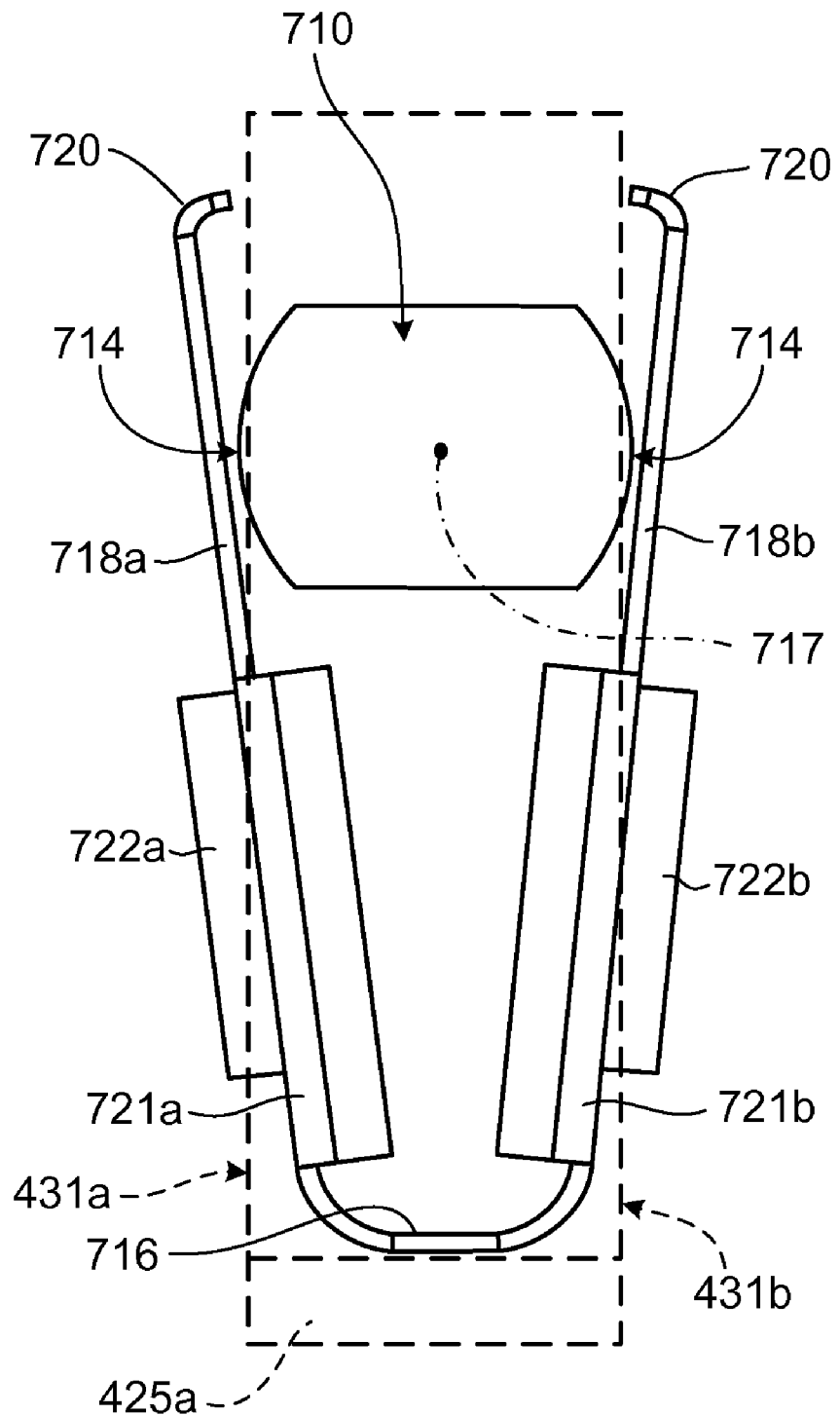
FIG. 30A illustrates the clamping assembly of FIG. 29 in an engaged position.
Figure 30B:
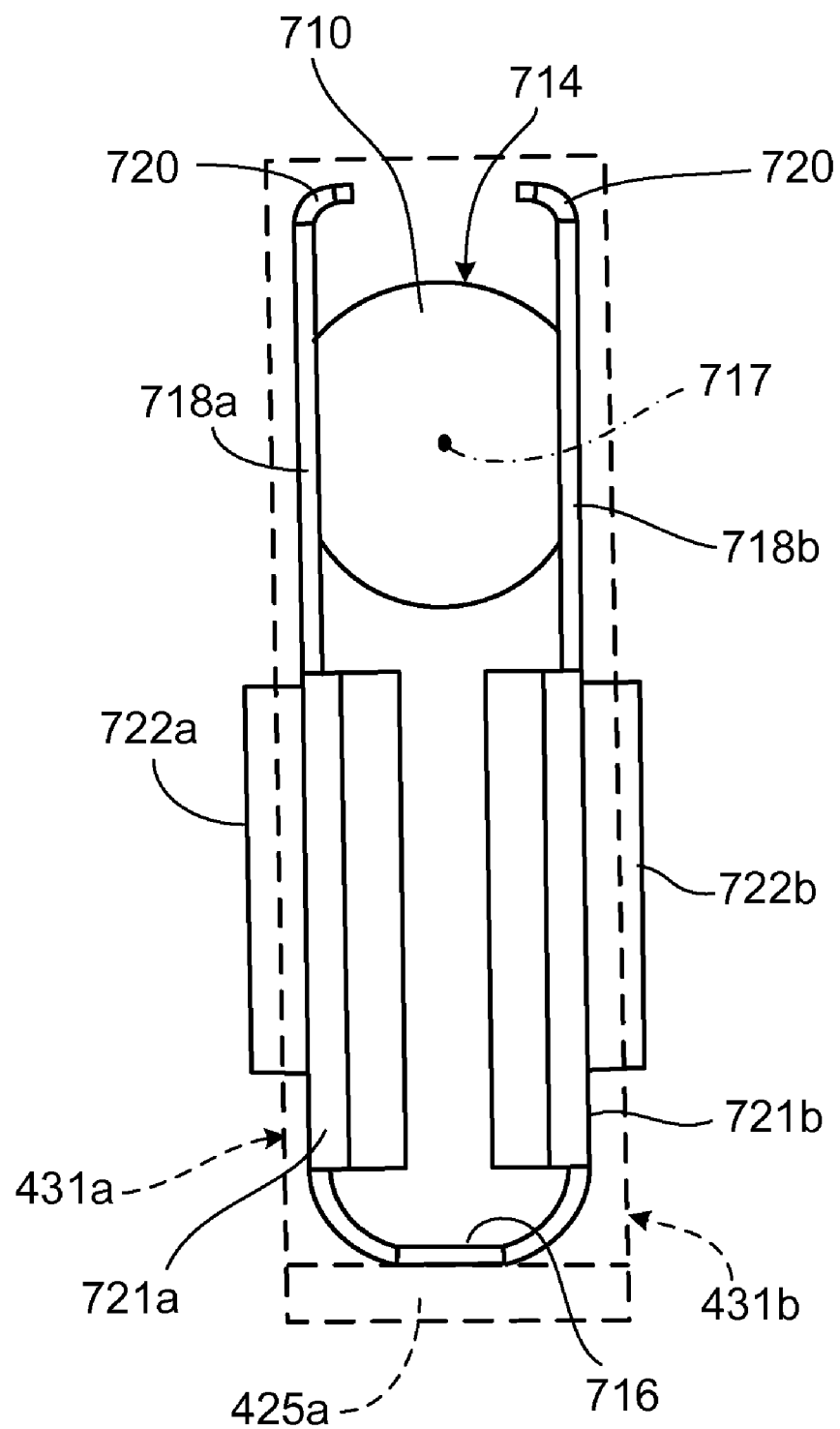
FIG. 30B illustrates a clamping assembly of FIG. 29 in a disengaged position.

The actuator 710 is rotatable, about the first axis 717, within the actuator slot 712 between an engaged and a release position to initiate movements of the spring clamp 700. As shown in FIG. 30A, in the engaged position, cam surfaces 714 of the actuator 710 engage the spring clamp 700 to cause the displaceable distal ends of the spring arms 720 to extend outwardly from the inner and outer surfaces 431a, 431b of the first sidewall 425a (shown hidden). The displaceable distal ends 720 of the spring arms 720 can also be refracted by rotating the actuator 710 to the release position, as shown in FIG. 30B. When the actuator 710 has been rotated to the release position, the displaceable distal ends of the spring arms 720 are allowed to retract.

Figure 31:
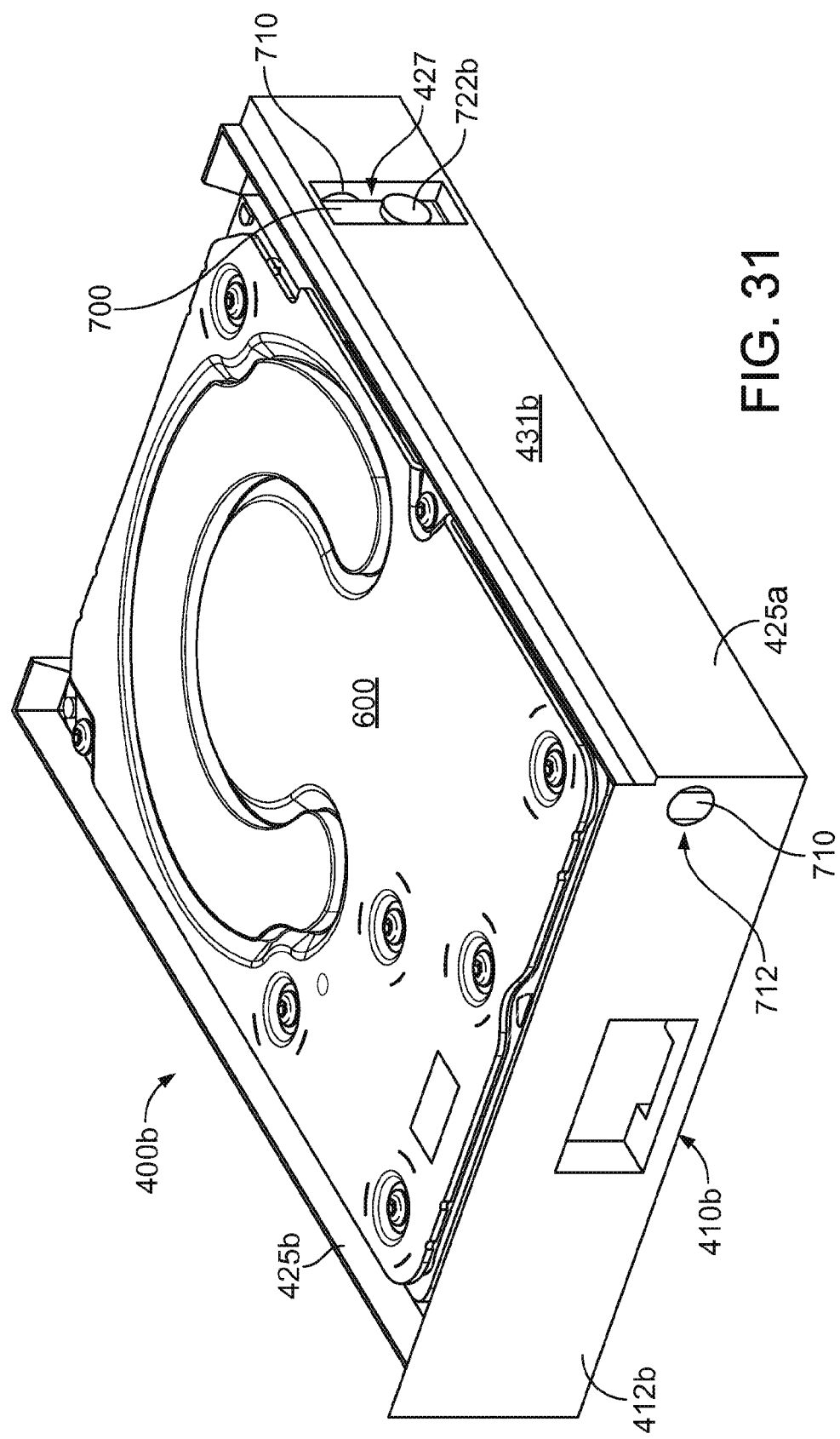
FIG. 31 is a perspective view of the disk drive transporter of FIGS. 27A and 27B supporting a disk drive.
Figure 32:
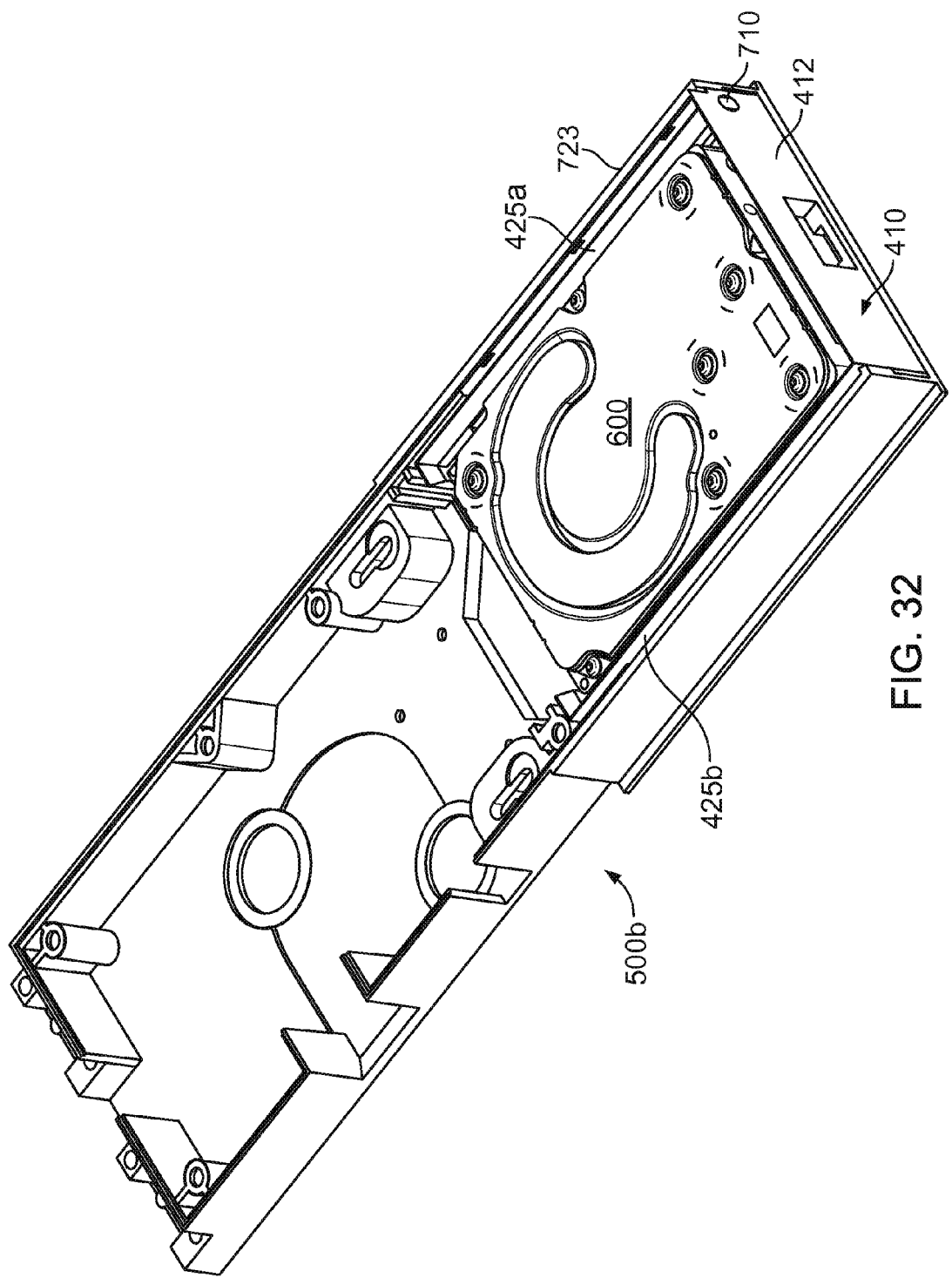
FIG. 32 is plan view showing a disk drive transporter, supporting a disk drive, inserted in a test slot.

When the actuator 710 is in the release position, with the spring clamp 700 retracted, a disk drive 600 can be inserted into the frame 410b between the sidewalls 425a, 425b, as shown in FIG. 31. Once a disk drive 600 is inserted in the frame 410b, the actuator 710 can be rotated towards the engaged position to displace the first engagement member into contact with the disk drive 600 to clamp the disk drive 600 against movement relative to the frame 410b. In a similar manner, the disk drive transporter 400b can also be clamped within a test slot. For example, with a disk drive 600 in the frame 410b and with the actuator 710 in the release position, the disk drive transporter 400b can be inserted into a test slot 500b, as shown in FIG. 32 (test slot shown with covers removed for clarity). With the disk drive transporter 400b in a fully inserted position within the test slot 500b (i.e., with the disk drive connector mated with the test slot connector) the actuator 710 can be rotated towards the engaged position to displace the first and second engagement members 721a, 721b to extend outwardly from the inner and outer surfaces of the first sidewall 425a. In this position, the second engagement member 721b of the spring clamp 700 extends outwardly from the outer surface 431b of first sidewall 425a and engages a wall 723 of the test slot 500b, thereby clamping the disk drive transporter 400b against movement relative to the test slot 500b. At the same time, the first engagement member 721a of the spring clamp 700 extends outwardly from the inner surface 431a of the first sidewall 425a and engages the disk drive 600 to clamp the disk drive 600 against movement relative to the disk drive transporter 400b.

Figure 33A:
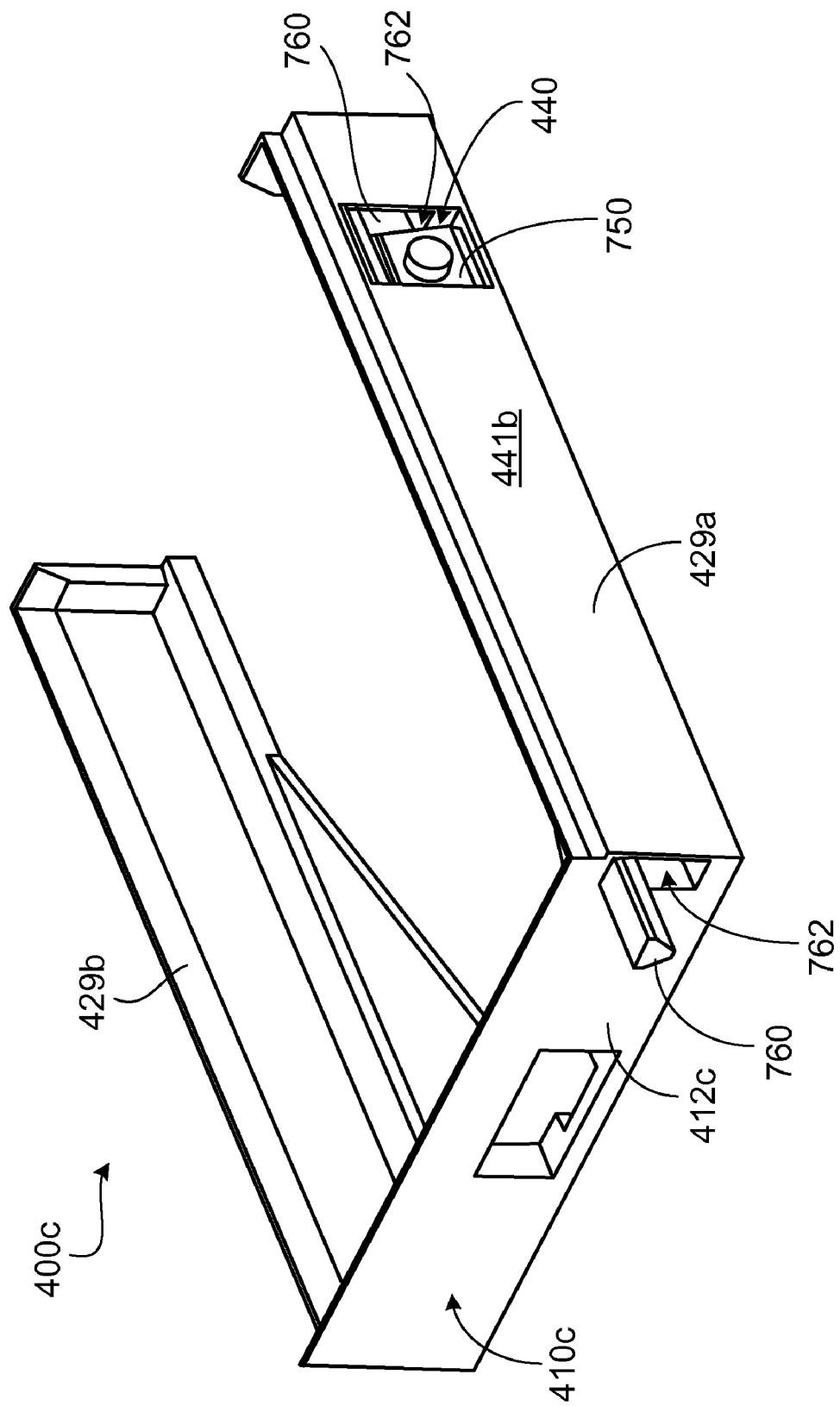
FIGS. 33A and 33B are perspective views of a disk drive transporter.
Figure 33B:
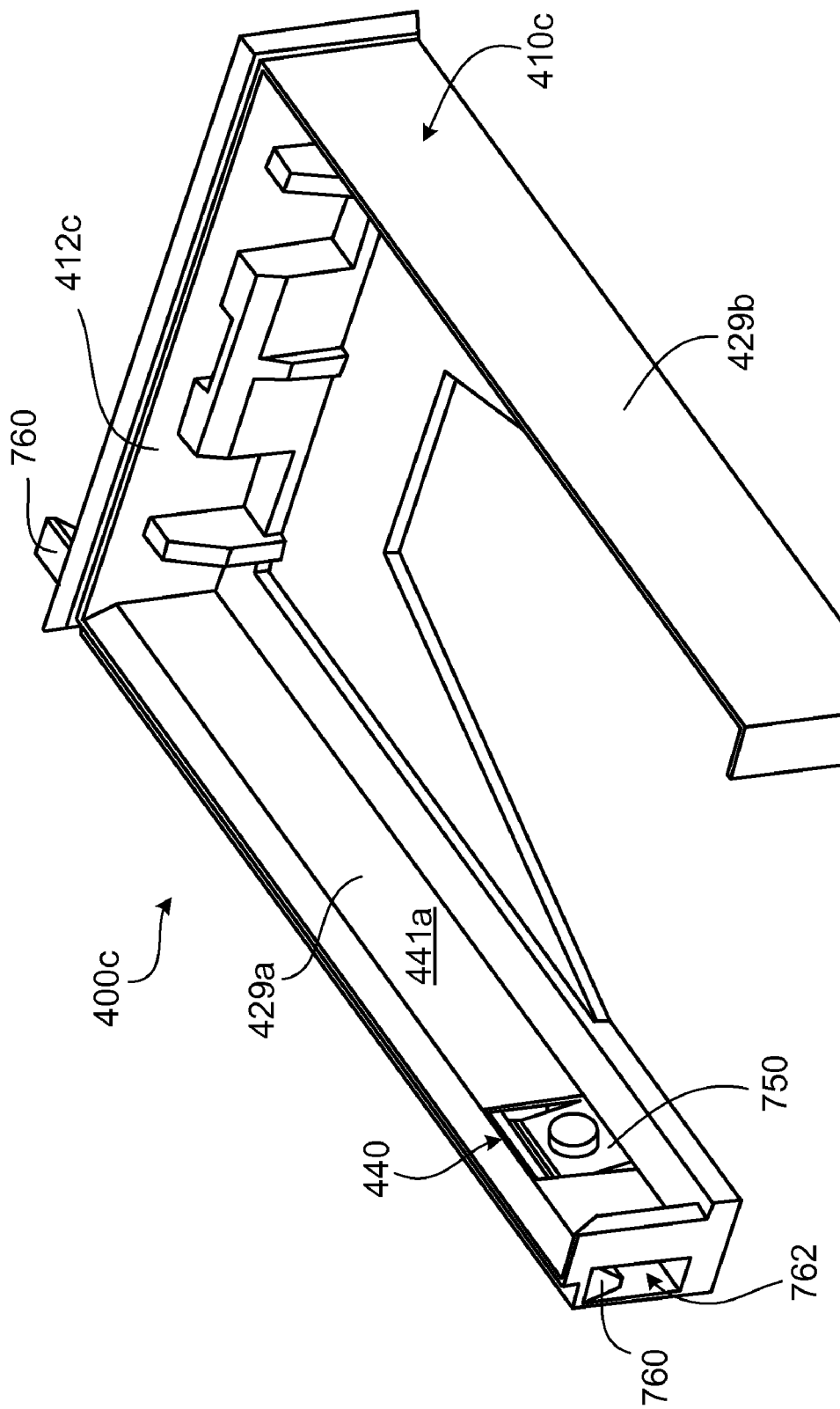

FIGS. 33A and 33B illustrate yet another embodiment of a disk drive transporter 400c having a clamping mechanism (e.g. for clamping a disk drive within the disk drive transporter and/or for clamping the disk drive transporter within a test slot). As shown in FIGS. 33A and 33B, the disk drive transporter 400c includes a frame 410c having a face plate 412c and a pair of sidewalls 429a, 429b. A first one of the sidewalls 429a defines a pass-through aperture 440 which extends between inner and outer surfaces 441a, 441b of the first sidewall 429a. An engagement element (e.g., spring clamp 750) is disposed within the pass-through aperture 427.

Figure 34:
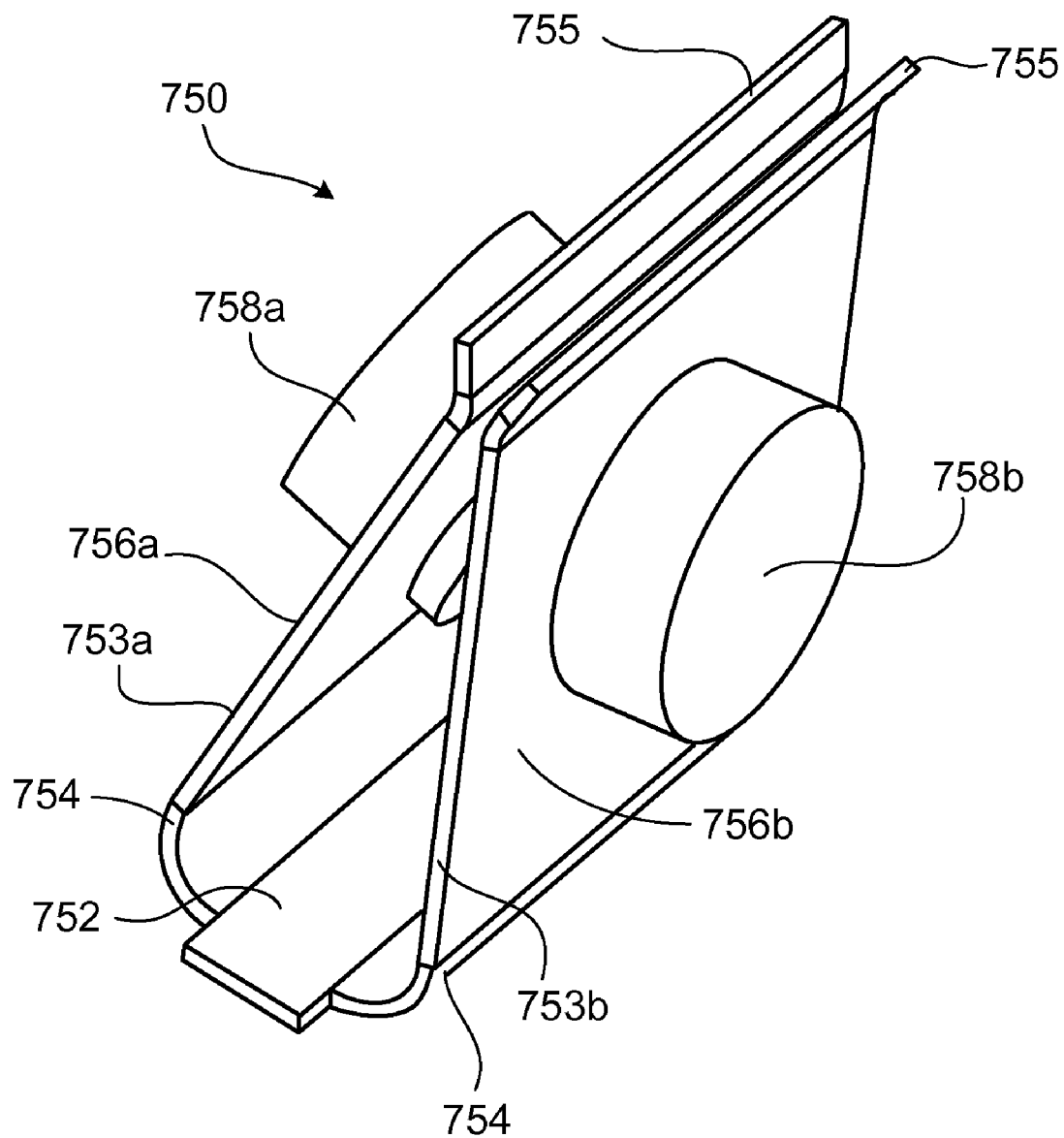
FIG. 34 is a perspective view of a spring clamp.

As shown in FIG. 34, the spring clamp 750 includes a base portion 752 and first and second spring arms 753a, 753b each having a proximal end 754 connected to the base portion 752 and a displaceable distal end 755. The first spring arm 753a includes a first engagement member 756a having a first dampener 758a, and the second spring arm 753b includes a second engagement member 756b having a second dampener 758b.

Figure 35:
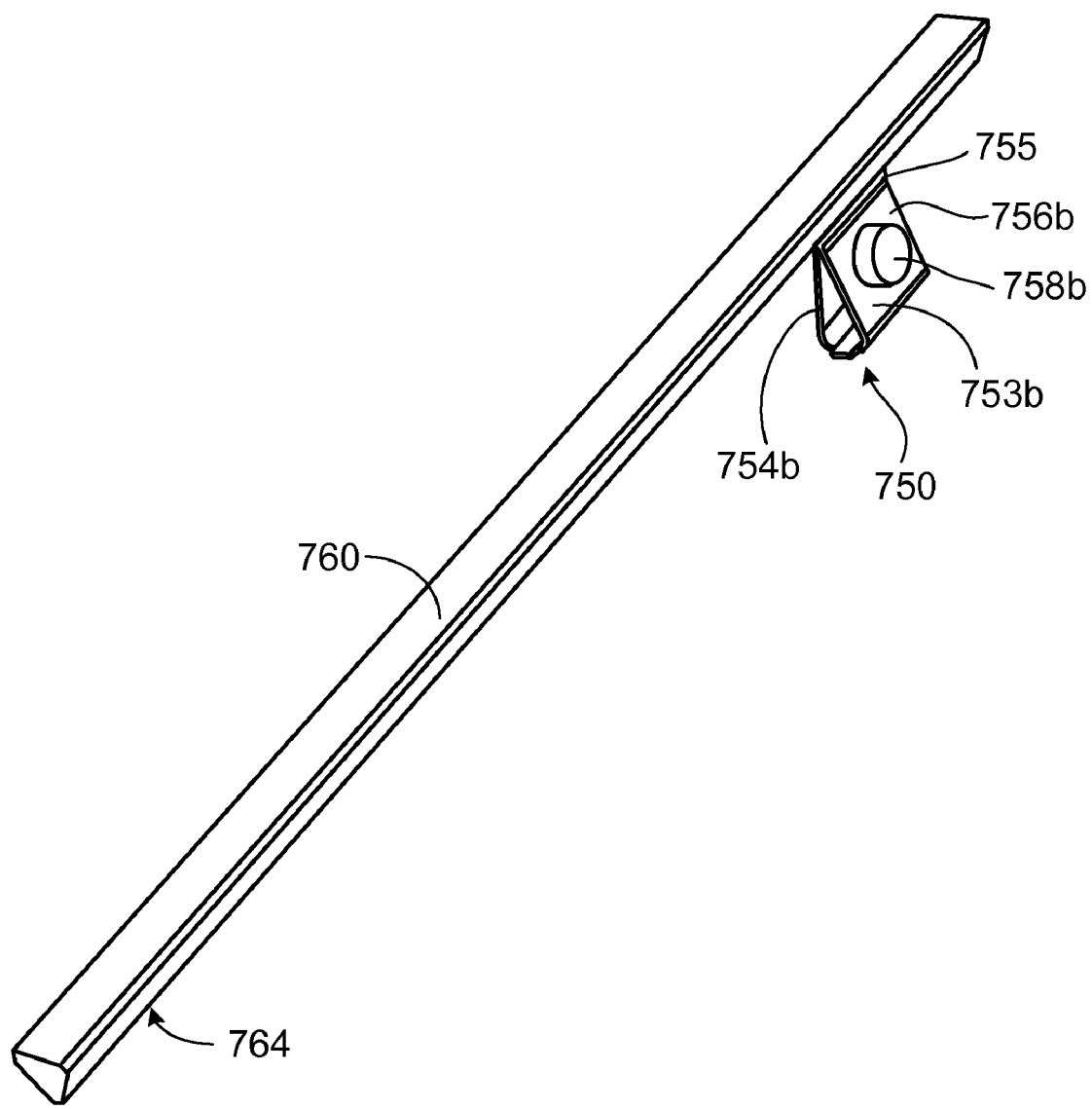
FIG. 35 is a perspective view of a clamping assembly.

An actuator 760 is operatively associated with the spring clamp 750. The actuator 760 passes through the face plate 412c and into an actuator slot 762 in the first sidewall 429a. As shown in FIG. 35, along its length the actuator 760 has a cross-section that defines a wedge 764.

Figure 36A:
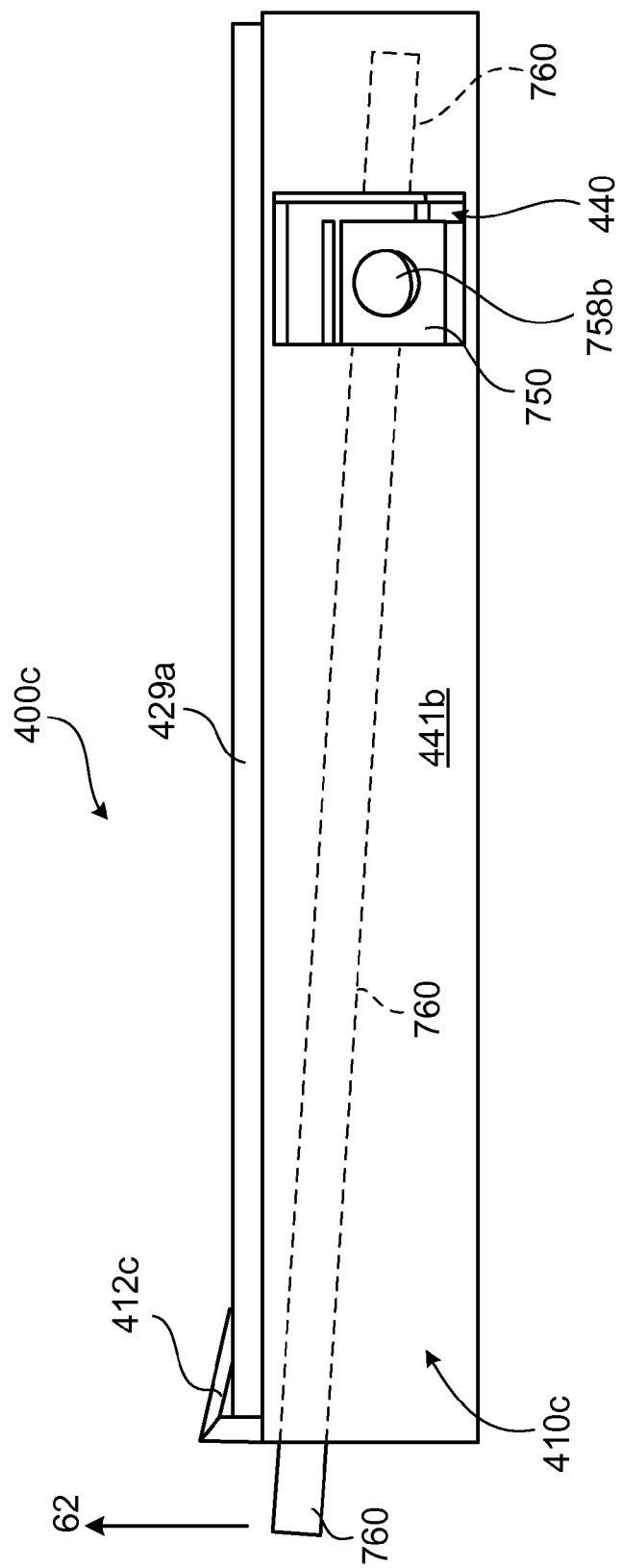
FIG. 36A is a side view of a disk drive transporter showing an actuator in an engaged position.
Figure 36B:
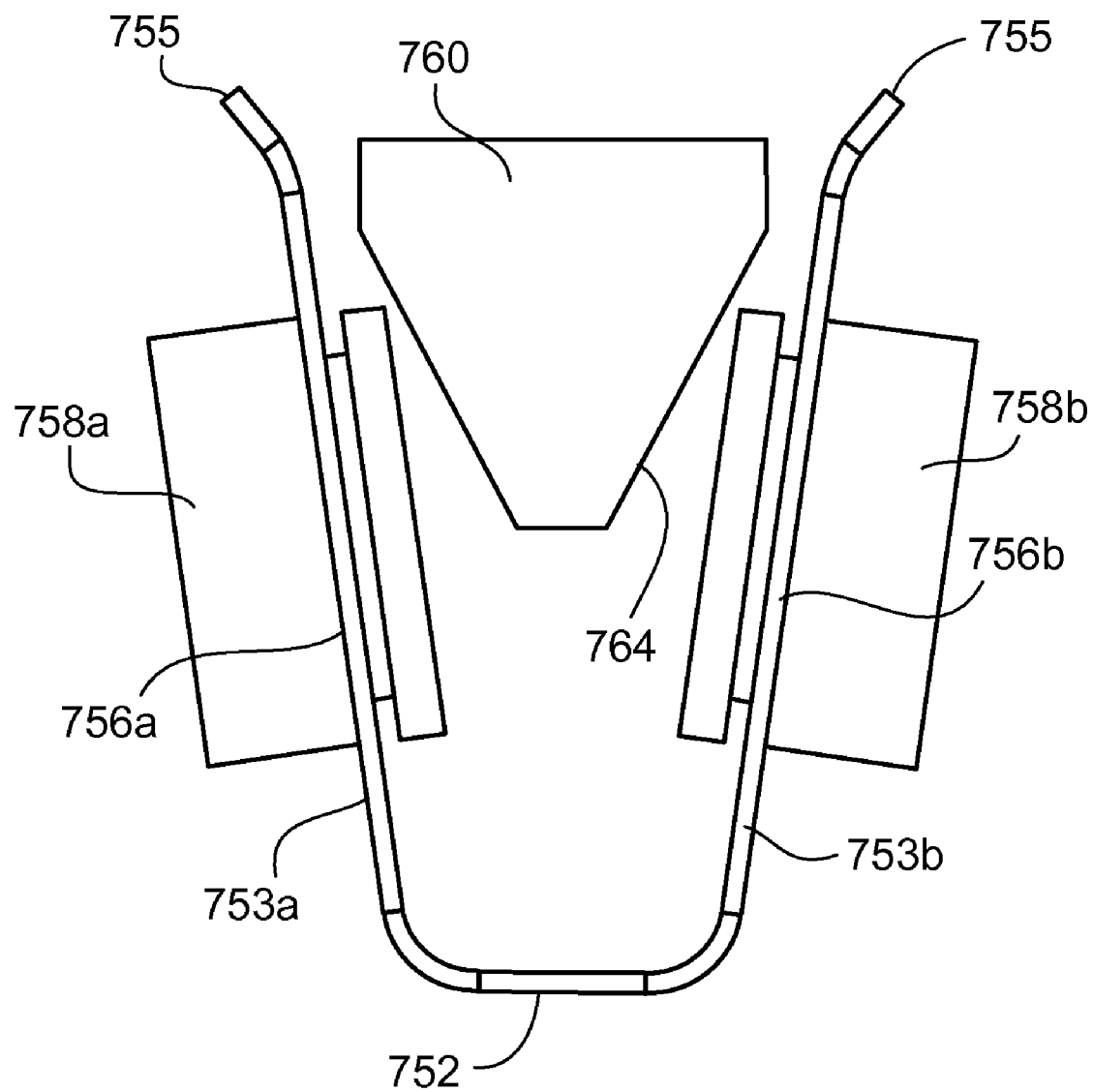
FIG. 36B illustrates the clamping assembly of FIG. 35 in an engaged position.

The actuator 760 is pivotable within the actuator slot 762 between an engaged position and a release position. As illustrated by FIGS. 36A and 36B, in the engaged position, the wedge 764 of the actuator 760 engages the spring clamp 750 to cause the distal ends 755 of the spring arms 753a, 753b to extend outwardly from the inner and outer surfaces 441a, 441b of the first sidewall 429a. Thus, the spring clamp 750 can be actuated by pushing and/or pulling a proximal end of the actuator 765 upwards (arrow 62) to force a distal end of the actuator 760 towards the spring clamp 750.

Figure 37A:
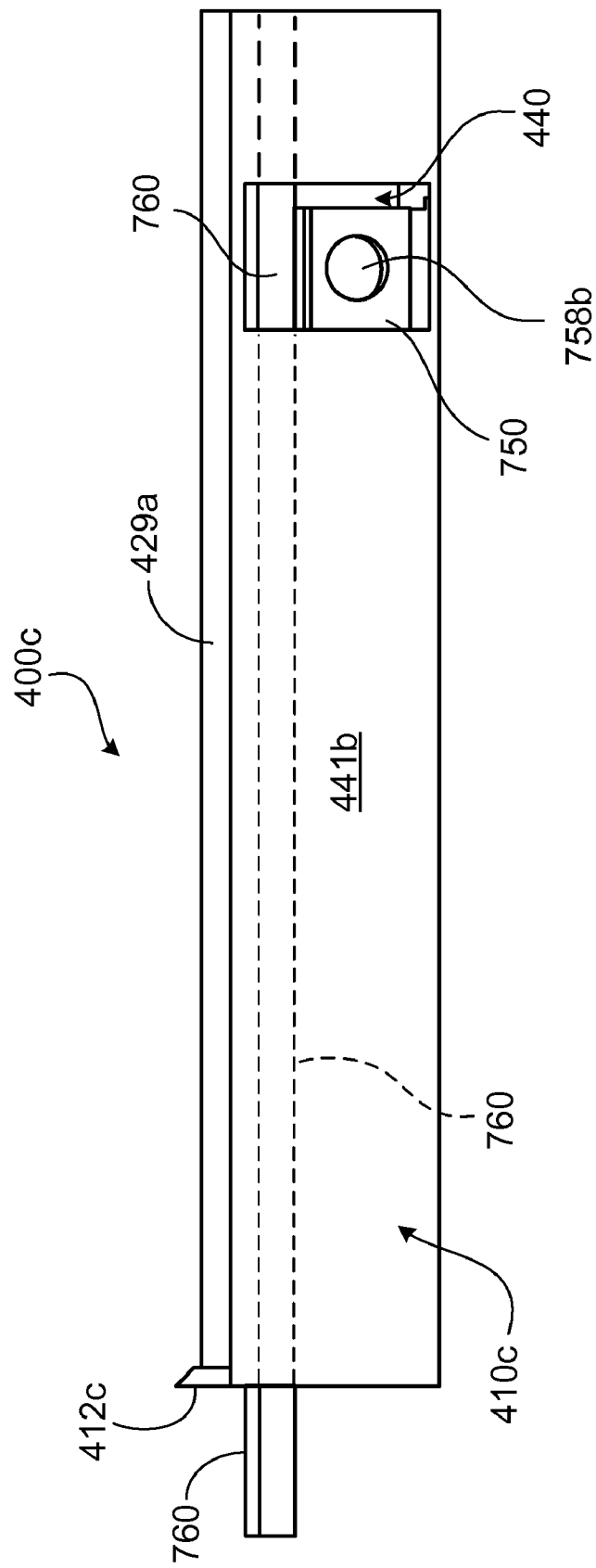
FIG. 37A is a side view of a disk drive transporter showing an actuator in a disengaged position.
Figure 37B:
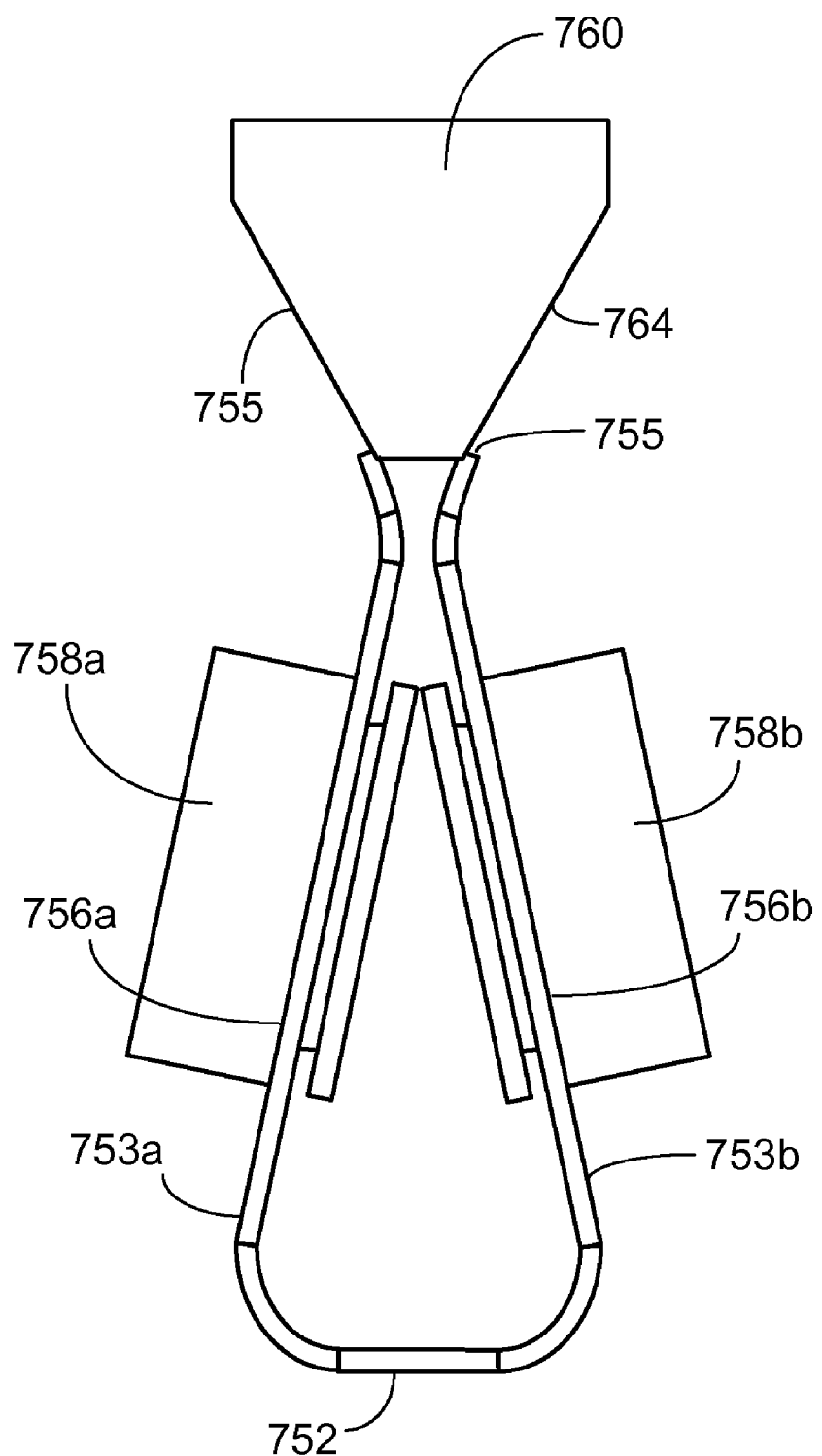
FIG. 37B illustrates the clamping assembly of FIG. 35 in a disengaged position.

The distal ends 755 of the spring arms 753a, 753b can also be retracted by pivoting the actuator 760 to the release position, as shown in FIGS. 37A and 37B. When the actuator 760 has been rotated to the release position, the distal ends 755 are allowed to retract.

Figure 38:
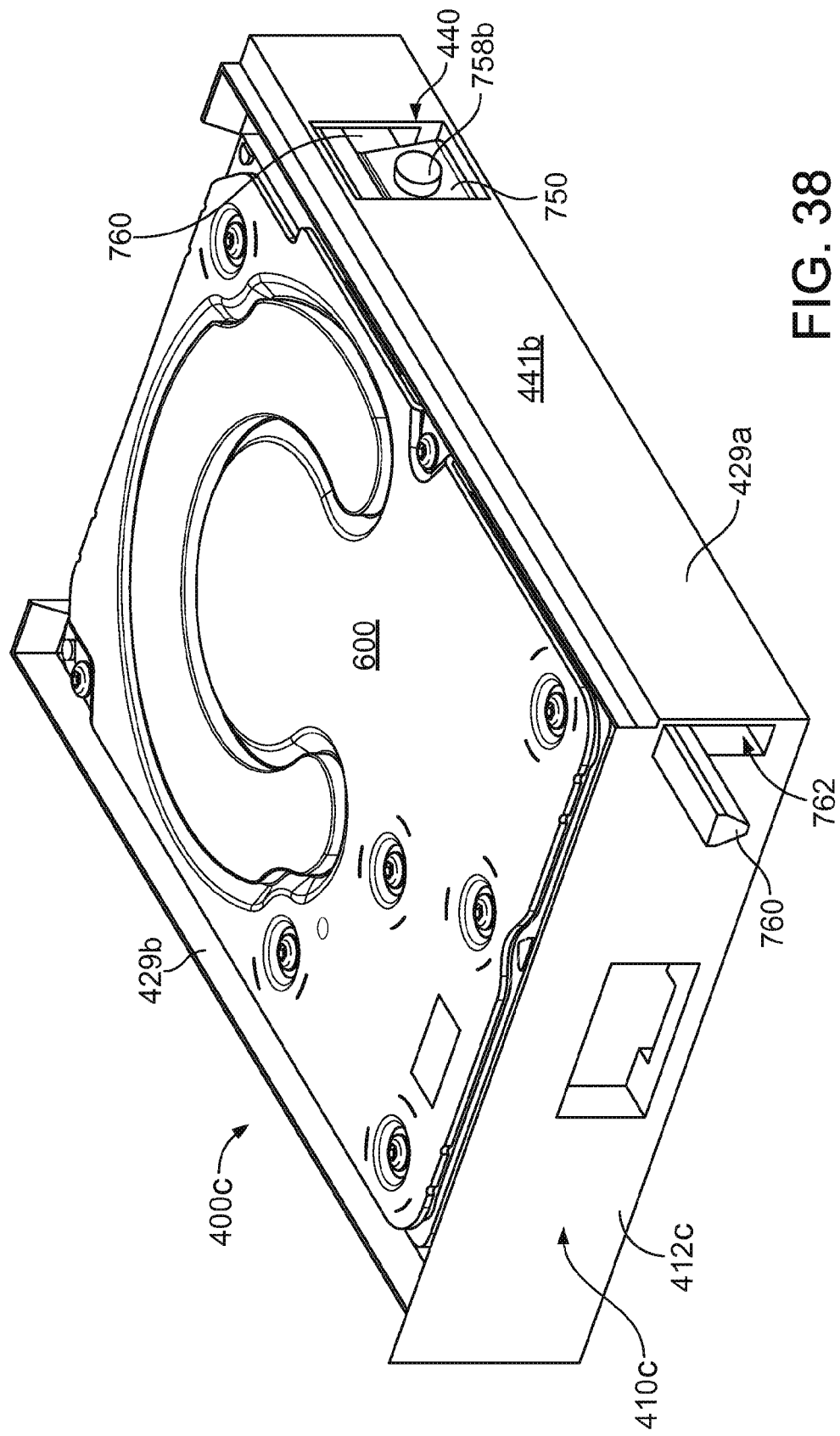
FIG. 38 is a perspective view of the disk drive transporter of FIGS. 33A and 33B supporting a disk drive.

When the actuator 760 is in the release position, with the spring clamp 760 retracted, a disk drive 600 can be inserted into the frame 410c between the sidewalls 429a, 429b, as shown in FIG. 38. Once a disk drive 600 is inserted in the frame 410c, the actuator 760 can be moved towards the engaged position to displace the first engagement member 756a into contact with the disk drive 600 to clamp the disk drive 600 against movement relative to the frame 410c. In a similar manner, the disk drive transporter 400c can also be clamped within a test slot. For example, with a disk drive 600 in the frame 410c and with the actuator 760 in the release position, the disk drive transporter 400c can be inserted into a test slot. With the disk drive transporter 400c in a fully inserted position within the test slot, the actuator 760 can be pivoted towards the engaged position to displace the distal ends 755 of the spring arms 753a, 753b to extend outwardly from the inner and outer surfaces 441a, 441b of the first sidewall 429a. In this position, the second engagement member 756b of the spring clamp 750 extends outwardly from the outer surface 441b of first sidewall 429a and engages the test slot, thereby clamping the disk drive transporter 400c against movement relative to the test slot. At the same time, the first engagement member 756a of the spring clamp 750 extends outwardly from the inner surface 441a of the first sidewall 429a and engages the disk drive 600 to clamp the disk drive 600 against movement relative to the disk drive transporter 400c.

Elements of different embodiments may be combined to form combinations not specifically described herein. Other details and features combinable with those described herein may be found in the following U.S. patent applications entitled "DISK DRIVE TESTING", inventors: Edward Garcia et al., and having assigned Ser. No. 11/958,788, filed Dec. 18, 2007; and "DISK DRIVE TESTING", inventors: Edward Garcia et al., and having assigned Ser. No. 11/958,817, filed Dec. 18, 2007, the entire contents of the aforementioned applications are hereby incorporated by reference.

The claims are not limited to the embodiments described herein.

What is claimed is:
1. A disk drive test slot comprising:
a housing defining:

a test compartment for receiving a disk drive for testing; and an open end providing access to the test compartment for insertion and removal of the disk drive for testing; and a clamping mechanism mounted to the housing of the disk drive test slot, wherein the clamping mechanism that is mounted to the housing of the disk drive test slot is configured to engage the disk drive after the disk drive has been inserted into the test compartment;

wherein the clamping mechanism comprises a plurality of arms and an engagement member;

wherein an arm in the plurality of arms comprises a distal end; and wherein the disk drive test slot is configured so that, after the disk drive has been inserted into the test compartment, a displacement of the distal end on the arm of the clamping mechanism that is mounted to the housing of the disk drive test slot causes the engagement member to move towards the disk drive to engage with the disk drive.

2. The disk drive test slot of claim 1, wherein the clamping mechanism further comprises a clamping spring.

3. The disk drive test slot of claim 1, wherein the clamping mechanism further comprises a dampener.

4. The disk drive test slot of claim 3, wherein the dampener is configured to engage the disk drive received in the test compartment.

5. The disk drive test slot of claim 3, wherein the dampener comprises a dampening material selected from a group comprising of thermoplastics and thermosets.

6. The disk drive test slot of claim 1, wherein the engagement member comprises a first engagement member, wherein the clamping mechanism further comprises a second engagement member mounted to the housing, and wherein the first engagement member and the second engagement member are configured to clamp the disk drive therebetween.

7. The disk drive test slot of claim 1, wherein the housing defines one or more mounting holes, and wherein the clamping mechanism comprises one more retaining tabs which engage with the one or more mounting holes.

8. The disk drive test slot of claim 1, wherein the engagement member is mounted within the test compartment.

9. A test slot assembly comprising:

a disk drive transporter configured to receive and to support a disk drive; and a test slot comprising: a housing defining: a test compartment for receiving and supporting the disk drive transporter; and an open end providing access to the test compartment for insertion and removal of the disk drive transporter; and a clamping mechanism mounted to the housing of the test slot, wherein the clamping mechanism that is mounted to the housing of the test slot is configured to engage the disk drive carried by the disk drive transporter after the disk drive transporter has been inserted into the test compartment;

wherein the clamping mechanism comprises a plurality of arms and an engagement member; wherein an arm in the plurality of arms comprises a distal end; and wherein the test slot is configured so that after, the disk drive has been inserted into the test compartment, a displacement of the distal end on the arm of the clamping mechanism that is mounted to the housing of the test slot causes the engagement member to move towards the disk drive to engage with the disk drive.

10. The test slot assembly of claim 9, wherein the disk drive transporter comprises a pass-through aperture, and wherein the engagement member is configured to extend through the pass-through aperture to engage the disk drive carried by the disk drive transporter.

11. The test slot assembly of claim 10, wherein the disk drive transporter comprises sidewalls configured to receive the disk drive therebetween, and wherein one of the sidewalls defines the pass-through aperture.

12. The test slot assembly of claim 9, wherein the engagement member is configured such that during insertion of the disk drive transporter into the test compartment the engagement member is compressed by the disk drive transporter.

13. The test slot assembly of claim 9, wherein the clamping mechanism comprises a ramp surface, and wherein, during insertion of the disk drive transporter into the test compartment, the disk drive transporter engages the ramp surface causing the engagement member to be compressed.

14. The test slot assembly of claim 9, wherein the clamping mechanism further comprises a clamping spring.

15. The test slot assembly of claim 9, wherein the clamping mechanism further comprises a dampener.

16. The test slot assembly of claim 15, wherein the dampener is configured to engage the disk drive inserted in the test compartment.

17. The test slot assembly of claim 15, wherein the dampener comprises a dampening material selected from a group comprising thermoplastics and thermosets.

18. The test slot assembly of claim 9, wherein the engagement member comprises a first engagement member, wherein the clamping mechanism further comprises a second engagement member mounted to the housing, and wherein the first engagement member and the second engagement member are configured to clamp the disk drive therebetween.

19. The test slot assembly of claim 18, wherein the disk drive transporter comprises pass-through apertures, and wherein the first and second engagement members are configured to extend through the pass-through apertures to engage the disk drive carried by the disk drive transporter.

20. The test slot assembly of claim 9, wherein the engagement member is mounted within the test compartment.

* * * * *

UNITED STATES PATENT AND TRADEMARK OFFICE
CERTIFICATE OF CORRECTION

| | |
|---|---|
| PATENT NO. | : 8,405,971 B2 |
| APPLICATION NO. | : 12/767113 |
| DATED | : March 26, 2013 |
| INVENTOR(S) | : Brian S. Merrow et al. |

It is certified that error appears in the above-identified patent and that said Letters Patent is hereby corrected as shown below:

On title page, item (56), under "OTHER PUBLICATIONS", in column 2, line 6, Delete "11/595,133." and insert -- 11/959,133. --, therefor Signed and Sealed this
Thirtieth Day of July, 2013

Teresa Stanek Rea
*Acting Director of the United States Patent and Trademark Office*